United States Patent
Tung et al.

(10) Patent No.: US 12,283,587 B2
(45) Date of Patent: Apr. 22, 2025

(54) INTEGRATED CIRCUIT AND METHOD OF FORMING THE SAME

(71) Applicant: TAIWAN SEMICONDUCTOR MANUFACTURING COMPANY, LTD., Hsinchu (TW)

(72) Inventors: Yu-Lung Tung, Hsinchu (TW); Xiaodong Wang, Hsinchu (TW); Jhon Jhy Liaw, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 295 days.

(21) Appl. No.: 17/736,073

(22) Filed: May 3, 2022

(65) Prior Publication Data

US 2023/0009894 A1  Jan. 12, 2023

Related U.S. Application Data

(60) Provisional application No. 63/220,012, filed on Jul. 9, 2021.

(51) Int. Cl.
*H01L 27/092* (2006.01)
*G06F 30/392* (2020.01)
(Continued)

(52) U.S. Cl.
CPC ........ *H01L 27/0207* (2013.01); *G06F 30/392* (2020.01); *H01L 23/5286* (2013.01);
(Continued)

(58) Field of Classification Search
CPC ............ H01L 27/0207; H01L 23/5286; H01L 27/0924; H01L 27/0928; H01L 21/823871;
(Continued)

(56) References Cited

U.S. PATENT DOCUMENTS 7,260,442 B2   8/2007   Hwang et al.
9,256,709 B2   2/2016   Yu et al.
(Continued)

FOREIGN PATENT DOCUMENTS

TW   201917821   5/2019

OTHER PUBLICATIONS

Office Action dated Jun. 8, 2023 for corresponding case No. TW 111125299. (pp. 1-14).

*Primary Examiner* — Tan N Tran
(74) *Attorney, Agent, or Firm* — Hauptman Ham, LLP

(57) ABSTRACT

An integrated circuit includes a first cell, a second cell, a buffer zone and a first power rail. The first cell includes a first set of fins extending in a first direction. Each fin of the first set of fins corresponds to a transistor of a first set of transistors. The second cell includes a second set of fins extending in the first direction. Each fin of the second set of fins corresponds to a transistor of a second set of transistors. The second set of fins is separated from the first set of fins in a second direction. The buffer zone is between the first cell and the second cell. The first power rail extends in the first direction, and overlaps at least the buffer zone. The first power rail is in a first metal layer, and is configured to supply a first voltage.

20 Claims, 27 Drawing Sheets

(51) Int. Cl.
  *H01L 23/528* (2006.01)
  *H01L 27/02* (2006.01)
  *G06F 119/18* (2020.01)
(52) U.S. Cl.
  CPC ...... *H01L 27/0924* (2013.01); *H01L 27/0928* (2013.01); *G06F 2119/18* (2020.01)
(58) Field of Classification Search
  CPC . H01L 21/784; H01L 27/0629; G06F 30/392; G06F 2119/18; G06F 2119/06
  USPC ....................................................... 257/371
  See application file for complete search history.

(56) References Cited

U.S. PATENT DOCUMENTS

| | | | |
|---|---|---|---|
| 2013/0026572 A1* | 1/2013 | Kawa | ................ H01L 29/41791 257/E21.602 |
| 2014/0040838 A1 | 2/2014 | Liu et al. | |
| 2015/0278429 A1 | 10/2015 | Chang | |
| 2018/0083036 A1 | 3/2018 | Agarwal et al. | |

\* cited by examiner

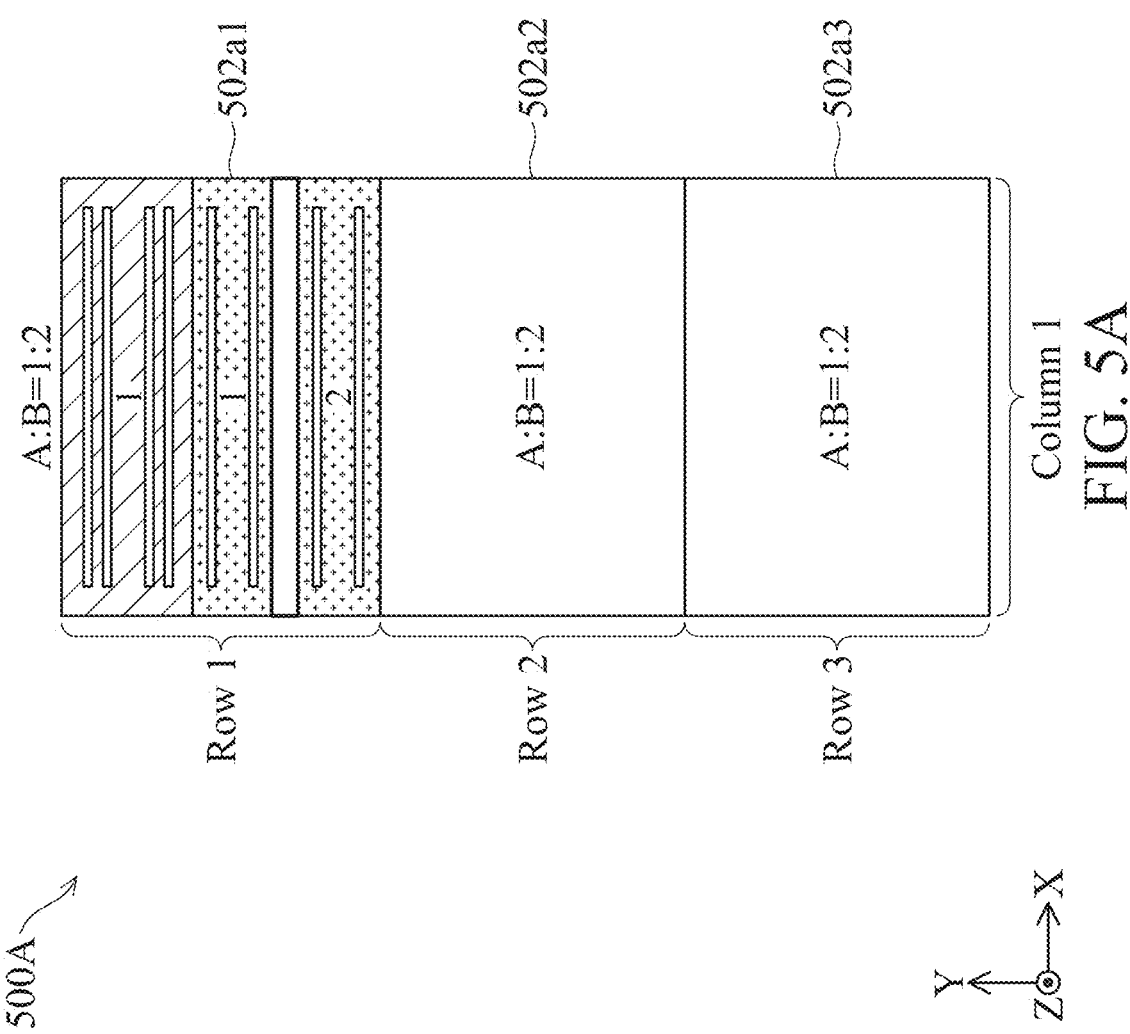

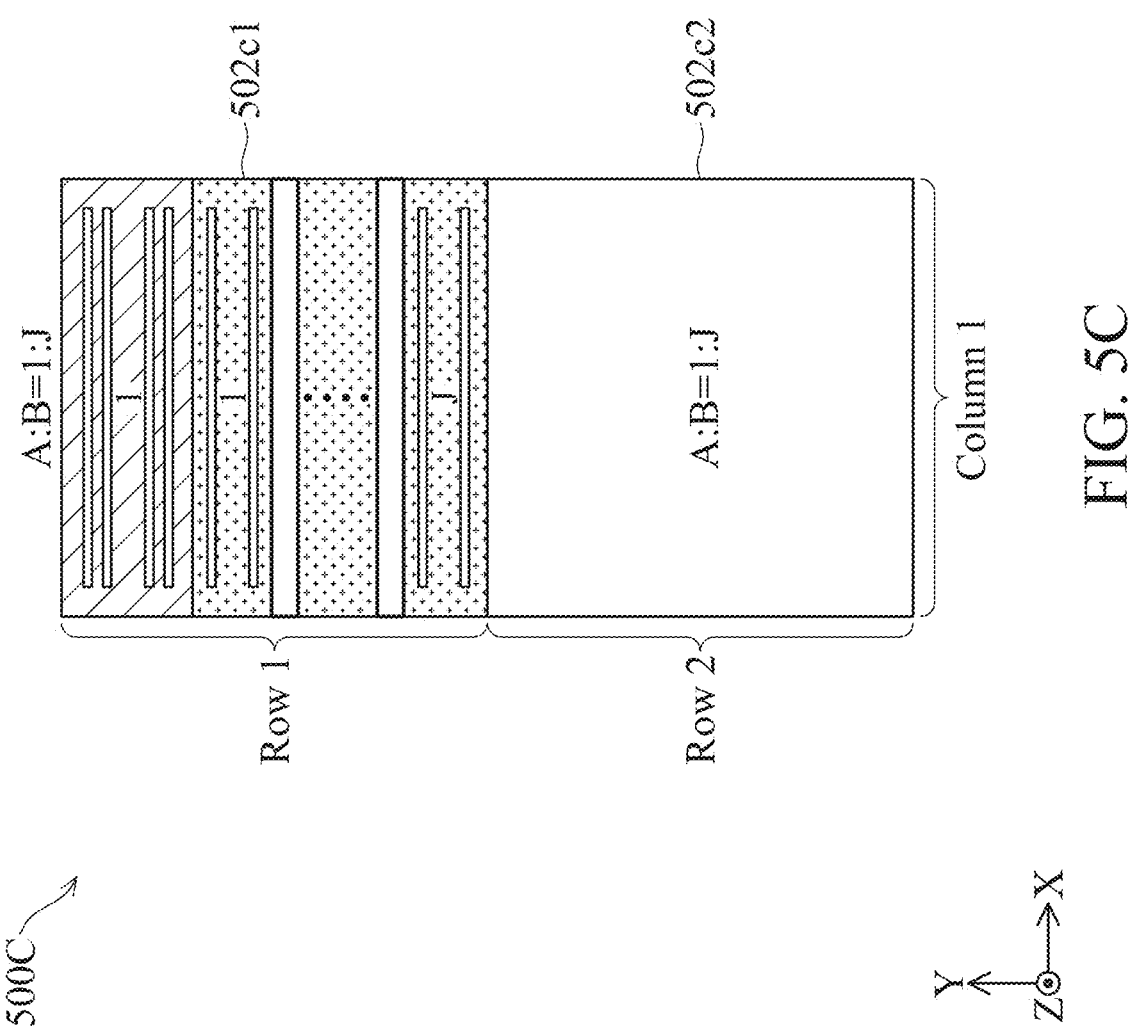

INTEGRATED CIRCUIT AND METHOD OF FORMING THE SAME

PRIORITY CLAIM

This application claims the benefit of U.S. Provisional Application No. 63/220,012, filed Jul. 9, 2021, which is herein incorporated by reference in its entirety.

BACKGROUND

The semiconductor integrated circuit (IC) industry has produced a wide variety of digital devices to address issues in a number of different areas. The recent trend in miniaturizing ICs has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the layout designs and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 5A-5E are diagrams of a corresponding layout design of a corresponding integrated circuit, in accordance with some embodiments.

DETAILED DESCRIPTION

Figure 1:
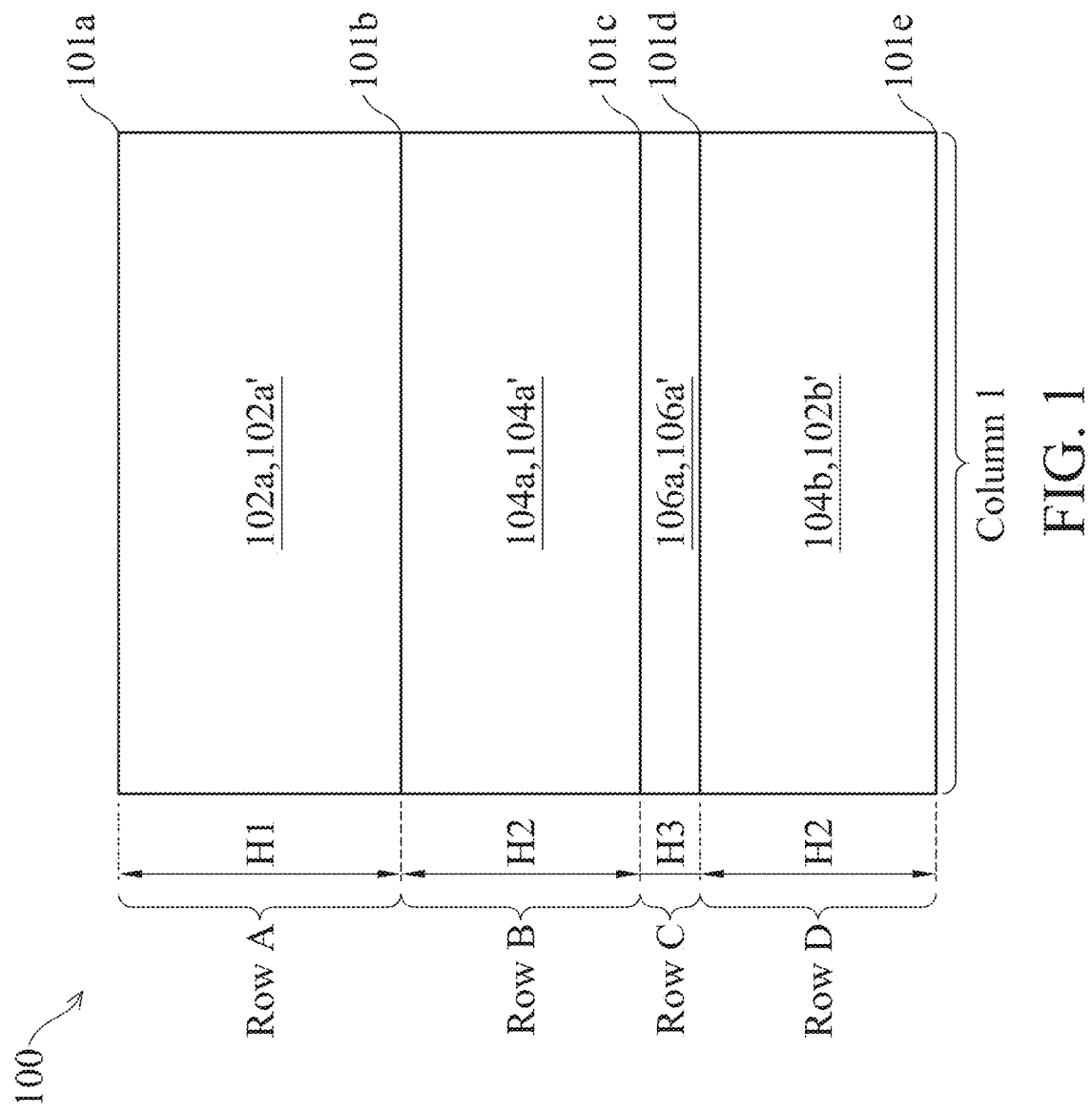
FIG. 1 is a diagram of a layout design, in accordance with some embodiments.

The following disclosure provides different embodiments, or examples, for implementing features of the provided subject matter. Specific examples of components, materials, values, steps, arrangements, or the like, are described below to simplify the present disclosure. These are, of course, merely examples and are not limiting. Other components, materials, values, steps, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In accordance with some embodiments, an integrated circuit includes a first cell, a second cell, a buffer zone and a first power rail. In some embodiments, the first cell includes a first set of fins extending in a first direction. In some embodiments, each fin of the first set of fins corresponds to a transistor of a first set of transistors.

In some embodiments, the second cell includes a second set of fins extending in the first direction. In some embodiments, each fin of the second set of fins corresponds to a transistor of a second set of transistors. In some embodiments, the second set of fins is separated from the first set of fins in a second direction.

In some embodiments, the first power rail is in a first metal layer, and is configured to supply a first voltage. In some embodiments, the first power rail extends in the first direction, and overlaps at least the buffer zone.

In some embodiments, the buffer zone is between the first cell and the second cell thereby increasing the distance between the first cell and the second cell. In some embodiments, by increasing the distance between the first cell and the second cell, a width of the first power rail is thereby increased which causes a resistance of the first power rail to be reduced compared with other approaches. In some embodiments, reducing the resistance of the first power rail results in increased efficiency of the first power rails, and better performance compared with other approaches.

In some embodiments, the inclusion of the buffer zone in the integrated circuit, allows the integrated circuit to be a more flexible IC than other approaches and thereby can be utilized in hybrid cells that incorporate groups of multiple fin transistor cells and single fin transistor cells.

FIG. 1 is a diagram of a layout design 100, in accordance with some embodiments. Layout design 100 is a layout diagram of an integrated circuit, such as integrated circuit 300 of FIGS. 3A-3G. In some embodiments, at least a portion of layout design 100 is usable to manufacture integrated circuit 300 (FIGS. 3A-3G).

Components that are the same or similar to those in each of FIGS. 1, 2A-2C, 3A-3G, 4A-4C, 5A-5E, 6A-6D, 7, 8, 9, 10 and 11 are given the same reference numbers, and similar detailed description thereof is thus omitted.

Layout design 100 includes layout designs 102a, 104a, 104b and 106a. In some embodiments, layout design 100 includes additional elements not shown in FIG. 1.

In some embodiments, at least layout design 102a, 104a, 104b or 106a is also referred to as a cell. A cell is thereby configured as one or more of a standard cell, a custom cell, an engineering change order (ECO) cell, a logic gate cell, a memory cell, a physical device cell, or another type of cell or combination of cells capable of being defined in an IC layout diagram, e.g., layout design 100. In some embodiments, a cell is a standard cell of a logic gate cell. In some embodiments, a logic gate cell includes an AND, OR, NAND, NOR, XOR, INV, AND-OR-Invert (AOI), OR-AND-Invert (OAI), MUX, Flip-flop, BUFF, Latch, delay, or clock cells. In some embodiments, one or more of layout designs 100, 200, 400A-400C, 500A-500E or 600A-600D (FIG. 1, 2A-2C, 4A-4C, 5A-5E or 6A-6D) is a layout design of a memory cell. In some embodiments, a memory cell includes a static random access memory (SRAM), a dynamic RAM (DRAM), a resistive RAM (RRAM), a magnetoresistive RAM (MRAM) or read only memory (ROM). In some embodiments, one or more of layout designs 100, 200, 400A-400C, 500A-500E or 600A-600D includes layout designs of one or more active or passive elements. Examples of active elements include, but are not limited to, transistors and diodes. Examples of transistors include, but are not limited to, metal oxide semiconductor field effect transistors (MOSFET), complementary metal oxide semiconductor (CMOS) transistors, bipolar junction transistors (BJT), high voltage transistors, high frequency transistors, p-channel and/or n-channel field effect transistors (PFETs/NFETs), or the like, FinFETs, nanosheet transistors, nanowire transistors, complementary FETs (CFETs) and planar MOS transistors with raised source/drain. Examples of passive elements include, but are not limited to, capacitors, inductors, fuses, and resistors. In some embodiments, at least layout design 100, 200, 400A-400C, 500A-500E or 600A-600D is a standard cell layout design. In some embodiments, one or more of layout design 100, 200, 400A-400C, 500A-500E or 600A-600D is a layout design of a logic gate cell.

Figure 2A:
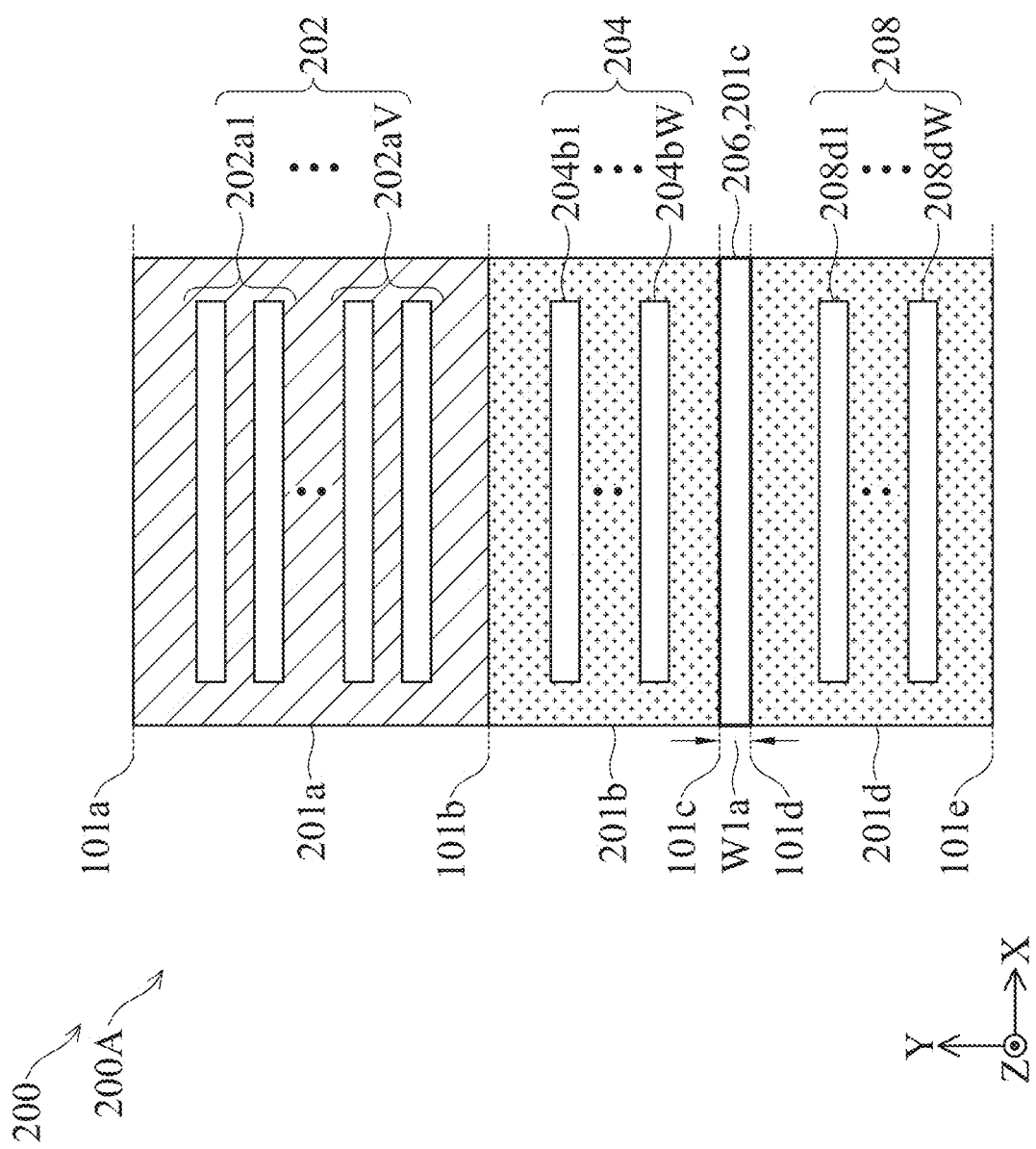
FIGS. 2A-2C are diagrams of a layout design of an integrated circuit, in accordance with some embodiments.
Figure 2B:
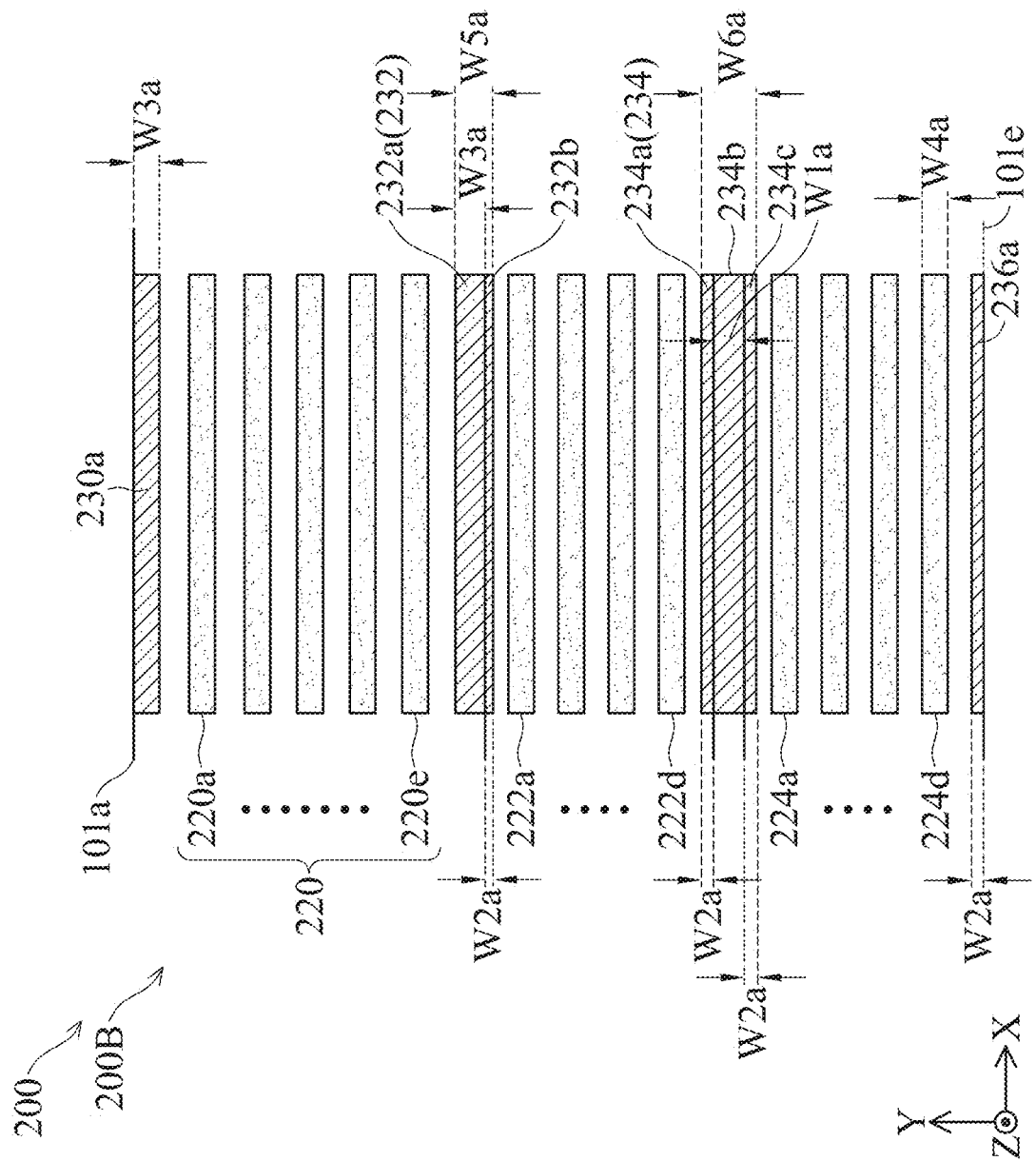
Figure 2C:
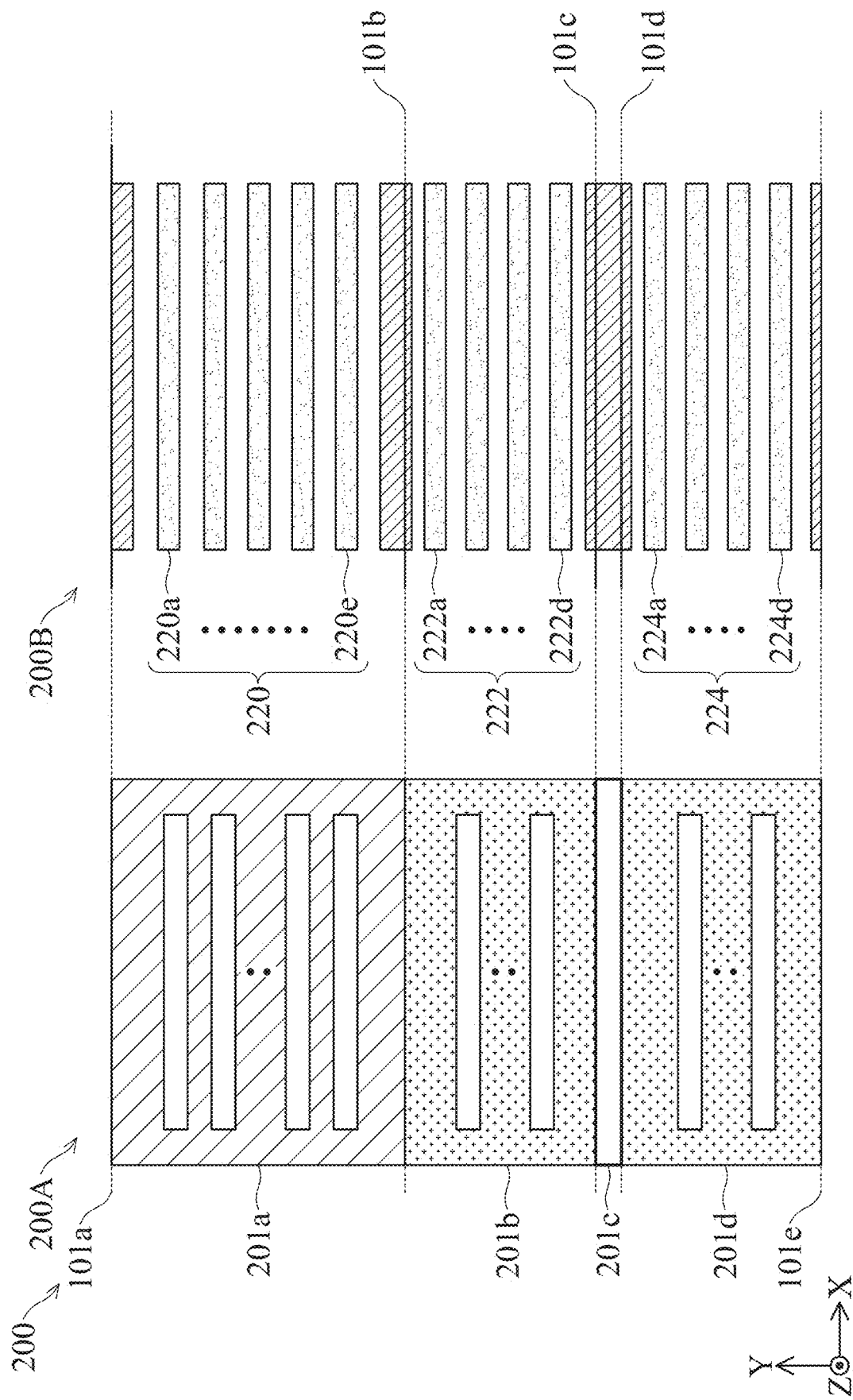
Figure 4A:
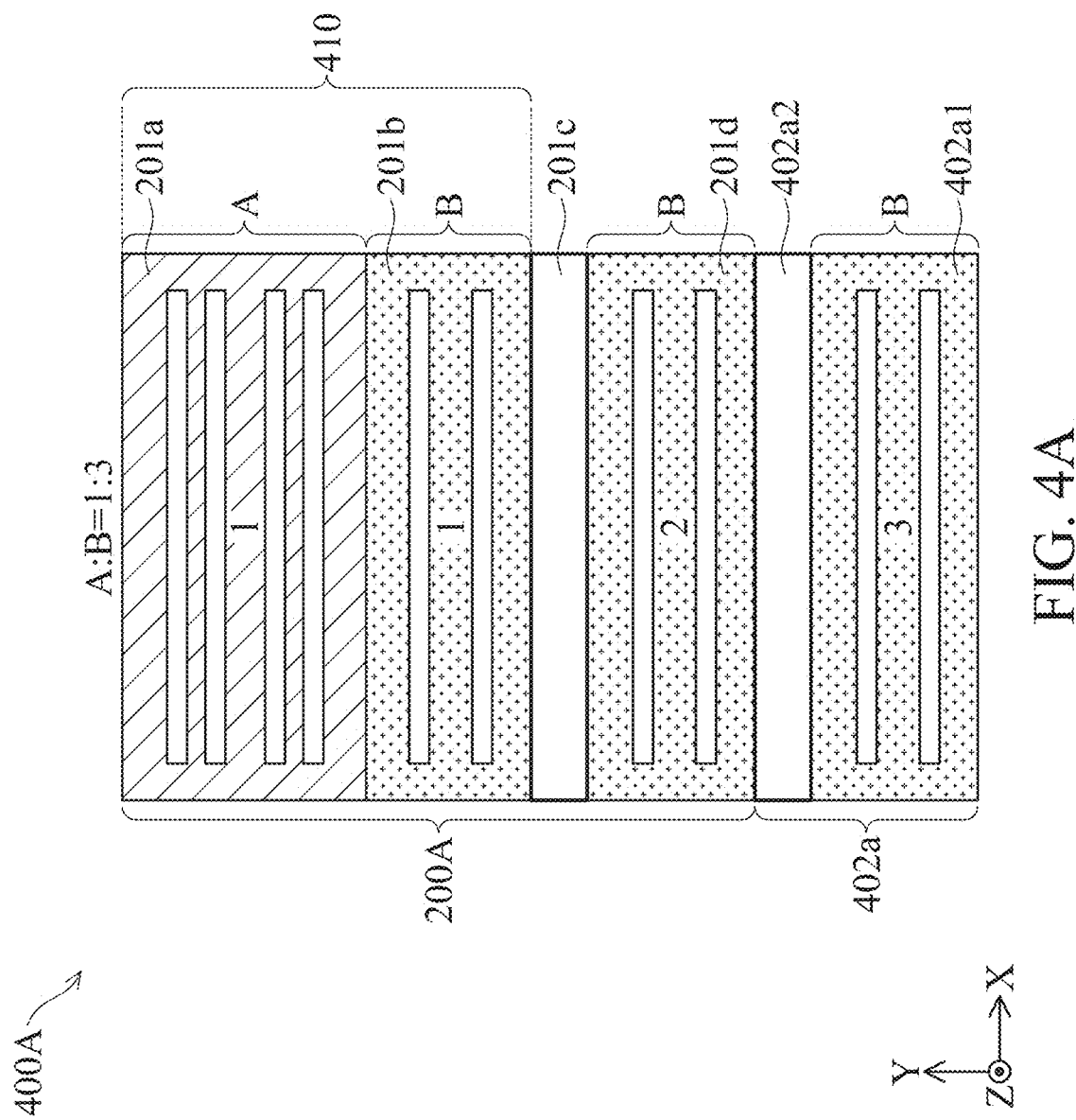
FIGS. 4A-4C are diagrams of a corresponding layout design of a corresponding integrated circuit, in accordance with some embodiments.
Figure 4B:
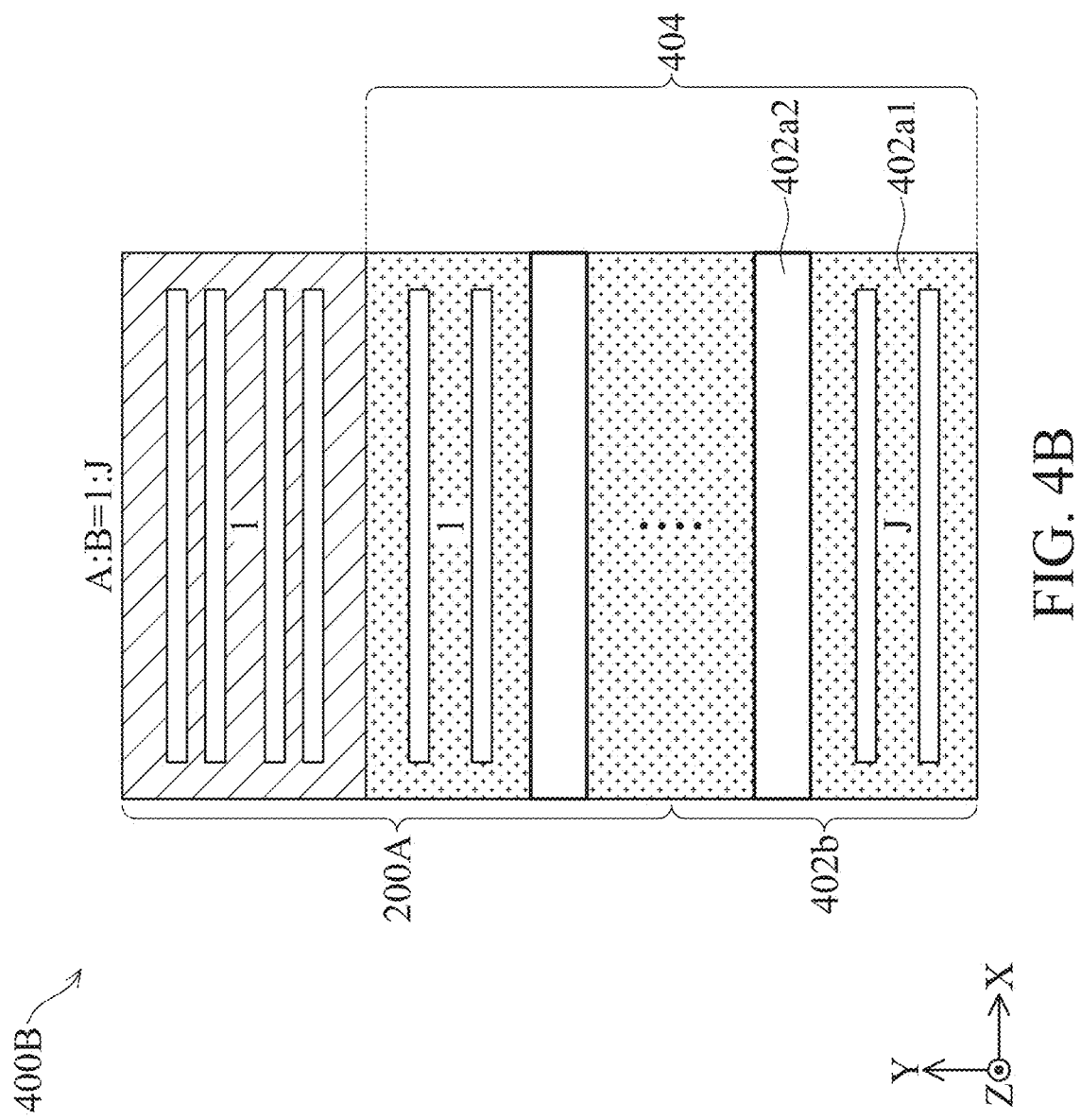
Figure 4C:
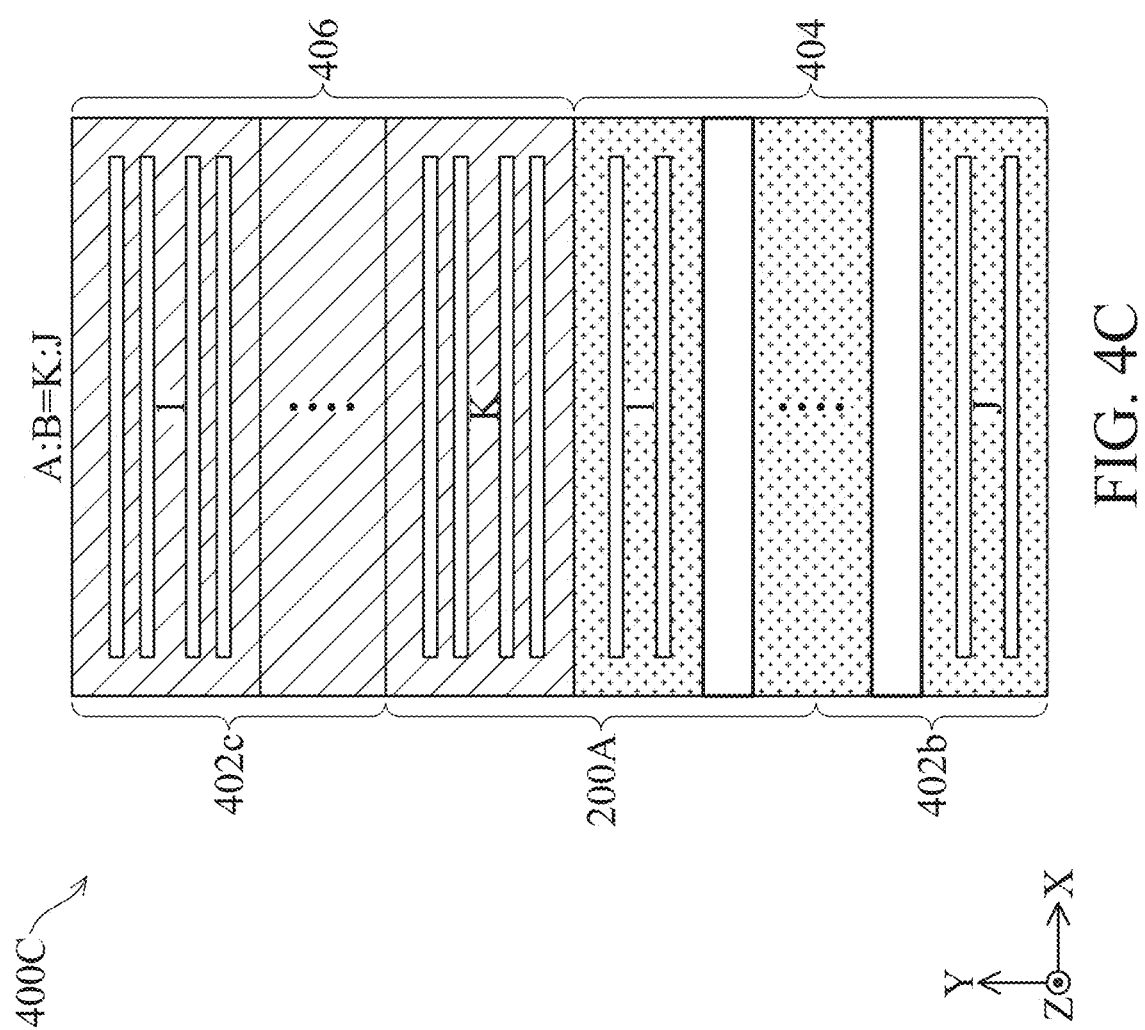
Figure 5B:
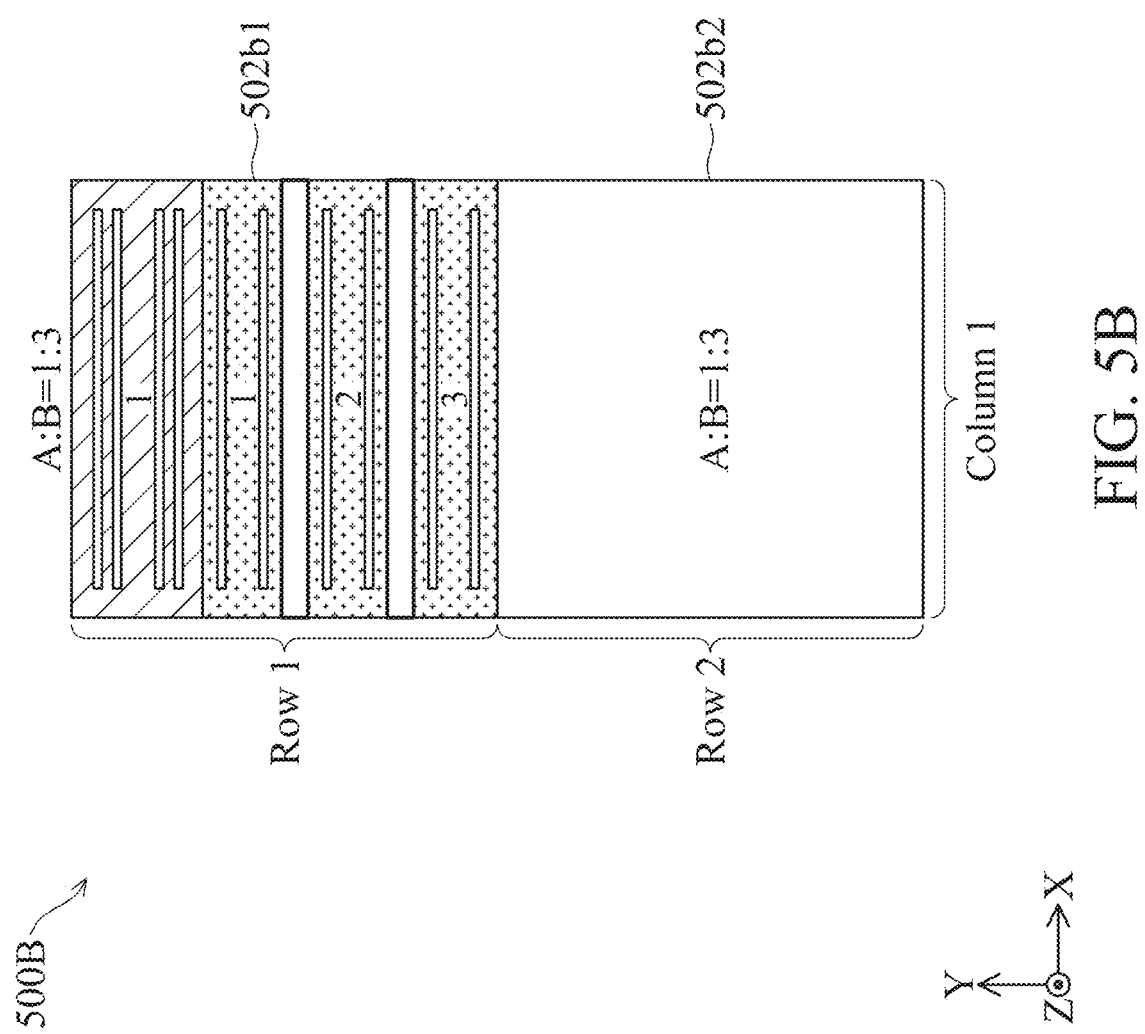
Figure 5D:
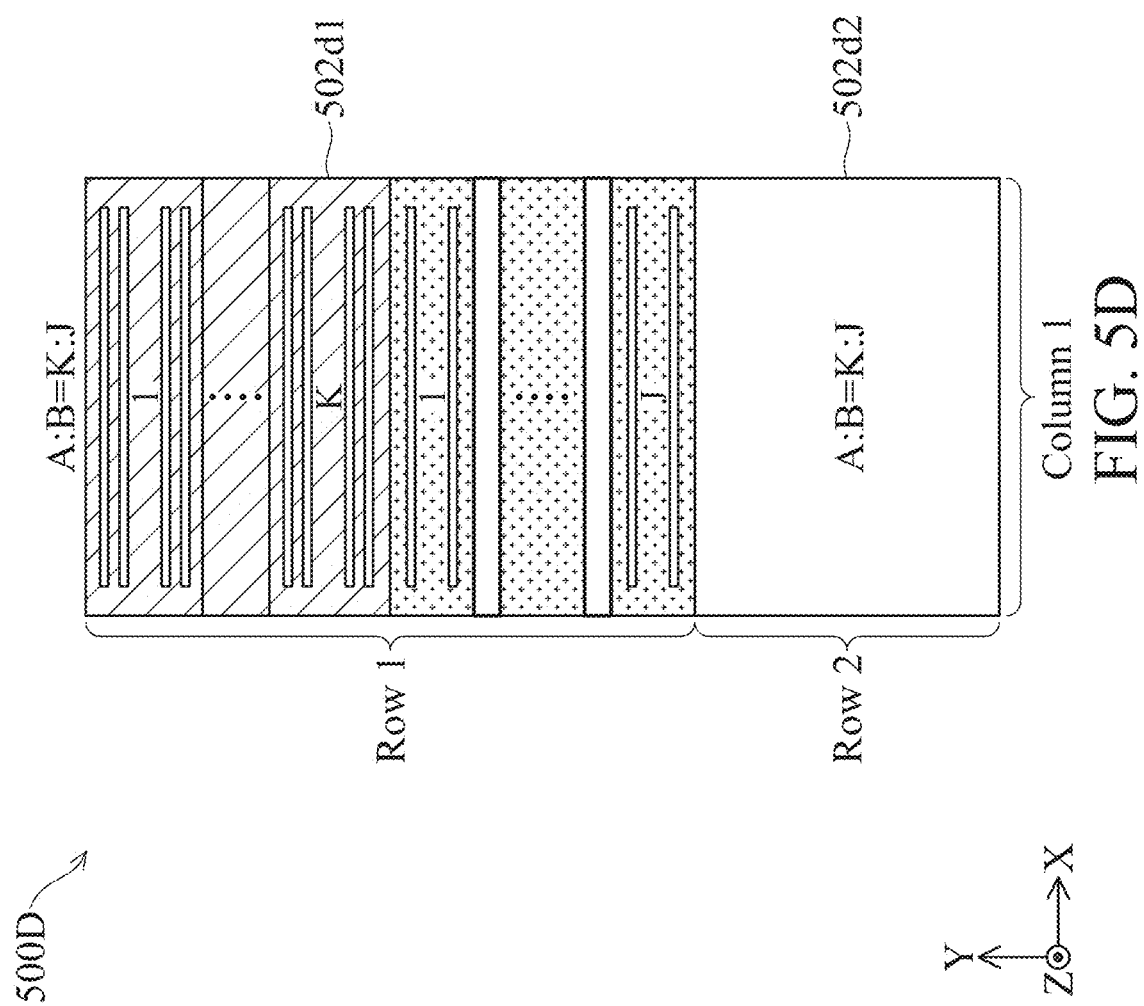

In some embodiments, layout design 102a corresponds to at least cell 201a of FIG. 2A-2C or region 406 of FIGS. 4C and 5D. In some embodiments, layout design 104a corresponds to at least cell 201b of FIGS. 2A-2C. In some embodiments, layout design 104b corresponds to at least cell 201d of FIGS. 2A-2C. In some embodiments, layout design 106a corresponds to at least cell 201c of FIGS. 2A-2C.

Each of layout designs 102a, 104a, 104b and 106a extend in at least a first direction X. Each of layout designs 102a, 104a, 104b and 106a are separated from another of layout designs 102a, 104a, 104b and 106a in a second direction Y. The second direction Y is different from the first direction X. In some embodiments, the second direction Y is the same as the first direction X.

Layout design 102a has a cell boundary 101a that extends in the first direction X. In some embodiments, layout design 102a is adjacent in the first direction along the cell boundary 101a to other layout designs (e.g., as shown in FIGS. 4C, 5A-5E and 6A-6D).

Layout design 102a is adjacent to layout design 104a in the first direction X along a cell boundary 101b. Layout design 104a is adjacent to layout design 106a in the first direction X along a cell boundary 101c. Layout design 106a is adjacent to layout design 104b in the first direction X along cell boundary 101d.

Layout design 104b has a cell boundary 101e that extends in the first direction X. In some embodiments, layout design 104b is adjacent in the first direction along the cell boundary 101e to other layout designs (e.g., as shown in FIGS. 4C, 5A-5E and 6A-6D).

In some embodiments, a first element and a second element are adjacent to each other includes scenarios where the first element and the second element are directly next to each other. In some embodiments, a first element and a second element are adjacent to each other includes scenarios where intermediary elements are positioned between the first element and the second element.

Other configurations or quantities of layout designs 102a, 104a, 104b and 106a are within the scope of the present disclosure. For example, layout design 100 of FIG. 1 includes one column (Column 1) and four rows (Rows A-D) of cells (e.g., layout designs 102a, 104a, 104b and 106a). Other numbers of rows and/or columns in layout design 100 are within the scope of the present disclosure. For example, in some embodiments, layout design 100 includes at least an additional column of cells, similar to column 1, and being adjacent to column 1. For example, in some embodiments, layout design 100 includes additional columns of cells, similar to one or more of rows A, B, C or D, adjacent to column 1. For example, in some embodiments, layout design 100 includes additional rows of cells, similar to rows A-D, adjacent to row A along cell boundary 101a. For example, in some embodiments, layout design 100 includes additional rows of cells, similar to rows A-D, adjacent to row D along cell boundary 101e. For example, in some embodiments, layout design 100 includes additional rows of cells, similar to rows C and D, adjacent to row D along cell boundary 101e. For example, in some embodiments, layout design 100 includes additional rows of cells, similar to row A, adjacent to row D along cell boundary 101e. For example, in some embodiments, layout design 100 includes additional rows of cells, similar to one or more of rows A, B, C or D, adjacent to row A along cell boundary 101a. For example, in some embodiments, layout design 100 includes additional rows of cells, similar to one or more of rows A, B, C or D, adjacent to row D along cell boundary 101e.

Layout design 102a has a height H1 in the second direction Y. Layout design 102a has a different layout design from at least layout design 104a, 104b or 106a.

Each of layout designs 104a and 104b have a height H2 in the second direction Y. Layout designs 104a and 104b are a same layout design as each other. In some embodiments, layout designs 104a and 104b are a different layout design from each other.

Layout design 106a has a height H3 in the second direction Y. Layout design 106a has a different layout design from at least layout design 102a, 104a, or 104b. At least height H1, H2 or H3 is different from another of at least height H1, H2 or H3.

Layout design 102a is useable to manufacture cell 301a of FIGS. 3A-3G. Layout design 104a or 104b is useable to manufacture corresponding cell 301b or 301d of FIGS. 3A-3G. Layout design 106a is useable to manufacture cell 301c of FIGS. 3A-3G.

Other configurations or arrangements of layout design 100 are within the scope of the present disclosure.

FIGS. 2A-2C are diagrams of a layout design 200 of an integrated circuit, in accordance with some embodiments. Layout design 200 is a layout diagram of an integrated circuit 300 of FIGS. 3A-3G, in accordance with some embodiments.

Layout design 200 is an embodiment of layout design 100 of FIG. 1, and similar detailed description is omitted for brevity.

FIG. 2A is a diagram of a portion 200A of layout design 200 of FIGS. 2A-2C, simplified for ease of illustration. FIG. 2B is a diagram of a portion 200B of layout design 200 of FIGS. 2A-2C, simplified for ease of illustration. FIG. 2C is a diagram of layout design 200 and includes each of portions 200A and 200B next to each other for ease of illustration.

For ease of illustration, some of the labeled elements of FIG. 1, 2A-2C, 3A-3G, 4A-4C, 5A-5E or 6A-6D are not labelled in at least FIG. 1, 2A-2C, 3A-3G, 4A-4C, 5A-5E or 6A-6D. In some embodiments, FIG. 1, 2A-2C, 3A-3G, 4A-4C, 5A-5E or 6A-6D includes additional elements that are not shown.

Portion 200A includes one or more features of layout design 100 of an oxide diffusion (OD) level or an active region level of layout design 200. Portion 200B includes one or more features of layout design 200 of a metal 0 (M0) level. Layout design 200 includes other elements on other layout levels, not shown for ease of illustration.

Layout design 200 is usable to manufacture integrated circuit 300. Layout design 200 includes cell layout 201a, cell layout 201b, cell layout 201c and cell layout 201d. Cell layouts 201a, 201b, 201c and 201d are embodiments of corresponding layout designs 102a, 104a, 106a and 104b of FIG. 1, and similar detailed description is therefore omitted.

Cell layout 201a, 201b, 201c or 201d is usable to manufacture corresponding cell 301a, 301b, 301c and 301d (FIGS. 3A-3G), in accordance with some embodiments. In some embodiments, at least cell layout 201a, 201b, 201c or 201d is a standard cell layout.

Embodiments of the present disclosure use the term "cell layout" which is hereinafter also referred to as "cells" in the remainder of the present disclosure for brevity.

Cell 201a has cell boundaries 101a and 101b that extend in the first direction X. Cell 201b has cell boundaries 101b and 101c that extend in the first direction X. Cell 201c has cell boundaries 101c and 101d that extend in the first direction X. Cell 201d has cell boundaries 101d and 101e that extend in the first direction X.

In some embodiments, at least cell 201a, 201b, 201c or 201d is a standard cell, and layout design 200 corresponds to a layout of one or more standard cells defined by cell boundaries 101a, 101b, 101c, 101d and 101e. In some embodiments, at least cell 201a, 201b or 201d is a predefined portion of layout design 200 including one or more transistors and electrical connections configured to perform one or more circuit functions. In some embodiments, at least cell 201a, 201b, 201c or 201d is bounded by cell boundaries 101a, 101b, 101c, 101d and 101e in the second direction Y, and thus corresponds to a region of functional circuit components or devices that are part of a standard cell.

In some embodiments, e.g., the embodiments depicted in FIGS. 1-6D discussed below, cell 201a has cell boundaries 101a and 101b that are overlapped by corresponding conductive feature patterns 230 and 232, and are spaced apart by one or more conductive feature patterns 220. For example, in some embodiments, cell boundaries 101a and 101b of cell 201a are identified by corresponding conductive feature patterns 230 and 232. Similarly, in some embodiments, cell boundary 101c of cell 201b or 201c is identified by conductive feature pattern 234. In some embodiments, cell boundary 101d of cell 201c is identified by conductive feature pattern 234. In some embodiments, cell boundary 101e of cell 201d is identified by conductive feature pattern 236. In some embodiments, cell boundaries 101c and 101d of cell 201c are identified by buffer zone 206.

Cell 201a includes pairs of fin layout patterns 202a1, 202a2, . . . , 202aV (collectively referred to as a "set of fin layout patterns 202") extending in the first direction X. V is an integer and corresponds to a number of pairs of fin layout patterns in the set of fin layout patterns 202. A number of fin layout patterns NF in the set of fin layout patterns 202 is determined according to formula 1, and is expressed as:

$$NF = 2*V \qquad (1)$$

Embodiments of the present disclosure use the term "layout pattern" which is hereinafter also referred to as "patterns" in the remainder of the present disclosure for brevity.

Each pair of fin patterns 202a1, 202a2, . . . , 202aV includes two fin patterns. Other number of fin patterns in the pair of fin patterns 202a1, 202a2, . . . , 202aV are within the scope of the present disclosure. For example, in some embodiments, each pair of fin patterns 202a1, 202a2, . . . , 202aV includes three fin patterns, and each pair of fin patterns could also be referred to as each group of fin patterns. For example, in some embodiments, each group of fin patterns 202a1, 202a2, . . . , 202aV includes four fin patterns.

Each fin pattern of the set of fin patterns 202 is separated from one another in the second direction Y. The set of fin patterns 202 is usable to manufacture a corresponding set of fins 302 of integrated circuit 300. Each pair of fin patterns 202a1, 202a2, . . . , 202aV is usable to manufacture a corresponding pair of fins 302a1, 302a2, . . . , 302aV of a corresponding transistor in integrated circuit 300. Stated differently, each pair of fin patterns 202a1, 202a2, . . . , 202aV corresponds to a single transistor device.

In some embodiments, the set of fin patterns 202, 204 and 208 (described below) are part of one or more active regions of one or more n-type or p-type transistors in integrated circuit 300. The active region is also referred to as an oxide diffusion (OD) region that defines the source or drain diffusion regions of the one or more n-type or p-type transistors in integrated circuit 300. In some embodiments, the n-type transistors in integrated circuit 300 include n-type metal oxide semiconductor (NMOS) transistors. In some embodiments, the p-type transistors in integrated circuit 300 include p-type metal oxide semiconductor (PMOS) transistors.

Cell 201b includes fin patterns 204b1, 204b2, . . . , 204bW (collectively referred to as a "set of fin patterns 204") extending in the first direction X. W is an integer and corresponds to a number of fin patterns in the set of fin patterns 204 or 208. Integer W is equal to integer V. In some embodiments, integer W is different from integer V.

Each fin pattern 204b1, 204b2, . . . , 204bW includes one fin pattern. Each fin pattern of the set of fin patterns 204 is separated from one another in the second direction Y. The set of fin patterns 204 is usable to manufacture a corresponding set of fins 304 of integrated circuit 300. Each fin pattern 204b1, 204b2, . . . , 204bW is usable to manufacture a corresponding fin 304b1, 304b2, ..., 304bW of a corresponding transistor in integrated circuit 300. Stated differently, each fin pattern 204b1, 204b2, ..., 204bW corresponds to a single transistor device.

Cell 201c includes a buffer zone pattern 206. Buffer zone pattern 206 is usable to manufacture a corresponding buffer zone 306 of integrated circuit 300. Buffer zone pattern 206 is between set of fin patterns 204 and 208. Buffer zone pattern 206 is between cell boundaries 101c and 101d. In some embodiments, buffer zone pattern 206 is useable to designate a region of layout design 200 where no transistor devices are to be formed. In other words, buffer zone pattern 206 identifies a region of layout design 200 where no functional transistor devices are formed and no non-functional transistor devices (e.g., dummy devices) are formed. Buffer zone pattern 206 has a width W1a in the second direction Y. In some embodiments, buffer zone pattern 206 is inserted by a process such as method 700, 800 or 900 of corresponding FIG. 7, 8 or 9. In some embodiments, the inclusion of buffer zone pattern 206 in layout design 200 allows layout design 200 to satisfy one or more design rules (described below).

Cell 201d includes fin patterns 208d1, 208d2, ..., 208dW (collectively referred to as a "set of fin patterns 208") extending in the first direction X. In some embodiments, cell 201d and cell 201b are the same as each other. In other words, one of cell 201b or 201d is a copy of the other of cell 201b or 201d, in accordance with some embodiments.

Each fin pattern 208d1, 208d2, ..., 208dW includes one fin pattern. Each fin pattern of the set of fin patterns 208 is separated from one another in the second direction Y. The set of fin patterns 208 is usable to manufacture a corresponding set of fins 308 of integrated circuit 300. Each fin pattern 208d1, 208d2, ..., 208dW is usable to manufacture a corresponding fin 308d1, 308d2, ..., 308dW of a corresponding transistor in integrated circuit 300. Stated differently, each fin pattern 208d1, 208d2, ..., 208dW corresponds to a single transistor device.

In some embodiments, at least one fin pattern of the set of fin patterns 202, 204 and 208 has a same width (not labelled) in the second direction Y as another fin pattern of the set of fin patterns 202, 204 and 208. In some embodiments, at least one fin pattern of the set of fin patterns 202, 204 and 208 has a different width (not labelled) in the second direction Y as another fin pattern of the set of fin patterns 202, 204 and 208.

While the set of fin patterns 202, 204 and 208 of FIGS. 2A-2C, are described as being usable to manufacture corresponding fins 302, 304 and 308 of the active regions of FIGS. 3A-3G, it is understood that one or more of fin patterns 202, 204 and 208 can be replaced with corresponding nanosheets or nanowires patterns, and the corresponding nanosheet or nanowire patterns are useable to manufacture corresponding nanosheets or nanowires, in accordance with some embodiments.

Layout design 200B further includes at least conductive feature patterns 220a, 220b, 220c, 220d or 220e (collectively referred to as a "set of conductive feature patterns 220") extending in the first direction X. In some embodiments, at least the set of conductive feature patterns 220, 222 or 224 (described below) is also referred to as "a set of signal line patterns."

The set of conductive feature patterns 220 is over cell 201a. The set of conductive feature patterns 220 overlaps the set of fin patterns 202. The set of conductive feature patterns 220 is between cell boundaries 101a and 101b.

The set of conductive feature patterns 220 is shown with 5 metal routing tracks. Other number of routing tracks for the set of conductive feature patterns 220 are within the scope of the present disclosure.

Figure 3A:
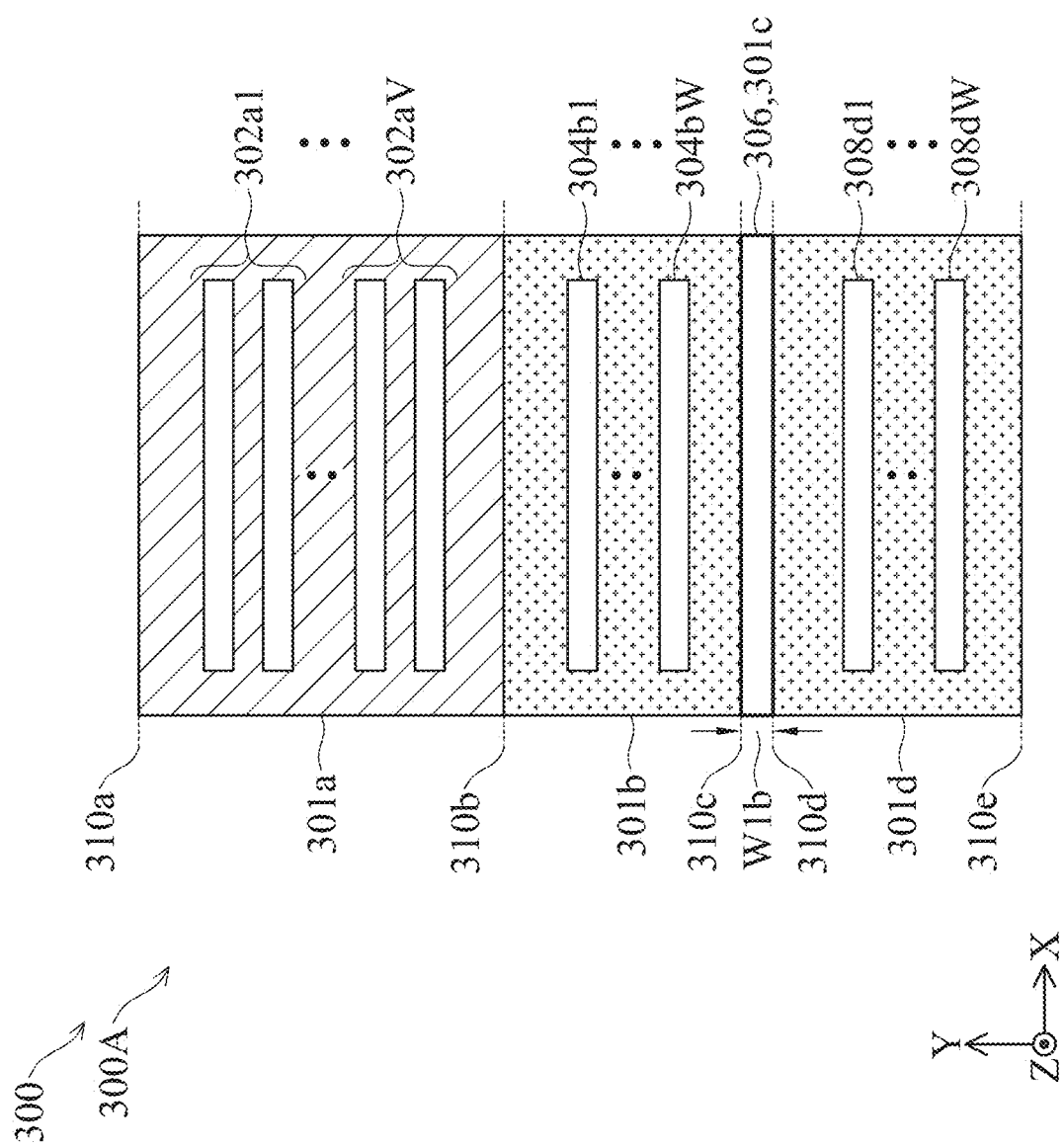
FIGS. 3A-3C are diagrams of a top view of an integrated circuit, in accordance with some embodiments.
Figure 3B:
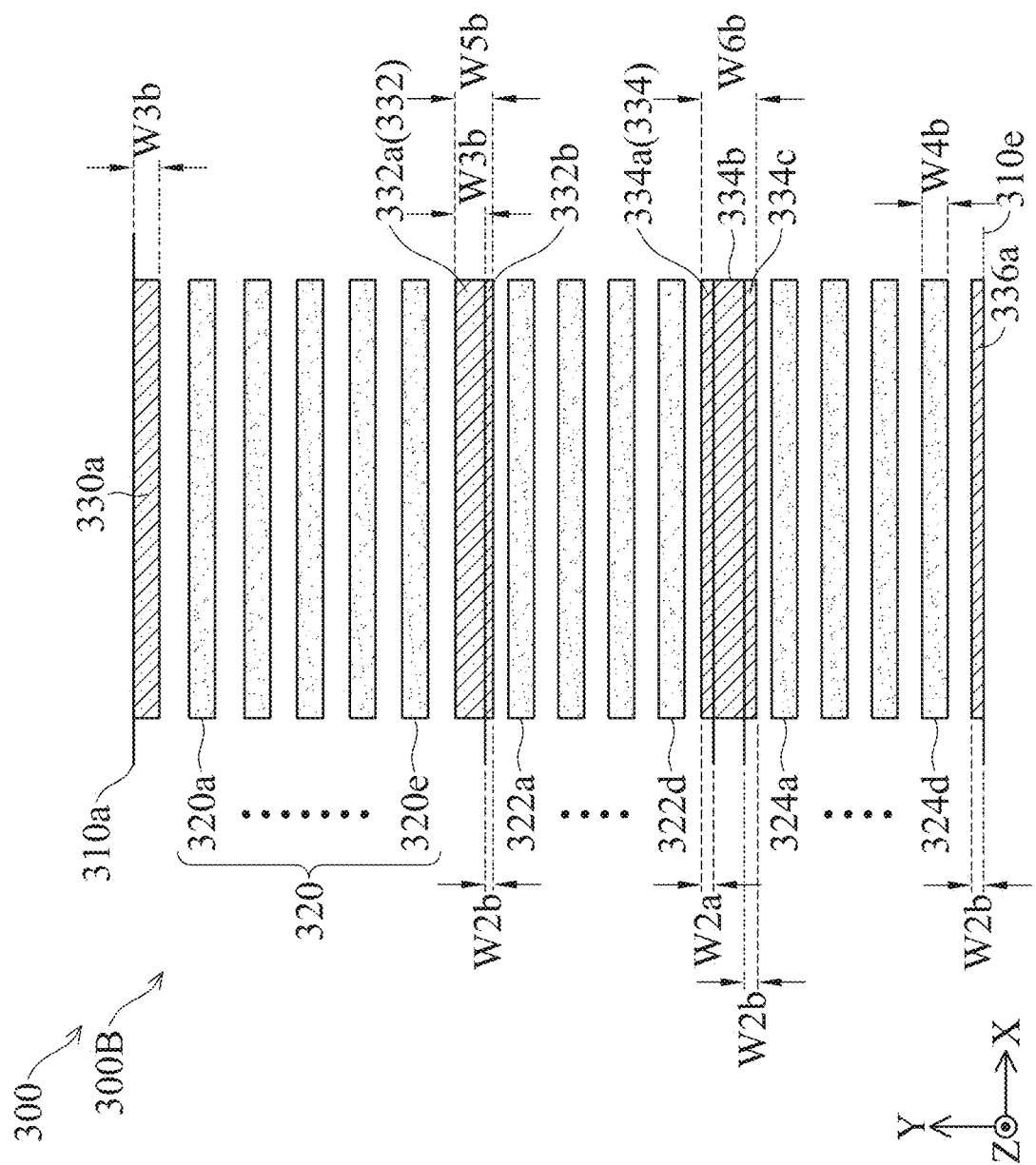

The set of conductive feature patterns 220 is usable to manufacture the set of conductive structures 320 of integrated circuit 300 (FIGS. 3A-3B). In some embodiments, conductive feature patterns 220a, 220b, 220c, 220d and 220e are usable to manufacture corresponding conductive structures 320a, 320b, 320c, 320d and 320e of integrated circuit 300 (FIGS. 3A-3G).

Each conductive feature pattern of the set of conductive feature patterns 220 is separated from an adjacent pattern of the set of conductive feature patterns 220 in at least the second direction Y by a pitch (not labelled). Each conductive feature pattern of the set of conductive feature patterns 220 has a corresponding width W4a in the second direction Y. In some embodiments, at least one width W4a of a conductive feature pattern of the set of conductive feature patterns 220 differs from at least one width W4a of another conductive feature pattern of the set of conductive feature patterns 220.

The set of conductive feature patterns 220 is on a second layout level different from the first layout level. In some embodiments, the second layout level corresponds to the metal zero (M0) level of one or more of layout designs 100, 200, 400A-400C, 500A-500E or 600A-600D (FIG. 1, 2A-2C, 4A-4C, 5A-5E or 6A-6D) or integrated circuit 300 (FIGS. 3A-3G). Other number of routing tracks, levels, quantities or configurations of the set of conductive feature patterns 220 are within the scope of the present disclosure. For example, while each conductive feature pattern of the set of conductive feature patterns 220 is shown as a continuous pattern, in some embodiments, one or more conductive feature patterns of the set of conductive feature patterns 220 is a discontinuous pattern.

Layout design 200B further includes at least conductive feature patterns 222a, 222b, 222c or 222d (collectively referred to as a "set of conductive feature patterns 222") extending in the first direction X.

The set of conductive feature patterns 222 is over cell 201b. The set of conductive feature patterns 222 overlaps the set of fin patterns 204. The set of conductive feature patterns 222 is between cell boundaries 101b and 101c.

The set of conductive feature patterns 222 is shown with 4 metal routing tracks. Other number of routing tracks for the set of conductive feature patterns 222 is within the scope of the present disclosure.

The set of conductive feature patterns 222 is usable to manufacture the set of conductive structures 322 of integrated circuit 300 (FIGS. 3A-3G). In some embodiments, conductive feature patterns 222a, 222b, 222c and 222d are usable to manufacture corresponding conductive structures 322a, 322b, 322c and 322d of integrated circuit 300 (FIGS. 3A-3G).

Each conductive feature pattern of the set of conductive feature patterns 222 is separated from an adjacent pattern of the set of conductive feature patterns 222 in at least the second direction Y by a pitch (not labelled). Each conductive feature pattern of the set of conductive feature patterns 222 has a corresponding width W4a in the second direction Y. In some embodiments, at least one width W4a of a conductive feature pattern of the set of conductive feature patterns 222 differs from at least one width W4a of another conductive feature pattern of the set of conductive feature patterns 222.

The set of conductive feature patterns 222 is on the second layout level. Other number of routing tracks, levels, quantities or configurations of the set of conductive feature patterns 222 are within the scope of the present disclosure. For example, while each conductive feature pattern of the set of conductive feature patterns 222 is shown as a continuous pattern, in some embodiments, one or more conductive feature patterns of the set of conductive feature patterns 222 is a discontinuous pattern.

Layout design 200B further includes at least conductive feature patterns 224a, 224b, 224c or 224d (collectively referred to as a "set of conductive feature patterns 224") extending in the first direction X. In some embodiments, one of the set of conductive feature patterns 224 or the set of conductive feature patterns 222 is a copy of the other of the set of conductive feature patterns 224 or the set of conductive feature patterns 222.

The set of conductive feature patterns 224 is over cell 201d. The set of conductive feature patterns 224 overlaps the set of fin patterns 208. The set of conductive feature patterns 224 is between cell boundaries 101d and 101e.

The set of conductive feature patterns 224 is shown with 4 metal routing tracks. Other number of routing tracks for the set of conductive feature patterns 224 is within the scope of the present disclosure.

The set of conductive feature patterns 224 is usable to manufacture the set of conductive structures 324 of integrated circuit 300 (FIGS. 3A-3G). In some embodiments, conductive feature patterns 224a, 224b, 224c and 224d are usable to manufacture corresponding conductive structures 324a, 324b, 324c and 324d of integrated circuit 300 (FIGS. 3A-3G).

Each conductive feature pattern of the set of conductive feature patterns 224 is separated from an adjacent pattern of the set of conductive feature patterns 224 in at least the second direction Y by a pitch (not labelled). Each conductive feature pattern of the set of conductive feature patterns 224 has a corresponding width W4a in the second direction Y. In some embodiments, at least one width W4a of a conductive feature pattern of the set of conductive feature patterns 224 differs from at least one width W4a of another conductive feature pattern of the set of conductive feature patterns 224.

The set of conductive feature patterns 224 is on the second layout level. Other number of routing tracks, levels, quantities or configurations of the set of conductive feature patterns 224 are within the scope of the present disclosure. For example, while each conductive feature pattern of the set of conductive feature patterns 224 is shown as a continuous pattern, in some embodiments, one or more conductive feature patterns of the set of conductive feature patterns 224 is a discontinuous pattern.

In some embodiments, at least one width W4a of a conductive feature pattern of the set of conductive feature patterns 220, 222 or 224 differs from at least one width W4a of another conductive feature pattern of the set of conductive feature patterns 220, 222 or 224.

Layout design 200B further includes conductive feature patterns 230, 232, 234 and 236 extending in the first direction X. In some embodiments, each of conductive feature patterns 230, 232, 234 and 236 is also referred to as a corresponding power rail pattern.

Conductive feature patterns 230, 232, 234 and 236 are usable to manufacture corresponding conductive structures 330, 332, 334 and 336 of integrated circuit 300 (FIGS. 3A-3G).

Each of conductive feature patterns 230, 232, 234 and 236 is separated from another pattern of conductive feature patterns 230, 232, 234 and 236 in at least the second direction Y.

In some embodiments, conductive feature patterns 230 and 234 correspond to a first supply voltage, and conductive feature patterns 232 and 236 correspond to a second supply voltage different from the first supply voltage. In some embodiments, the first supply voltage is supply voltage VDD, and the second supply voltage is reference supply voltage VSS. In some embodiments, the first supply voltage is reference supply voltage VSS, and the second supply voltage is supply voltage VDD.

Conductive feature pattern 230 overlaps cell boundary 101a. Conductive feature pattern 230 includes conductive feature pattern 230a. Conductive feature pattern 230a is over at least cell 201a. Conductive feature pattern 230a is between cell boundaries 101a and 101b. A side of conductive feature pattern 230a in the first direction X is aligned with cell boundary 101a. Conductive feature pattern 230a has a width W3a in the second direction Y.

In some embodiments, conductive feature pattern 230 includes another conductive feature pattern, similar to conductive feature pattern 230a, 232a, 232b, 234a, 234c or 236a, along cell boundary 101a.

Conductive feature pattern 230a is usable to manufacture corresponding conductive structure 330a of integrated circuit 300 (FIGS. 3A-3G).

Conductive feature pattern 232 overlaps cell boundary 101b and cells 201a and 201b. Conductive feature pattern 232 is a single continuous pattern divided into conductive feature patterns 232a and 232b.

Conductive feature pattern 232a is over at least cell 201a. Conductive feature pattern 232b is over at least cell 201b.

Conductive feature pattern 232a is between cell boundaries 101a and 101b. Conductive feature pattern 232b is between cell boundaries 101b and 101c.

A side of conductive feature pattern 232a in the first direction X is aligned with cell boundary 101b. A side of conductive feature pattern 232b in the first direction X is aligned with cell boundary 101b. A mid-point of the conductive feature pattern 232 in the second direction Y is not aligned with cell boundary 101b in the first direction X.

Conductive feature pattern 232 has a width W5a in the second direction Y. Conductive feature pattern 232a has a width W3a in the second direction Y. Conductive feature pattern 232b has a width W2a in the second direction Y. Width W5a is equal to the sum of width W3a and width W2a. In some embodiments, the width W3a is greater than or equal to the width W4a of the set of conductive feature patterns 220, 222 or 224. In some embodiments, the width W2a is less than the width W4a of the set of conductive feature patterns 220, 222 or 224.

In some embodiments, if the width W3a is greater than or equal to the width W4a, then a resistance of power rails or conductive structures 332a manufactured by the corresponding power rail patterns or conductive feature patterns 232a is reduced. In some embodiments, if the width W3a is less than the width W4a, then the resistance of power rails or conductive structures 332a manufactured by the corresponding power rail patterns or conductive feature patterns 232a is increased.

Conductive feature patterns 232a and 232b are usable to manufacture corresponding conductive structures 332a and 332b of integrated circuit 300 (FIGS. 3A-3G).

Conductive feature pattern 234 overlaps cell boundaries 101c and 101d, and cells 201b, 201c and 201d. Conductive feature pattern 234 overlaps at least buffer zone pattern 206. Conductive feature pattern 234 is a single continuous pattern divided into conductive feature patterns 234a, 234b and 234c.

Conductive feature pattern 234a is over at least cell 201b. Conductive feature pattern 234b is over at least cell 201c. Conductive feature pattern 234c is over at least cell 201d.

Conductive feature pattern 234b is over at least buffer zone pattern 206. Each of conductive feature pattern 234b and buffer zone pattern 206 have a same width (e.g., width W1a).

Conductive feature pattern 234a is between cell boundaries 101b and 101c. Conductive feature pattern 234b is between cell boundaries 101c and 101d. Conductive feature pattern 234c is between cell boundaries 101d and 101e.

A side of conductive feature pattern 234a in the first direction X is aligned with cell boundary 101c. A first side of conductive feature pattern 234b in the first direction X is aligned with cell boundary 101c, and a second side of conductive feature pattern 234b in the first direction X is aligned with cell boundary 101d. A side of conductive feature pattern 234c in the first direction X is aligned with cell boundary 101d. A mid-point of the conductive feature pattern 234 in the second direction Y is not aligned with cell boundary 101c or 101d in the first direction X.

A mid-point of the conductive feature pattern 234 in the first direction X or the second direction Y is a mid-point of the buffer zone pattern 206 in the corresponding first direction X or the second direction Y.

Conductive feature pattern 234 has a width W6a in the second direction Y. Conductive feature pattern 234a has a width W2a in the second direction Y. Conductive feature pattern 234b has a width W1a in the second direction Y. Conductive feature pattern 234c has a width W2a in the second direction Y. Width W6a is equal to the sum of width W2a of conductive feature pattern 234a, width W1a of conductive feature pattern 234b and width W2a of conductive feature pattern 234c.

Conductive feature patterns 234a, 234b and 234c are usable to manufacture corresponding conductive structures 334a, 334b and 334c of integrated circuit 300 (FIGS. 3A-3G).

In some embodiments, the width W6a is substantially equal to the width W5a. In some embodiments, 2 elements are substantially equal to each other if the difference between the 2 elements is less than or equal to 5%.

In some embodiments, if the width W6a is substantially equal to the width W5a, then a resistance of power rails or conductive structures 334 manufactured by the corresponding power rail patterns or conductive feature patterns 234 is reduced, thereby resulting in increased efficiency of the power rails. In some embodiments, increased power efficiency of the power rails allows the power rails to be suitable for low power transistor devices (e.g., single fin transistor devices) similar to cells 201b and 201d.

In some embodiments, if the width W6a is not substantially equal to the width W5a, then the resistance of conductive structures 334 manufactured by the corresponding conductive feature patterns 234 is increased, thereby resulting in reduced power efficiency of the power rails.

Conductive feature pattern 236 overlaps cell boundary 101e. Conductive feature pattern 236 includes conductive feature pattern 236a. Conductive feature pattern 236a is over at least cell 201d. Conductive feature pattern 236a is between cell boundaries 101d and 101e. A side of conductive feature pattern 236a in the first direction X is aligned with cell boundary 101e. Conductive feature pattern 236a has a width W2a in the second direction Y.

In some embodiments, conductive feature pattern 236 includes another conductive feature pattern, similar to conductive feature pattern 230a, 232a, 232b, 234a, 234c or 236a, along cell boundary 101e.

Conductive feature pattern 236a is usable to manufacture corresponding conductive structure 336a of integrated circuit 300 (FIGS. 3A-3G).

Conductive feature patterns 230, 232, 234 and 236 are on the second layout level. Other number of routing tracks, levels, quantities or configurations of conductive feature patterns 230, 232, 234 and 236 are within the scope of the present disclosure.

In some embodiments, one or more design rules forbid the placement of adjacent cells that include corresponding single fin patterns since the width of power layout patterns that would overlap the adjacent cells would be too small, thereby causing an increase in the resistance of the power rail manufactured by the power layout pattern resulting in inefficient power rails for low power applications (e.g., single fin transistor devices).

Figure 7:
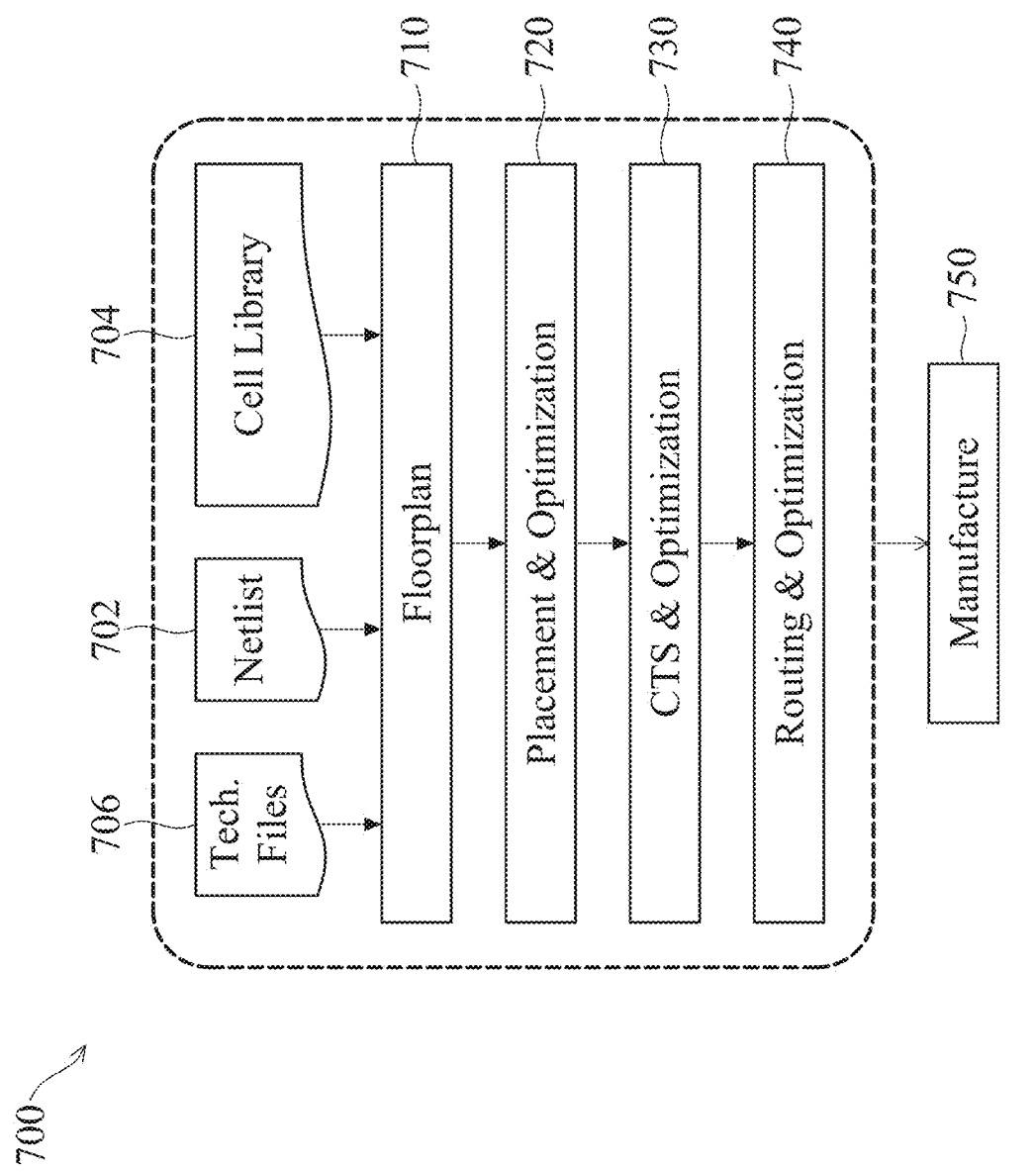
FIG. 7 is a functional flow chart of at least a portion of an IC design and manufacturing flow 700, in accordance with some embodiments.
Figure 8:
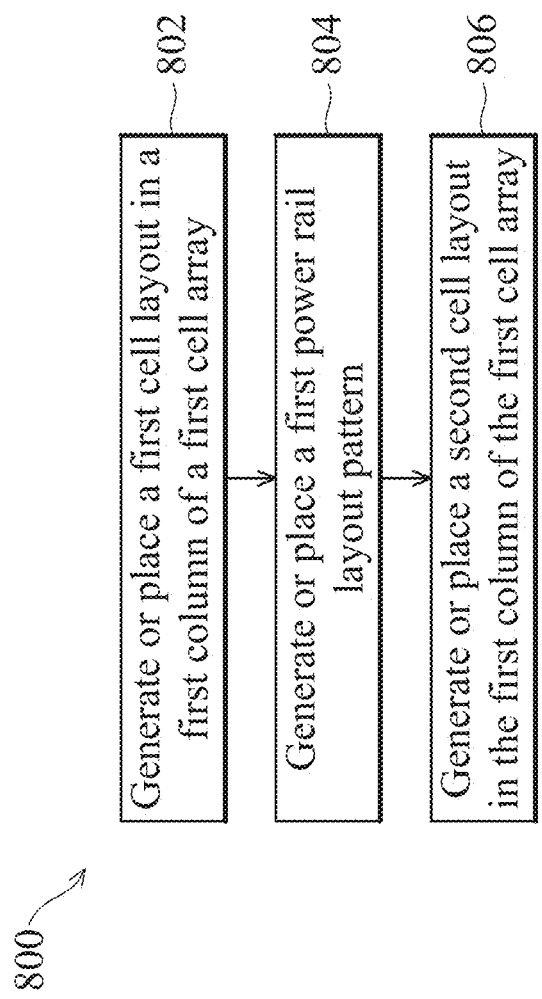
FIG. 8 is a flowchart of a method of generating a layout design of an integrated circuit, in accordance with some embodiments.
Figure 9:
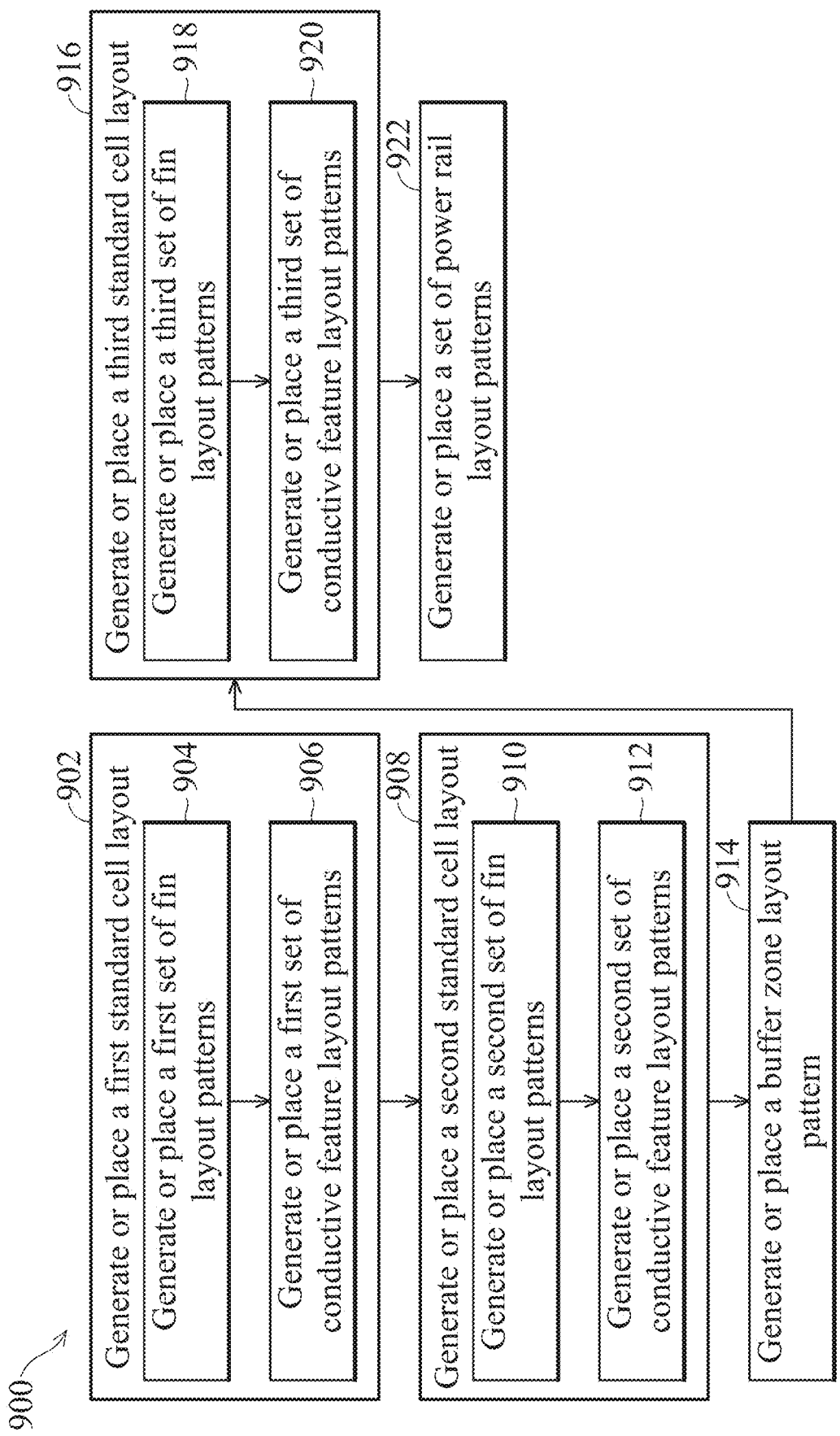
FIG. 9 is a flowchart of a method of generating a layout design of an integrated circuit, in accordance with some embodiments.

In some embodiments, buffer zone pattern 206 is inserted by a process such as method 700, 800 or 900 of corresponding FIG. 7, 8 or 9. By inserting buffer zone pattern 206, causes cell 201b and 201d to be separated from each other by at least width W1a, thereby causing the width W6a of conductive feature pattern 234 to be increased, and thus a resistance of conductive structure 334 manufactured by corresponding conductive feature pattern 234 is reduced, thereby resulting in increased efficiency of the power rails, and thus layout design 200 complies with the one or more design rules.

In some embodiments, the inclusion of buffer zone pattern 206 in layout design 200, allows layout design 200 to be a more flexible design than other approaches by allowing the use of more single fin cells (e.g., cells 201b and 201d) in a hybrid cell more suitable for low power applications.

Other configurations, arrangements on other layout levels or quantities of elements in layout design 200 are within the scope of the present disclosure.

Figure 3C:
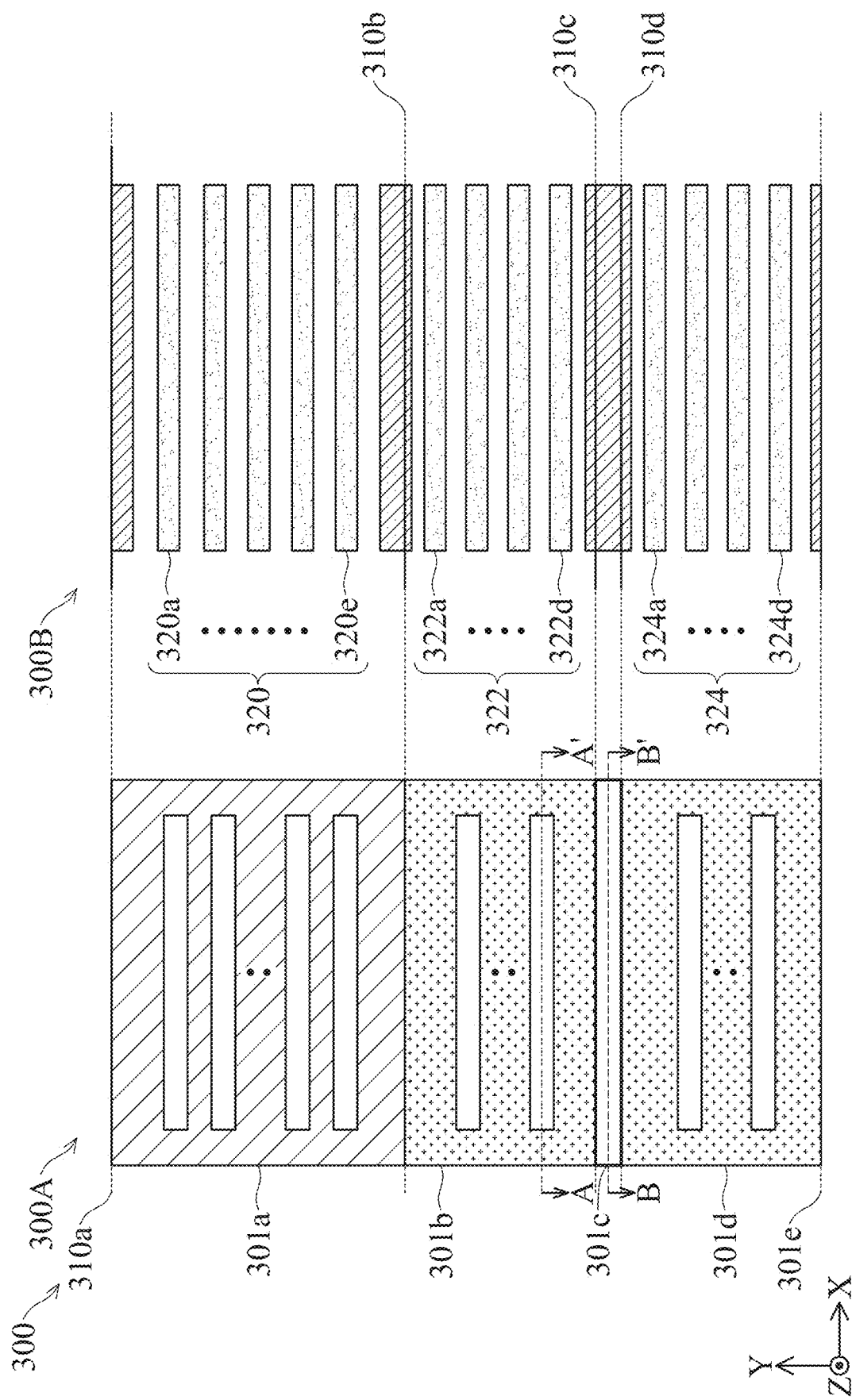
Figure 3D:
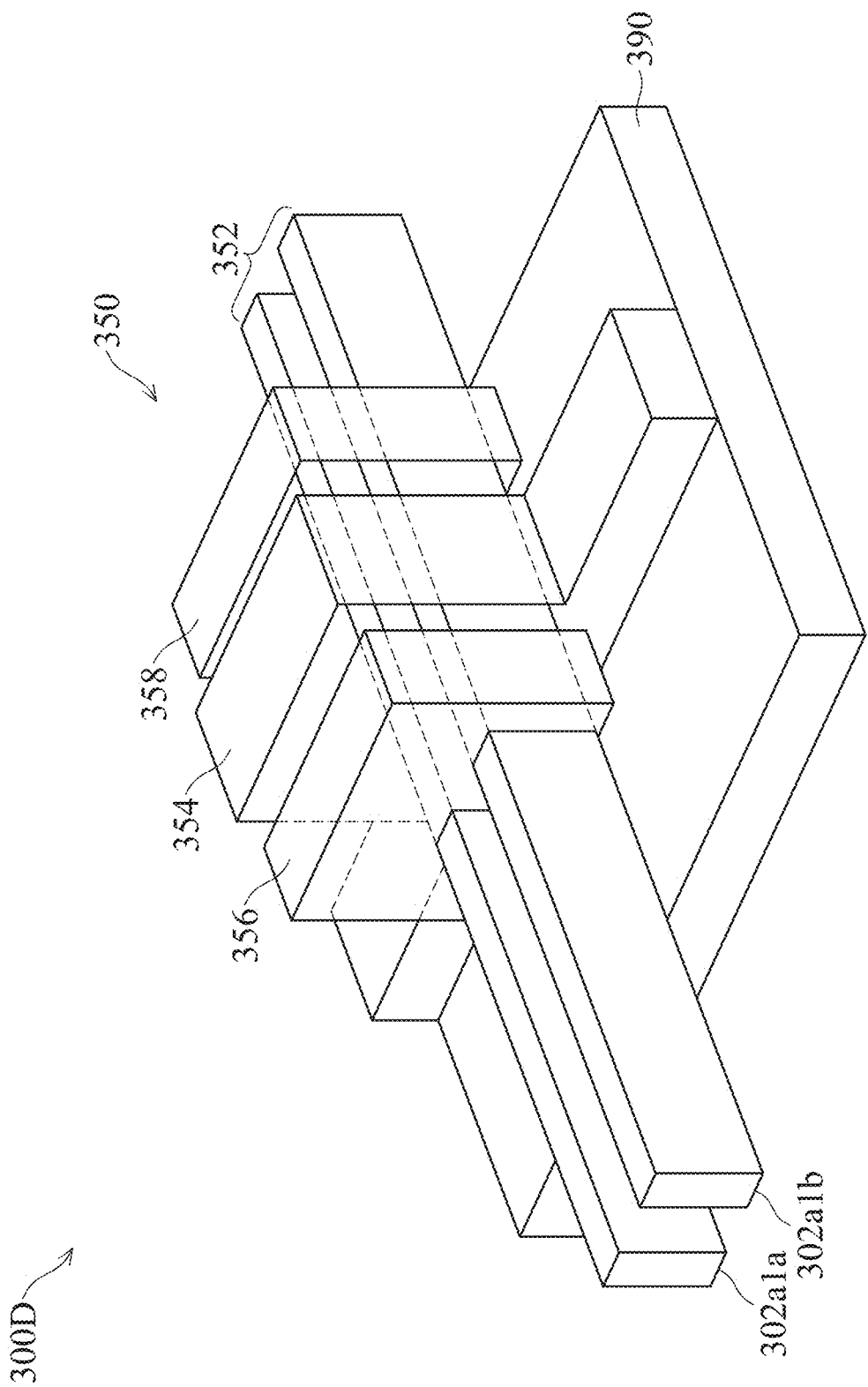
FIGS. 3D-3E are perspective views of finFETs of integrated circuit, in accordance with some embodiments.
Figure 3E:
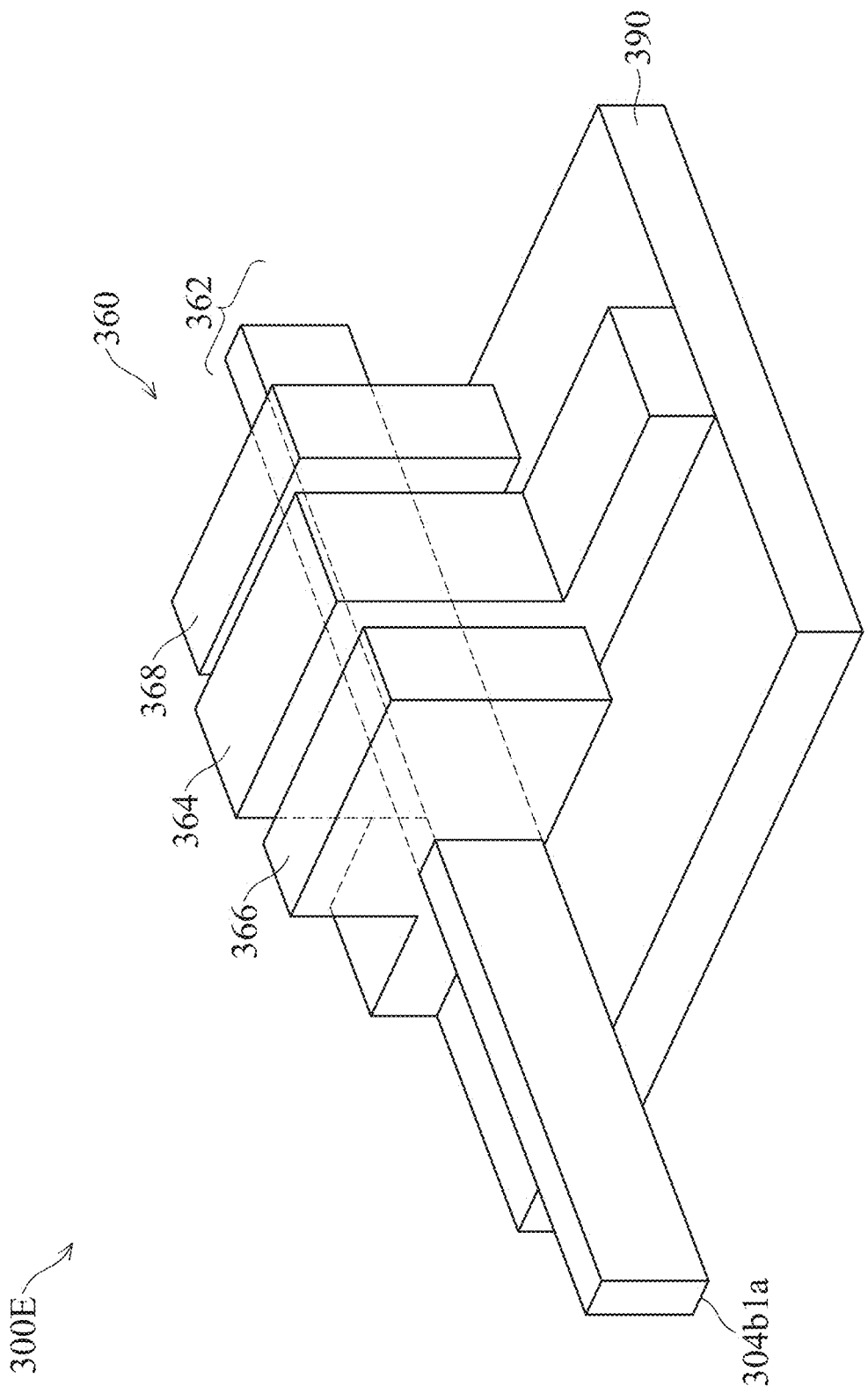
Figure 3F:
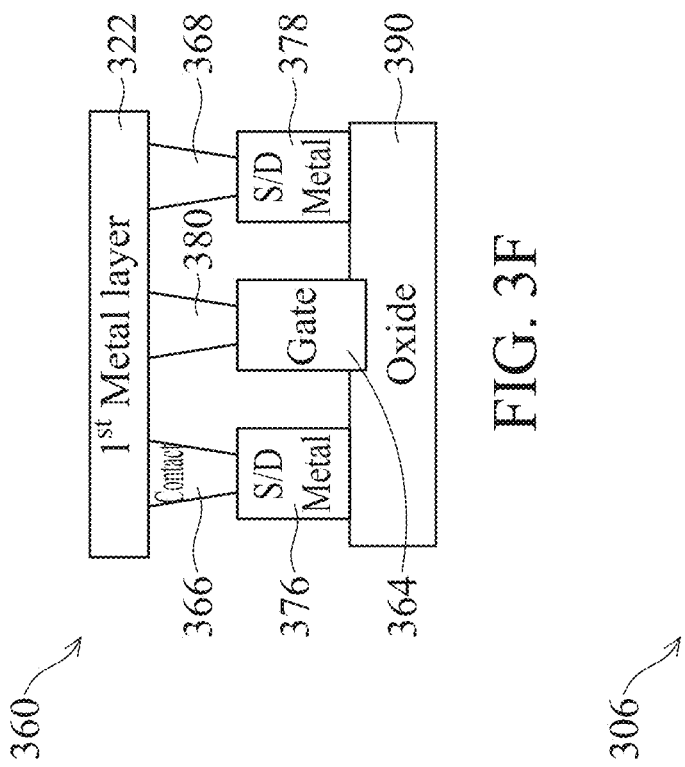
FIG. 3F is a cross-sectional view of integrated circuit as intersected by plane A-A', in accordance with some embodiments.
Figure 3G:
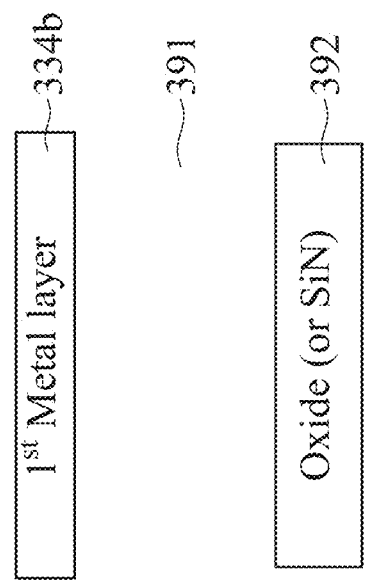
FIG. 3G is a cross-sectional view of integrated circuit as intersected by plane B-B', in accordance with some embodiments.

FIGS. 3A-3C are diagrams of a top view of an integrated circuit 300, in accordance with some embodiments. FIGS. 3D-3E are perspective views of finFETs 350 and 360 of integrated circuit 300, in accordance with some embodiments. FIG. 3F is a cross-sectional view of integrated circuit 300 as intersected by plane A-A', in accordance with some embodiments. FIG. 3G is a cross-sectional view of integrated circuit 300 as intersected by plane B-B', in accordance with some embodiments.

FIG. 3A is a diagram of a portion 300A of integrated circuit 300, simplified for ease of illustration. FIG. 3B is a diagram of a portion 300B of integrated circuit 300, simplified for ease of illustration. FIG. 3C is a diagram of integrated circuit 300 and includes each of portions 300A and 300B next to each other for ease of illustration.

Portion 300A includes one or more features of integrated circuit 300 of the OD level or of integrated circuit 300. Portion 300B includes one or more features of integrated circuit 300 of a metal 0 (M0) level. Integrated circuit 300 includes other elements on other layout levels, not shown for ease of illustration.

Integrated circuit 300 is manufactured by layout design 200. Structural relationships including alignment, distances, lengths and widths, as well as configurations of at least integrated circuit 300 of FIGS. 3A-3G are similar to the corresponding structural relationships and corresponding configurations of at least layout design 100 of FIG. 1, 200 of FIGS. 2A-2C, 400 of FIGS. 4A-4C, 500A-500E of FIGS. 5A-5E, 600A-600D of FIGS. 6A-6D, and similar detailed description will not be described in FIGS. 1, 2A-2C, 3A-3G, 4A-4C, 5A-5E, 6A-6D for brevity. For example, in some embodiments, at least width W1a, W2a, W3a, W4a, W5a or W6a of layout design 200 is similar to corresponding widths W1b, W2b, W3b, W4b, W5b or W6b of integrated circuit 300, and similar detailed description is omitted for brevity.

For example, in some embodiments, at least one or more widths, lengths or pitches of layout design 100 or 200 is similar to corresponding widths, lengths or pitches of integrated circuit 300, and similar detailed description is omitted for brevity. For example, in some embodiments, at least cell boundaries 101a, 101b, 101c or 101d of layout design 100 or 200 is similar to at least corresponding cell boundaries 310a, 310b, 310c or 310d of integrated circuit 300, and similar detailed description is omitted for brevity.

Integrated circuit 300 includes at least cells 301a, 301b, 301c and 301d, set of conductive structures 320, 322 and 324 and conductive structures 330, 332, 334 and 336.

In some embodiments, each set of conductive structures 320, 322 and 324 is also referred to as a corresponding set of power rails. In some embodiments, each of conductive structures 330, 332, 334 and 336 is also referred to as a corresponding power rail.

Cell 301a has cell boundaries 310a and 310b that extend in the first direction X. Cell 301b has cell boundaries 310b and 310c that extend in the first direction X. Cell 301c has cell boundaries 310c and 310d that extend in the first direction X. Cell 301d has cell boundaries 310d and 310e that extend in the first direction X.

In some embodiments, at least cell 301a, 301b, 301c or 301d is a standard cell defined by cell boundaries 310a, 310b, 310c, 310d and 310e. In some embodiments, at least cell 301a, 301b or 301d is a predefined portion of integrated circuit 300 including one or more transistors and electrical connections configured to perform one or more circuit functions. In some embodiments, at least cell 301a, 301b, 301c or 301d is bounded by cell boundaries 310a, 310b, 310c, 310d and 310e in the second direction Y, and thus corresponds to a region of functional circuit components or devices that are part of a standard cell.

In some embodiments, cell 301a has cell boundaries 310a and 310b that are overlapped by corresponding conductive structures 330 and 332, and are spaced apart by one or more conductive structures 320. For example, in some embodiments, cell boundaries 310a and 310b of cell 301a are identified by corresponding conductive structures 330 and 332. Similarly, in some embodiments, cell boundary 310c of cell 301b or 301c is identified by conductive structure 334. In some embodiments, cell boundary 310d of cell 301c is identified by conductive structure 334. In some embodiments, cell boundary 310e of cell 301d is identified by conductive structure 336. In some embodiments, cell boundaries 310c and 310d of cell 301c is identified by buffer zone 306.

Cell 301a includes pairs of fins 302a1, 302a2, ..., 302aV (collectively referred to as a "set of fins 302"). V is an integer and corresponds to a number of pairs of fins in the set of fins 302. The number of fins NF in cell 301a is determined according to formula 1 (described earlier).

Each pair of fins 302a1, 302a2, ..., 302aV includes two fins. Other number of fins in the pair of fins 302a1, 302a2, ..., 302aV is within the scope of the present disclosure. For example, in some embodiments, each pair of fins 302a1, 302a2, ..., 302aV includes three fins, and each pair of fins could also be referred to as each group of fins. For example, in some embodiments, each group of fins 302a1, 302a2, ..., 302aV includes four fins.

Each pair of fins 302a1, 302a2, ..., 302aV corresponds to a single n-type or p-type finFET device. In some embodiments, the set of fins 302, 304 and 308 are part of source or drain diffusion regions of the one or more n-type or p-type finFETs in integrated circuit 300. In some embodiments, the n-type finFETs in integrated circuit 300 include NMOS transistors. In some embodiments, the p-type finFETs in integrated circuit 300 include PMOS transistors.

Cell 301b includes fins 304b1, 304b2, ..., 304bW (collectively referred to as a "set of fins 304"). W is an integer and corresponds to a number of fins in the set of fins 304 or 308.

Each fin 304b1, 304b2, ..., 304bW includes one fin. Each fin 304b1, 304b2, ..., 304bW corresponds to a single n-type or p-type finFET device.

Cell 301c includes buffer zone 306. Buffer zone 306 is between set of fins 304 and 308. Buffer zone 306 is between cell boundaries 310c and 310d. In some embodiments, buffer zone 306 is useable to designate a region of integrated circuit 300 that does not include transistor devices. In some embodiments, buffer zone 306 identifies a region of integrated circuit 300 where no functional transistor devices are formed and no non-functional transistor devices (e.g., dummy devices) are formed. Buffer zone 306 has a width W1b in the second direction Y. In some embodiments, the inclusion of buffer zone 306 in integrated circuit 300 allows integrated circuit 300 to satisfy one or more design rules (described below).

Cell 301d includes fins 308d1, 308d2, ..., 308dW (collectively referred to as a "set of fins 308"). Each fin 308d1, 308d2, ..., 308dW includes one fin. Each fin 308d1, 308d2, ..., 308dW corresponds to a single n-type or p-type finFET device.

In some embodiments, one or more fins of the set of fins 302, 304 and 308 can be replaced with corresponding nanosheets or nanowires.

The set of conductive structures 320 includes at least conductive structures 320a, 320b, 320c, 320d or 320e. The set of conductive structures 320 is over cell 301a. The set of conductive structures 320 overlaps the set of fins 302. The set of conductive structures 320 is between cell boundaries 310a and 310b.

The set of conductive structures 320 is shown with 5 metal routing tracks. Other number of routing tracks for the set of conductive structures 320 is within the scope of the present disclosure.

Each conductive structure of the set of conductive structures 320 has a corresponding width W4b in the second direction Y.

The set of conductive structures 322 includes at least conductive structures 322a, 322b, 322c or 322d. The set of conductive structures 322 is over cell 301b. The set of conductive structures 322 overlaps the set of fins 304. The set of conductive structures 322 is between cell boundaries 310b and 310c. Each conductive structure of the set of conductive structures 322 has a corresponding width W4b in the second direction Y. The set of conductive structures 324 includes at least conductive structures 324a, 324b, 324c or 324d.

The set of conductive structures 324 is over cell 301d. The set of conductive structures 324 overlaps the set of fins 308. The set of conductive structures 324 is between cell boundaries 310d and 310e.

Each conductive structure of the set of conductive structures 324 has a corresponding width W4b in the second direction Y. The set of conductive structures 322 and 324 is shown with 4 metal routing tracks. Other number of routing tracks for at least the set of conductive structures 322 or 324 is within the scope of the present disclosure.

In some embodiments, at least one width W4*b* of a conductive structure of the set of conductive structures 320, 322 or 324 differs from at least one width W4*b* of another conductive structure of the set of conductive structures 320, 322 or 324.

Other number of routing tracks, widths, levels, quantities or configurations of the set of conductive structures 320, 322 or 324 are within the scope of the present disclosure.

In some embodiments, conductive structures 330 and 334 are corresponding power rails configured to supply a first supply voltage, and conductive structures 332 and 336 are corresponding power rails configured to supply a second supply voltage different from the first supply voltage. In some embodiments, the first supply voltage is supply voltage VDD, and the second supply voltage is reference supply voltage VSS. In some embodiments, the first supply voltage is reference supply voltage VSS, and the second supply voltage is supply voltage VDD.

Conductive structure 330 includes conductive structure 330*a*. In some embodiments, conductive structure 330 includes another conductive structure, similar to conductive structure 330*a*, 332*a*, 332*b*, 334*a*, 334*c* or 336*a*, along cell boundary 310*a*.

Conductive structure 330 overlaps cell boundary 310*a*. Conductive structure 330 includes conductive structure 330*a*. Conductive structure 330*a* is over at least cell 301*a*. Conductive structure 330*a* is between cell boundaries 310*a* and 310*b*. A side of conductive structure 330*a* in the first direction X is aligned with cell boundary 310*a*. Conductive structure 330*a* has a width W3*b* in the second direction Y.

In some embodiments, conductive structure 330 includes another conductive structure, similar to conductive structure 330*a*, 332*a*, 332*b*, 334*a*, 334*c* or 336*a*, along cell boundary 310*a*.

Conductive structure 332 overlaps cell boundary 310*b* and cells 301*a* and 301*b*. Conductive structure 332 is a single continuous structure divided into conductive structures 332*a* and 332*b*.

Conductive structure 332*a* is over at least cell 301*a*. Conductive structure 332*b* is over at least cell 301*b*. Conductive structure 332*a* is between cell boundaries 310*a* and 310*b*. Conductive structure 332*b* is between cell boundaries 310*b* and 310*c*.

A side of conductive structure 332*a* in the first direction X is aligned with cell boundary 310*b*. A side of conductive structure 332*b* in the first direction X is aligned with cell boundary 310*b*. A mid-point of the conductive structure 332 in the second direction Y is not aligned with cell boundary 310*b* in the first direction X.

Conductive structure 332 has a width W5*b* in the second direction Y. Conductive structure 332*a* has a width W3*b* in the second direction Y. Conductive structure 332*b* has a width W2*b* in the second direction Y. Width W5*b* is equal to the sum of width W3*b* and width W2*b*. In some embodiments, the width W3*b* is greater than or equal to the width W4*b* of the set of conductive structures 320, 322 or 324. In some embodiments, the width W2*b* is less than the width W4*b* of the set of conductive structures 320, 322 or 324.

In some embodiments, if the width W3*b* is greater than or equal to the width W4*b*, then a resistance of power rails or conductive structures 332*a* is reduced. In some embodiments, if the width W3*b* is less than the width W4*b*, then the resistance of power rails or conductive structures 332*a* is increased.

Conductive structure 334 overlaps cell boundaries 310*c* and 310*d*, and cells 301*b*, 301*c* and 301*d*. Conductive structure 334 overlaps at least buffer zone 306. Conductive structure 334 is a single continuous structure divided into conductive structures 334*a*, 334*b* and 334*c*.

Conductive structure 334*a* is over at least cell 301*b*. Conductive structure 334*b* is over at least cell 301*c*. Conductive structure 334*c* is over at least cell 301*d*. Conductive structure 334*b* is over at least buffer zone 306. Each of conductive structure 334*b* and buffer zone 306 have a same width (e.g., width W1*b*).

Conductive structure 334*a* is between cell boundaries 310*b* and 310*c*. Conductive structure 334*b* is between cell boundaries 310*c* and 310*d*. Conductive structure 334*c* is between cell boundaries 310*d* and 310*e*.

A side of conductive structure 334*a* in the first direction X is aligned with cell boundary 310*c*. A first side of conductive structure 334*b* in the first direction X is aligned with cell boundary 310*c*, and a second side of conductive structure 334*b* in the first direction X is aligned with cell boundary 310*d*. A side of conductive structure 334*c* in the first direction X is aligned with cell boundary 310*d*. A mid-point of the conductive structure 334 in the second direction Y is not aligned with cell boundary 310*c* or 310*d* in the first direction X.

A mid-point of the conductive structure 334 in the first direction X or the second direction Y is a mid-point of the buffer zone 306 in the corresponding first direction X or the second direction Y.

Conductive structure 334 has a width W6*b* in the second direction Y. Conductive structure 334*a* has a width W2*b* in the second direction Y. Conductive structure 334*b* has a width W1*b* in the second direction Y. Conductive structure 334*c* has a width W2*b* in the second direction Y. Width W6*b* is equal to the sum of width W2*b* of conductive structure 334*a*, width W1*b* of conductive structure 334*b* and width W2*b* of conductive structure 334*c*.

In some embodiments, the width W6*b* is substantially equal to the width W5*b*.

In some embodiments, if the width W6*b* is substantially equal to the width W5*b*, then a resistance of power rails or conductive structures 334 is reduced, thereby resulting in increased efficiency of the power rails or conductive structures 334. In some embodiments, increased power efficiency of the power rails or conductive structures 334 allows the power rails or conductive structures 334 to be suitable for low power transistor devices (e.g., single fin finFET devices) similar to cells 301*b* and 301*d*.

In some embodiments, if the width W6*b* is not substantially equal to the width W5*b*, then the resistance of conductive structures 334 is increased, thereby resulting in reduced power efficiency of the power rails or conductive structures 334.

Conductive structure 336 overlaps cell boundary 310*e*. Conductive structure 336 includes conductive structure 336*a*. Conductive structure 336*a* is over at least cell 301*d*. Conductive structure 336*a* is between cell boundaries 310*d* and 310*e*. A side of conductive structure 336*a* in the first direction X is aligned with cell boundary 310*e*. Conductive structure 336*a* has a width W2*b* in the second direction Y.

In some embodiments, conductive structure 336 includes another conductive structure, similar to conductive structure 330*a*, 332*a*, 332*b*, 334*a*, 334*c* or 336*a*, along cell boundary 310*e*.

Other number of routing tracks, levels, quantities or configurations of conductive structures 330, 332, 334 and 336 are within the scope of the present disclosure.

In some embodiments, one or more design rules forbid the placement of adjacent cells that include corresponding single fins since the width of power rails that would overlap the adjacent cells would be too small, thereby causing an increase in the resistance of the power rail resulting in inefficient power rails for low power applications (e.g., single fin finFET devices).

In some embodiments, buffer zone 306 is inserted by a process such as method 700, 800 or 900 of corresponding FIG. 7, 8 or 9. By inserting buffer zone 306, causes cell 301$b$ and 301$d$ to be separated from each other by at least width W1$b$, thereby causing the width W6$b$ of conductive structure 334 to be increased, and thus a resistance of conductive structure 334 is reduced, thereby resulting in increased efficiency of the power rails (e.g., conducive structures 330, 332, 334 and 336), and thus integrated circuit 300 complies with the one or more design rules.

In some embodiments, the inclusion of buffer zone 306 in integrated circuit 300, allows integrated circuit 300 to be a more flexible IC than other approaches by allowing the use of more single fin cells (e.g., cells 301$b$ and 301$d$) in a hybrid cell more suitable for low power applications.

In some embodiments, buffer zone 306 includes a non-conductive material. In some embodiments, buffer zone 306 includes an insulating material. In some embodiments, buffer zone 306 includes a shallow trench isolation (STI) structure. In some embodiments, buffer zone 306 includes a semiconducting material. In some embodiments, buffer zone 306 includes at least one of an Oxide, SiN, or combinations thereof.

In some embodiments, at least one conductive structure of the set of conductive structures 320, at least one conductive structure of the set of conductive structures 322, at least one conductive structure of the set of conductive structures 324, conductive structure 330, conductive structure 332, conductive structure 334 or conductive structure 336 includes one or more layers of a conductive material, a metal, a metal compound or a doped semiconductor. In some embodiments, the conductive material includes Tungsten, Cobalt, Ruthenium, Copper, or the like or combinations thereof. In some embodiments, a metal includes at least Cu (Copper), Co, W, Ru, Al, or the like. In some embodiments, a metal compound includes at least AlCu, W—TiN, TiSix, NiSix, TiN, TaN, or the like. In some embodiments, a doped semiconductor includes at least doped silicon, or the like.

Other materials, configurations, arrangements on other layout levels or quantities of elements in integrated circuit 300 are within the scope of the present disclosure.

FIGS. 3D-3E are perspective views of finFETs 350 and 360, in accordance with some embodiments.

FinFET 350 includes an active region 352 formed over substrate 390. In some embodiments, active region 352 includes 2 fins (e.g., fin structures 302$a$1$a$ and 302$a$1$b$). For example, in some embodiments, fin structures 302$a$1$a$ and 302$a$1$b$ correspond to at least pair of fins 302$a$1, 302$a$2, . . . , 302$a$V in FIGS. 3A & 3C. In some embodiments, substrate 390 is an oxide material.

FinFET 360 includes an active region 362 formed over substrate 390. In some embodiments, active region 362 includes 1 fin (e.g., fin structure 304$b$1$a$). For example, in some embodiments, fin structure 304$b$1$a$ corresponds to at least fin 304$b$1, 304$b$2, . . . , 304$b$W in FIGS. 3A & 3C. For example, in some embodiments, fin structure 304$b$1$a$ corresponds to at least fin 308$d$1, 308$d$2, . . . , 308$d$W in FIGS. 3A & 3C.

In FIG. 3D, finFET 350 is formed over two fin structures 302$a$1$a$ and 302$a$1$b$ in active region 352. A gate of finFET 350 is formed by gate 354 over fin structures 302$a$1$a$ and 302$a$1$b$. One of the source terminal or drain terminal of finFET 350 is formed by a contact 356 over fin structures 302$a$1$a$ and 302$a$1$b$. The other of the source terminal or drain terminal of finFET 350 is formed by a contact 358 over fin structures 302$a$1$a$ and 302$a$1$b$.

In FIGS. 3E-3F, finFET 360 is formed over one fin structure 304$b$1$a$ in active region 362. A gate of finFET 360 is formed by gate 364 over fin structure 304$b$1$a$. One of the source terminal or drain terminal 376 of finFET 360 is formed by a contact 366 over fin structure 304$b$1$a$. The other of the source terminal or drain terminal 378 of finFET 360 is formed by a contact 368 over fin structure 304$b$1$a$. In some embodiments, the gate 364 is coupled to the set of conductive structures 322 by a gate contact 380.

In some embodiments, the number of fin structures in finFET 350 is greater than the number of fin structures in finFET 360. Other configurations or number of fin structures in active region 352 or 362 are within the scope of the present disclosure.

In some embodiments, the number of gates in finFET 350 is greater than the number of gates in finFET 360. Other configurations or number of gates for at least gate 354 or 364 are within the scope of the present disclosure.

Other configurations, arrangements on other layout levels or quantities of elements in integrated circuit 300 are within the scope of the present disclosure.

In FIG. 3G, the buffer zone 306 is shown. Buffer zone 306 includes conductive structure 334, an insulating region 391 and a substrate 392. Conductive structure 334$b$ overlaps buffer zone 306 and substrate 392. In some embodiments, substrate 392 includes at least one of oxide, SiN or combinations thereof. In some embodiments, substrate 392 is integrally formed with substrate 390.

In some embodiments, conductive structure 334$b$ is separated from substrate 392 by insulating region 391. In some embodiments insulating region 391 is integrally formed with substrate 392. In some embodiments, insulating region 391 includes at least one of oxide, SiN or combinations thereof.

In some embodiments, the buffer zone 306 includes a dummy transistor structure similar to FinFET 360 of FIG. 3F, but the dummy transistor is non-functional or does not include an active region.

FIG. 4A is a diagram of a layout design 400A of an integrated circuit, in accordance with some embodiments. Layout design 400A is a layout diagram of an integrated circuit similar to integrated circuit 300 of FIGS. 3A-3G, in accordance with some embodiments.

Layout design 400A is an embodiment of layout design 100 of FIG. 1, and similar detailed description is omitted for brevity.

For brevity FIGS. 4A-4C, 5A-5E, and 6A-6D are described as a corresponding layout design 400A-400C, 500A-500E and 600A-600D, but in some embodiments, FIGS. 4A-4C, 5A-5E, and 6A-6D also correspond to integrated circuits similar to integrated circuit 300, and layout patterns of layout design 400A-400C, 500A-500E and 600A-600D also correspond to structural elements of an integrated circuit, and structural relationships including alignment, lengths and widths, as well as configurations and layers of corresponding layout design 400A-400C, 500A-500E and 600A-600D are similar to the structural relationships and configurations and layers of a corresponding integrated circuit, and similar detailed description will not be described for brevity.

In some embodiments, at least layout design 400A-400C, 500A-500E and 600A-600D are useable to manufacture a corresponding integrated circuit similar to integrated circuit 300, and similar detailed description is therefore omitted.

Layout design 400A is a variation of layout design 200 (FIGS. 2A-2C), and similar detailed description is therefore omitted. For example, layout design 400A illustrates an example of where another buffer zone (e.g., buffer zone 452) and another set of fins (e.g., set of fins 450) are added to portion 200A of layout design 200.

Layout design 400A includes at least cells 201a, 201b, 201c, 201d and cell 402a.

Cell 402a includes cell 402a1 and cell 402a2. In comparison with portion 200A of layout design 200, cell 402a1 is similar to at least cell 201b or 201d, cell 402a2 is similar to cell 201c, and similar detailed description is therefore omitted.

Cell 402a1 includes set of fins 450.

Cell 402a2 includes buffer zone 452.

In comparison with portion 200A of layout design 200, set of fins 450 is similar to at least set of fins 204 or 208, and buffer zone 452 is similar to buffer zone 206, and similar detailed description is therefore omitted.

As shown in FIG. 4A, a ratio of sets of multiple fin cells to sets of single fin cells in layout design 400A is shown as A:B. For example, each pair of fin patterns in the set of fin patterns 202 in cell A corresponds to a single finFET device, and each fin pattern in at least the set of fin patterns 204, 208 or 450 in cell B corresponds to a single finFET device. By including cell 402a, layout design 400A has a ratio of 1:3.

A cell 410 includes cell 201a and cell 201b.

In some embodiments, layout design 400A achieves one or more of the benefits discussed above in at least FIGS. 2A-2C and 3A-3G.

Other configurations, arrangements on other layout levels or quantities of elements in layout design 400A are within the scope of the present disclosure.

FIG. 4B is a diagram of a layout design 400B of an integrated circuit, in accordance with some embodiments. Layout design 400B is a layout diagram of an integrated circuit similar to integrated circuit 300 of FIGS. 3A-3G, in accordance with some embodiments.

Layout design 400B is an embodiment of layout design 100 of FIG. 1, and similar detailed description is omitted for brevity.

Layout design 400B is a variation of layout design 400A, and similar detailed description is therefore omitted. For example, layout design 400B illustrates an example of where J–2 buffer zones (e.g., buffer zone 452) and J–2 sets of fins (e.g., set of fins 450) are added to portion 200A of layout design 200, where J is an integer. Stated differently, layout design 400B includes J–1 buffer zones (e.g., buffer zone 452) and J sets of single fin structures (e.g., set of fins 450).

As shown in FIG. 4B, a ratio of sets of multiple fin cells to sets of single fin cells in layout design 400B is shown as A:B. By including cell 404, layout design 400B has a ratio of 1:J.

Layout design 400B includes portion 200A and cell 402b. Cell 402b includes J–2 copies of cell 402a1 of FIG. 4A and J–2 copies of cell 402a2 of FIG. 4A, and similar detailed description is therefore omitted.

A cell 404 includes cells 201b, 201c and 201d, and cell 402b.

In some embodiments, layout design 400B achieves one or more of the benefits discussed above in at least FIGS. 2A-2C and 3A-3G.

Other configurations, arrangements on other layout levels or quantities of elements in layout design 400B are within the scope of the present disclosure.

FIG. 4C is a diagram of a layout design 400C of an integrated circuit, in accordance with some embodiments. Layout design 400C is a layout diagram of an integrated circuit similar to integrated circuit 300 of FIGS. 3A-3G, in accordance with some embodiments.

Layout design 400C is an embodiment of layout design 100 of FIG. 1, and similar detailed description is omitted for brevity.

Layout design 400C is a variation of layout design 400B, and similar detailed description is therefore omitted. For example, layout design 400C illustrates an example of where K–1 sets of multiple fin cells (e.g., cell 201a) are added to layout design 400B where K is an integer. Stated differently, layout design 400C includes K sets of multiple fin cells (e.g., cell 201a), J–1 buffer zones (e.g., buffer zone 452) and J sets of single fin structures (e.g., set of fins 450).

As shown in FIG. 4C, a ratio of sets of multiple fin cells to sets of single fin cells in layout design 400C is shown as A:B. By including cell 402c, layout design 400C has a ratio of K:J.

Layout design 400C includes portion 200A, cell 402b and 402c. Cell 402c includes K–1 copies of cell 201a of FIG. 4A, and similar detailed description is therefore omitted.

A cell 406 includes cells 201a and cell 402c.

In some embodiments, layout design 400C achieves one or more of the benefits discussed above in at least FIGS. 2A-2C and 3A-3G.

Other configurations, arrangements on other layout levels or quantities of elements in layout design 400C are within the scope of the present disclosure.

FIG. 5A is a diagram of a layout design 500A of an integrated circuit, in accordance with some embodiments. Layout design 500A is a layout diagram of an integrated circuit similar to integrated circuit 300 of FIGS. 3A-3G, in accordance with some embodiments.

Layout design 500A is an embodiment of layout design 100 of FIG. 1, and similar detailed description is omitted for brevity.

Layout design 500A is a variation of layout design 200A, and similar detailed description is therefore omitted. For example, layout design 500A illustrates an example of where additional rows (e.g., rows 2 and 3) of a same type of cell (e.g., cell 502a2 and 502a3) are added to the same column (e.g., column 1) as portion 200A of layout design 200. Stated differently, cell 502a1 that corresponds to portions 200A of layout design 200 are repeated in other rows of column 1 of layout design 500A.

Layout design 500A is a cell array that includes 3 rows of cells and 1 column of cells. Other rows or columns are within the scope of the present disclosure.

Layout design 500A includes cells 502a1, 502a2 and 502a3. Each of cells 502a1, 502a2 and 502a3 corresponds to portion 200A of layout design 200, and similar detailed description is therefore omitted.

As shown in FIG. 5A, a ratio of sets of multiple fin cells to sets of single fin cells in layout design 500A is shown as A:B and corresponds to 1:2.

In some embodiments, layout designs 500A-500E achieves one or more of the benefits discussed above in at least FIGS. 2A-2C and 3A-3G.

Other configurations, arrangements on other layout levels or quantities of elements in layout design 500A are within the scope of the present disclosure.

FIG. 5B is a diagram of a layout design 500B of an integrated circuit, in accordance with some embodiments. Layout design 500B is a layout diagram of an integrated circuit similar to integrated circuit 300 of FIGS. 3A-3G, in accordance with some embodiments.

Layout design 500B is an embodiment of layout design 100 of FIG. 1, and similar detailed description is omitted for brevity.

Layout design 500B is a variation of layout design 400A, and similar detailed description is therefore omitted. For example, layout design 500B illustrates an example of where additional rows (e.g., row 2) of a same type of cell (e.g., cell 502b2) are added to the same column (e.g., column 1) as layout design 400A. Stated differently, cell 502b1 that corresponds to layout design 400A is repeated in other rows of column 1 of layout design 500B.

Layout design 500B is a cell array that includes 2 rows of cells and 1 column of cells. Other rows or columns are within the scope of the present disclosure.

Layout design 500B includes cells 502b1 and 502b2. Each of cells 502b1 and 502b2 corresponds to layout design 400A, and similar detailed description is therefore omitted.

As shown in FIG. 5B, a ratio of sets of multiple fin cells to sets of single fin cells in layout design 500B is shown as A:B and corresponds to 1:3.

Other configurations, arrangements on other layout levels or quantities of elements in layout design 500B are within the scope of the present disclosure.

FIG. 5C is a diagram of a layout design 500C of an integrated circuit, in accordance with some embodiments. Layout design 500C is a layout diagram of an integrated circuit similar to integrated circuit 300 of FIGS. 3A-3G, in accordance with some embodiments.

Layout design 500C is an embodiment of layout design 100 of FIG. 1, and similar detailed description is omitted for brevity.

Layout design 500C is a variation of layout design 400B, and similar detailed description is therefore omitted. For example, layout design 500C illustrates an example of where additional rows (e.g., row 2) of a same type of cell (e.g., cell 502c2) are added to the same column (e.g., column 1) as layout design 400B. Stated differently, cell 502c1 that corresponds to layout design 400B is repeated in other rows of column 1 of layout design 500C.

Layout design 500C is a cell array that includes 2 rows of cells and 1 column of cells. Other rows or columns are within the scope of the present disclosure.

Layout design 500C includes cells 502c1 and 502c2. Each of cells 502c1 and 502c2 corresponds to layout design 400B, and similar detailed description is therefore omitted.

As shown in FIG. 5C, a ratio of sets of multiple fin cells to sets of single fin cells in layout design 500C is shown as A:B and corresponds to 1:J.

Other configurations, arrangements on other layout levels or quantities of elements in layout design 500C are within the scope of the present disclosure.

FIG. 5D is a diagram of a layout design 500D of an integrated circuit, in accordance with some embodiments. Layout design 500D is a layout diagram of an integrated circuit similar to integrated circuit 300 of FIGS. 3A-3G, in accordance with some embodiments.

Layout design 500D is an embodiment of layout design 100 of FIG. 1, and similar detailed description is omitted for brevity.

Layout design 500D is a variation of layout design 400C, and similar detailed description is therefore omitted. For example, layout design 500D illustrates an example of where additional rows (e.g., row 2) of a same type of cell (e.g., cell 502d2) are added to the same column (e.g., column 1) as layout design 400C. Stated differently, cell 502d1 that corresponds to layout design 400C is repeated in other rows of column 1 of layout design 500D.

Layout design 500D is a cell array that includes 2 rows of cells and 1 column of cells. Other rows or columns are within the scope of the present disclosure.

Layout design 500D includes cells 502d1 and 502d2. Each of cells 502d1 and 502d2 corresponds to layout design 400C, and similar detailed description is therefore omitted.

As shown in FIG. 5D, a ratio of sets of multiple fin cells to sets of single fin cells in layout design 500D is shown as A:B and corresponds to K:J.

Other configurations, arrangements on other layout levels or quantities of elements in layout design 500D are within the scope of the present disclosure.

Figure 5E:
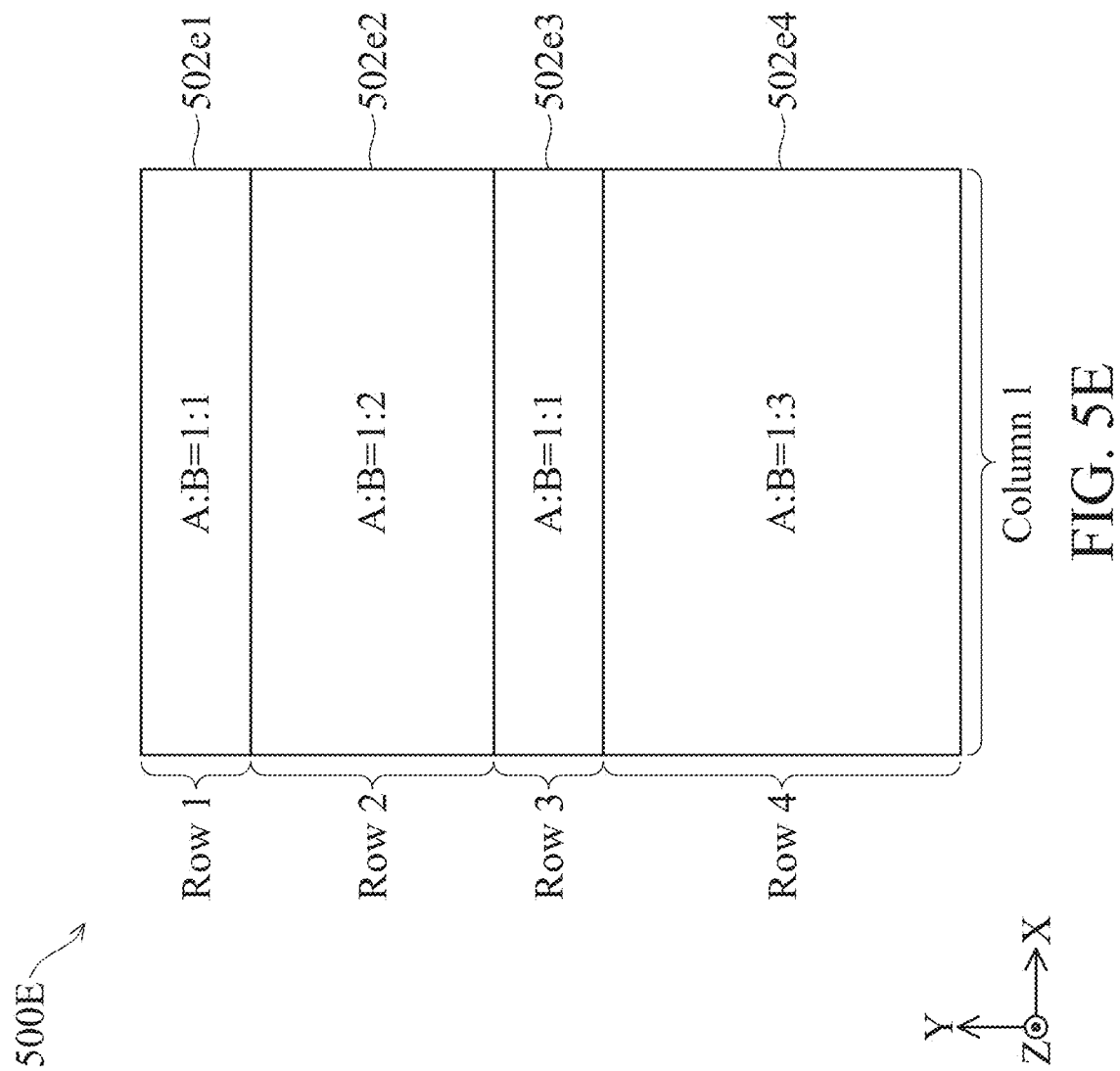

FIG. 5E is a diagram of a layout design 500E of an integrated circuit, in accordance with some embodiments. Layout design 500E is a layout diagram of an integrated circuit similar to integrated circuit 300 of FIGS. 3A-3G, in accordance with some embodiments.

Layout design 500E is an embodiment of layout design 100 of FIG. 1, and similar detailed description is omitted for brevity.

Layout design 500E is a variation of layout design 200, 400A, 400B or 400C, and similar detailed description is therefore omitted. For example, layout design 500E illustrates an example of where additional rows (e.g., rows 1, 3 and 4) of different types of cell (e.g., cell 502e1 or 502e3 and 502e4) are added to the same column (e.g., column 1) as portion 200A of layout design 200. Stated differently, the cells of portions 200A, layout design 400A, 400B or 400C are arranged and/or repeated in different rows of column 1 of layout design 500E.

Layout design 500E is a cell array that includes 4 rows of cells and 1 column of cells. Other rows or columns are within the scope of the present disclosure. In some embodiments, other combinations of the cells of portions 200A, layout design 400A, 400B or 400C can be arranged and/or repeated in different rows of column 1 of layout design 500E.

Layout design 500E includes cells 502e1, 502e2, 502e3 and 502e4. Each of cells 502e1 and 502e3 corresponds to cell 410 of FIG. 4A, and similar detailed description is therefore omitted.

Cell 502e2 corresponds to portion 200A of layout design 200, and similar detailed description is therefore omitted.

Cell 502e4 corresponds to layout design 400A, and similar detailed description is therefore omitted.

As shown in FIG. 5E, rows 1 and 3 have a ratio of A:B as 1:1, row 2 has a ratio of A:B as 1:2, and row 4 has a ratio of A:B as 1:3.

Other configurations, arrangements on other layout levels or quantities of elements in layout design 500E are within the scope of the present disclosure.

Figure 6A:
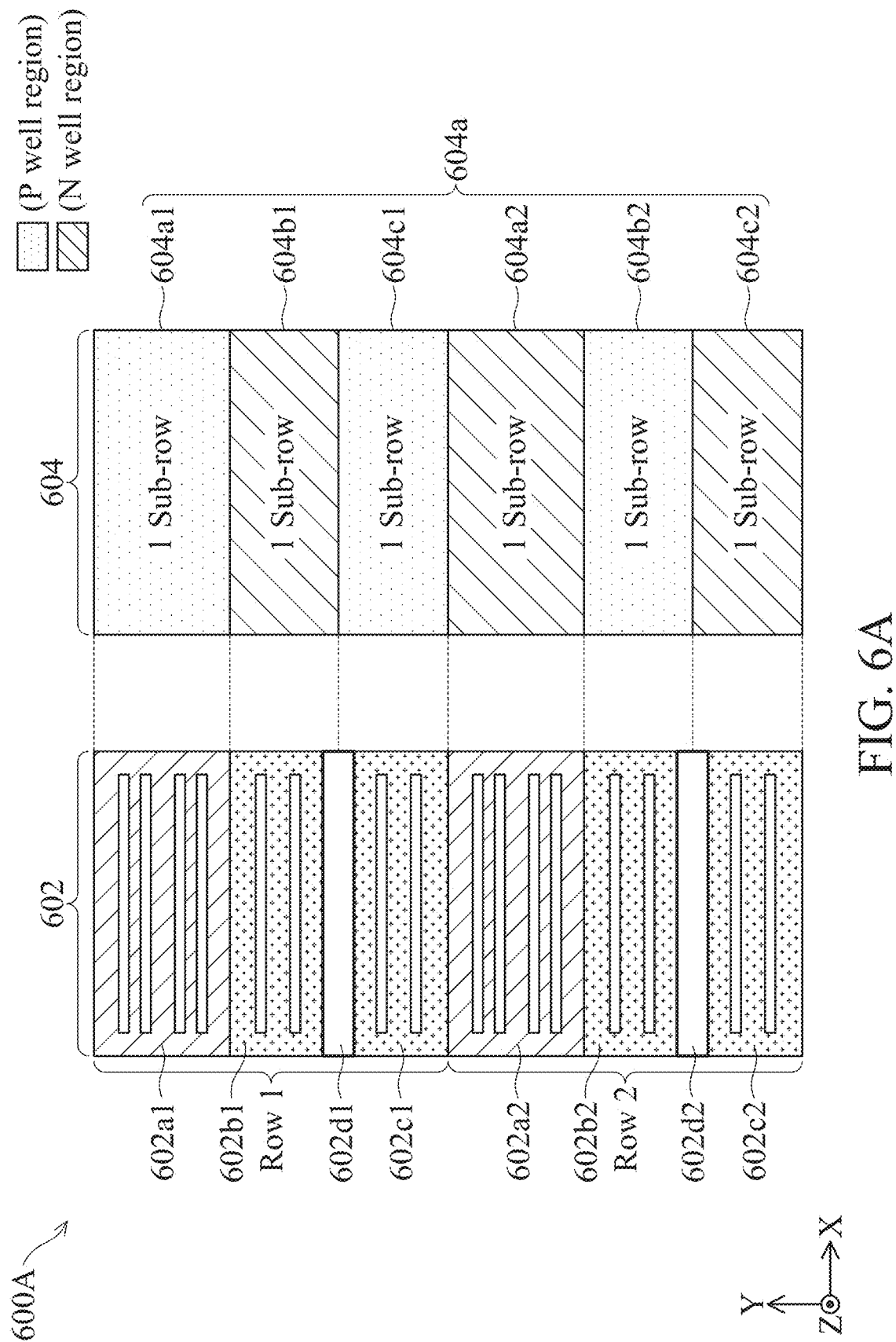
FIGS. 6A-6D are diagrams of a corresponding layout design of a corresponding integrated circuit, in accordance with some embodiments.

FIG. 6A is a diagram of a layout design 600A of an integrated circuit, in accordance with some embodiments. Layout design 600A is a layout diagram of an integrated circuit similar to integrated circuit 300 of FIGS. 3A-3G, in accordance with some embodiments.

Layout design 600A is an embodiment of layout design 100 of FIG. 1, and similar detailed description is omitted for brevity.

Layout design 600A is a variation of layout design 200A or 500A, and similar detailed description is therefore omitted. For example, layout design 600A illustrates an example of where an additional cell (e.g., cell 604) is added to rows 1 and 2 of layout design 500A in the same column (e.g., column 1). In some embodiments, cell 604 identifies n-type and p-type well regions of rows 1 and 2 of layout design 500A.

Layout design 600A is a cell array that includes 2 rows of cells and 1 column of cells. Other rows or columns are within the scope of the present disclosure.

Layout design 600A includes cell 602 and cell 604.

Cell 602 corresponds to rows 1 and 2 of layout design 500A, and similar detailed description is therefore omitted.

Cell 602 includes cells 602a1, 602a2, 602b1, 602b2, 602c1, 602c2, 602d1 and 602d2.

Cells 602a1 and 602a2 correspond to cell 201a of portion 200A of layout design 200, cells 602b1 and 602b2 correspond to cell 201b of portion 200A of layout design 200, cells 602c1 and 602c2 correspond to cell 201d of portion 200A of layout design 200, and cells 602d1 and 602d2 correspond to cell 201c of portion 200A of layout design 200, and similar detailed description is therefore omitted.

Cell 604 includes well patterns 604a1, 604a2, 604b1, 604b2, 604c1 and 604c2 (collectively referred to as a "set of well patterns 604a") each extending in the second direction Y.

Each of the well patterns of the set of well patterns 604a is separated from an adjacent well pattern of the set of well patterns 604a in the second direction Y. Each of the well patterns of the set of well patterns 604a has a width (not labelled) extending in the second direction Y. In some embodiments, the set of well patterns 604a overlap cell 602.

Each of rows 1 and 2 of cell 602 can be divided into 3 sub-rows. Each of the well patterns of the set of well patterns 604a is in a corresponding sub-row of cell 604. Well patterns 604a1, 604b1, and 604c1 are in row 1 of layout design 600A. Well patterns 604a2, 604b2, and 604c2 are in row 2 of layout design 600A.

The set of well patterns 604a is usable to manufacture a set of wells (not labelled) of integrated circuit 300 (FIGS. 3A-3G). In some embodiments, well patterns 604a1, 604a2, 604b1, 604b2, 604c1 and 604c2 are usable to manufacture corresponding wells of integrated circuit 300 (FIGS. 3A-3G).

In some embodiments, the set of well patterns 604a correspond to n-type well regions and p-type well regions of cell 602 that identify corresponding n-type finFETs and p-type finFETs. For example, in some embodiments, well patterns 604a1, 604c1, 604b2 correspond to p-type wells, and thus cells 602a1, 602c1, 602b2 are n-type finFETs, well patterns 604b1, 604a2, 604c2 correspond to n-type wells, and thus cells 602b1, 602a2, 602c2 are p-type finFETs.

In some embodiments, well patterns 604a1, 604c1, 604b2 correspond to n-type wells, and thus cells 602a1, 602c1, 602b2 are p-type finFETs, and well patterns 604b1, 604a2, 604c2 correspond to p-type wells, and thus cells 602b1, 602a2, 602c2 are n-type finFETs.

One or more well patterns of the set of well patterns 604a has a rectangular shape. In some embodiments, one or more well patterns of the set of well patterns 604a has a polygonal shape.

In some embodiments, one or more well patterns of the set of well patterns 604a is a continuous well pattern that extends in the second direction Y. In some embodiments, one or more well patterns of the set of well patterns 604a includes at least M discontinuous well patterns that extend in the first direction X, where M is an integer.

The set of well patterns 604a is positioned on a third level. In some embodiments, the third level is different from the first level and the second level. In some embodiments, the third level is the same as the first level. In some embodiments, the third level corresponds to the active level or the OD level of one or more of layout designs 100, 200, 400A-400C, 500A-500E or 600A-600D (FIG. 1, 2A-2C, 4A-4C, 5A-5E or 6A-6D) or integrated circuit 300 (FIGS. 3A-3G).

Other configurations, levels or quantities of patterns in the set of well patterns 604a are within the scope of the present disclosure.

In some embodiments, layout designs 600A-600D achieves one or more of the benefits discussed above in at least FIGS. 2A-2C and 3A-3G.

Other configurations, levels or quantities of patterns in layout design 600A are within the scope of the present disclosure.

Figure 6B:
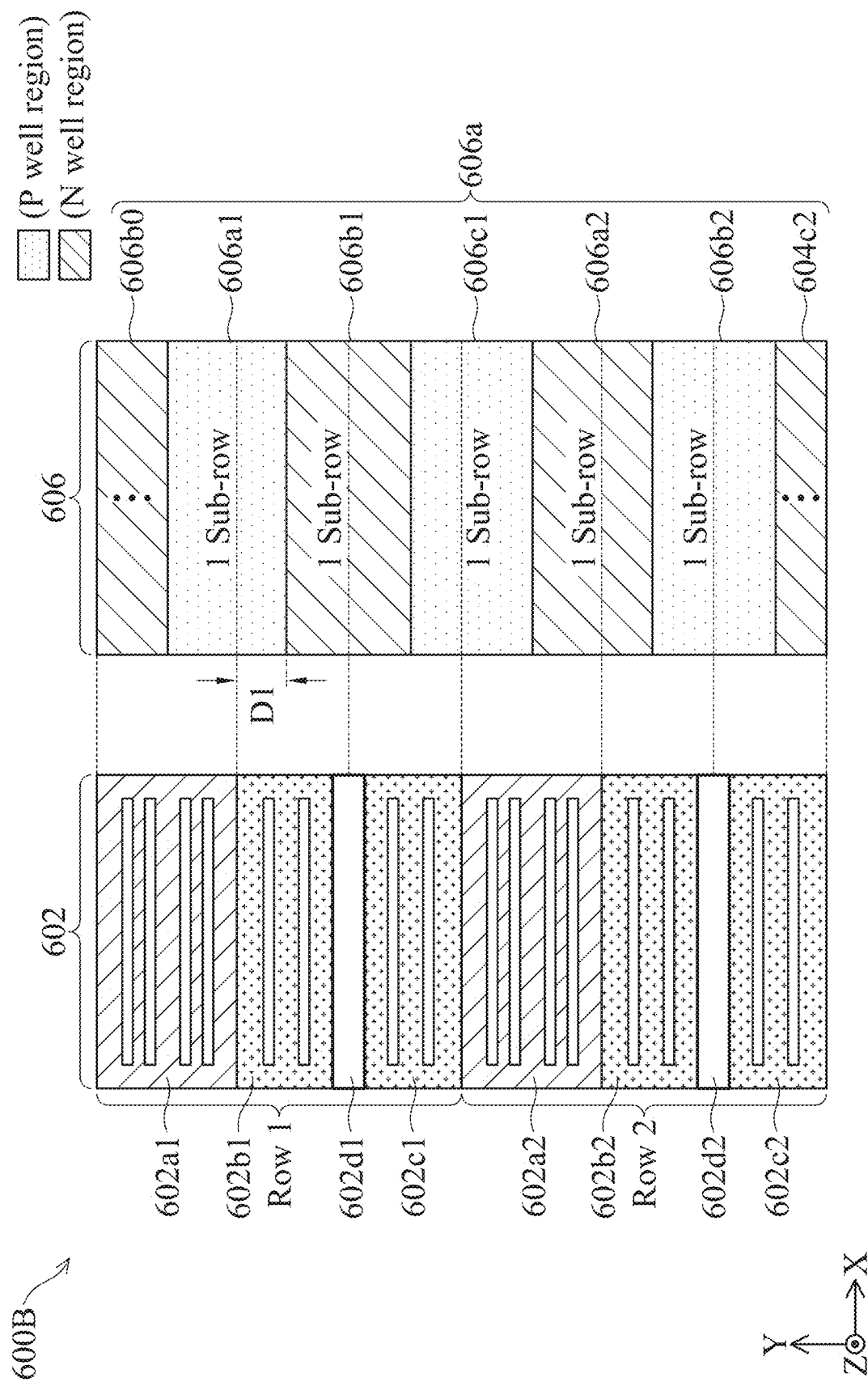

FIG. 6B is a diagram of a layout design 600B of an integrated circuit, in accordance with some embodiments. Layout design 600B is a layout diagram of an integrated circuit similar to integrated circuit 300 of FIGS. 3A-3G, in accordance with some embodiments.

Layout design 600B is an embodiment of layout design 100 of FIG. 1, and similar detailed description is omitted for brevity.

Layout design 600B is a variation of layout design 600A, and similar detailed description is therefore omitted. In comparison with layout design 600A, cell 606 of layout design 600B replaces cell 604 of layout design 600A, and similar detailed description is therefore omitted.

Layout design 600B is a cell array that includes 2 rows of cells and 1 column of cells. Other rows or columns are within the scope of the present disclosure.

Layout design 600B includes cell 602 and cell 606.

Cell 606 includes well patterns 606b0, 606a1, 606a2, 606b1, 606b2, 606c1 and 606c2 (collectively referred to as a "set of well patterns 606a").

In comparison with layout design 600A, the set of well layout patterns 606a replaces the set of well patterns 604a, and similar detailed description is therefore omitted. In comparison with layout design 600A, well layout patterns 606a1, 606a2, 606b1, 606b2, 606c1 and 606c2 replace corresponding well patterns 604a1, 604a2, 604b1, 604b2, 604c1 and 604c2, and similar detailed description is therefore omitted. Well pattern 606b0 is similar to well pattern 606b1, and similar detailed description is therefore omitted.

In comparison with the set of well patterns 604a, the set of well patterns 606a is shifted in the second direction Y by a distance D1, and similar detailed description is therefore omitted. In some embodiments, distance D1 corresponds to ½ of a sub-row. Other values for distance D1 are within the scope of the present disclosure.

In some embodiments, by shifting the set of well patterns 606a in the second direction Y by distance D1, changes the distribution of n-type finFETs and p-type finFETs in layout design 600B. For example, in some embodiments, well patterns 606a1, 606c1, 606b2 correspond to p-type wells, and thus a first portion of cells 602a1, 602b1, 602c1, 602a2, 602b2 and 602c2 are n-type finFETs, well patterns 606b0, 606b1, 606a2, 606c2 correspond to n-type wells, and thus a second portion of cells 602a1, 602b1, 602c1, 602a2, 602b2 and 602c2 are p-type finFETs.

In some embodiments, well patterns 606a1, 606c1, 606b2 correspond to n-type wells, and thus a first portion of cells 602a1, 602b1, 602c1, 602a2, 602b2 and 602c2 are p-type finFETs, well patterns 606b0, 606b1, 606a2, 606c2 correspond to p-type wells, and thus a second portion of cells 602a1, 602b1, 602c1, 602a2, 602b2 and 602c2 are n-type finFETs.

In some embodiments, the first portion of cells 602a1, 602b1, 602c1, 602a2, 602b2 and 602c2 is 50% of cell 602, and the second portion of cells 602a1, 602b1, 602c1, 602a2, 602b2 and 602c2 is 50% of cell 602. Other numbers for the first portion of cells 602a1, 602b1, 602c1, 602a2, 602b2 and 602c2, and the second portion of cells 602a1, 602b1, 602c1, 602a2, 602b2 and 602c2 are within the scope of the present disclosure.

Other configurations, levels or quantities of patterns in the set of well patterns 606a are within the scope of the present disclosure.

Other configurations, levels or quantities of patterns in layout design 600B are within the scope of the present disclosure.

Figure 6C:
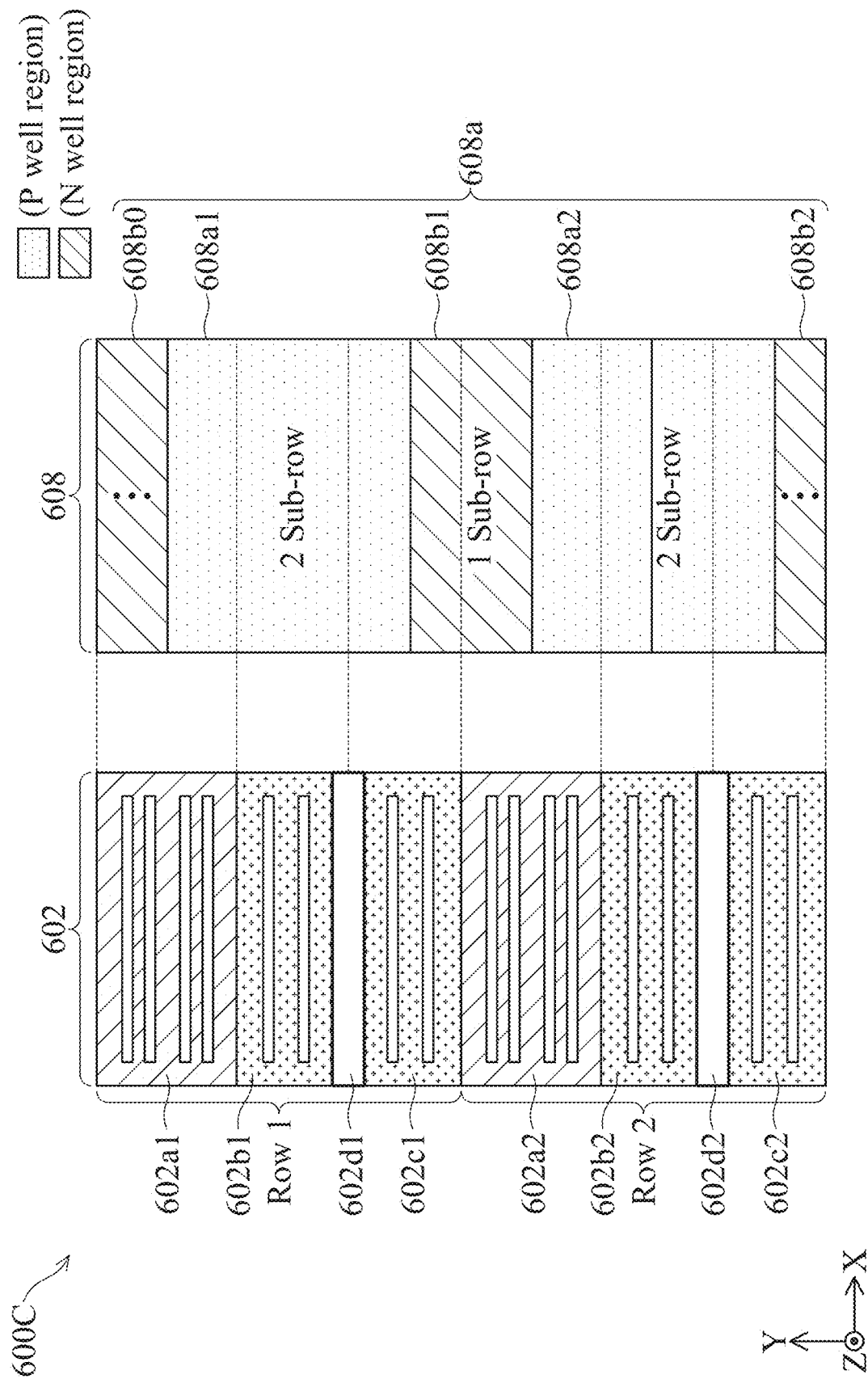

FIG. 6C is a diagram of a layout design 600C of an integrated circuit, in accordance with some embodiments. Layout design 600C is a layout diagram of an integrated circuit similar to integrated circuit 300 of FIGS. 3A-3G, in accordance with some embodiments.

Layout design 600C is an embodiment of layout design 100 of FIG. 1, and similar detailed description is omitted for brevity.

Layout design 600C is a variation of layout design 600B, and similar detailed description is therefore omitted. In comparison with layout design 600B, cell 608 of layout design 600C replaces cell 606 of layout design 600B, and similar detailed description is therefore omitted.

Layout design 600C is a cell array that includes 2 rows of cells and 1 column of cells. Other rows or columns are within the scope of the present disclosure.

Layout design 600C includes cell 602 and cell 608.

Cell 608 includes well patterns 608b0, 608a1, 608a2, 608b1, 608b2 (collectively referred to as a "set of well patterns 608a").

In comparison with layout design 600B, the set of well patterns 608a replaces the set of well patterns 606a, and similar detailed description is therefore omitted.

In comparison with layout design 600B, well pattern 608b0 replaces well pattern 606b0, well pattern 608a1 replaces well patterns 606a1 and 606b1, well pattern 608b1 replaces well pattern 606c1, well pattern 608a2 replaces well patterns 606a2 and 606b2, well pattern 608b2 replaces well pattern 606c2, and similar detailed description is therefore omitted.

In comparison with the set of well patterns 606a, each of well patterns 608a1 and 608a2 occupy two sub-rows in cell 608 compared to layout design 600B where each well patterns occupies a single sub-row. In some embodiments, by occupying two-sub rows in cell 608, changes the distribution of n-type finFETs and p-type finFETs in layout design 600C. For example, in some embodiments, well patterns 608a1 and 608a2 correspond to p-type wells, and thus cells 602b1 and 602b2, and a first portion of cells 602a1, 602c1, 602a2 and 602c2 are n-type finFETs, and well patterns 608b0, 608b1 and 608b2 correspond to n-type wells, and thus a second portion of cells 602a1, 602c1, 602a2, and 602c2 are p-type finFETs.

In some embodiments, well patterns 608a1 and 608a2 correspond to n-type wells, and thus cells 602b1 and 602b2, and a first portion of cells 602a1, 602c1, 602a2 and 602c2 are p-type finFETs, and well patterns 608b0, 608b1 and 608b2 correspond to p-type wells, and thus a second portion of cells 602a1, 602c1, 602a2, and 602c2 are n-type finFETs.

In some embodiments, the first portion of cells 602a1, 602c1, 602a2 and 602c2 is 50% of cell 602, and the second portion of cells 602a1, 602c1, 602a2, and 602c2 is 50% of cell 602. Other numbers for the first portion of cells 602a1, 602c1, 602a2 and 602c2, and the second portion of cells 602a1, 602c1, 602a2, and 602c2 are within the scope of the present disclosure.

Other configurations, levels or quantities of patterns in the set of well patterns 608a are within the scope of the present disclosure.

Other configurations, levels or quantities of patterns in layout design 600C are within the scope of the present disclosure.

Figure 6D:
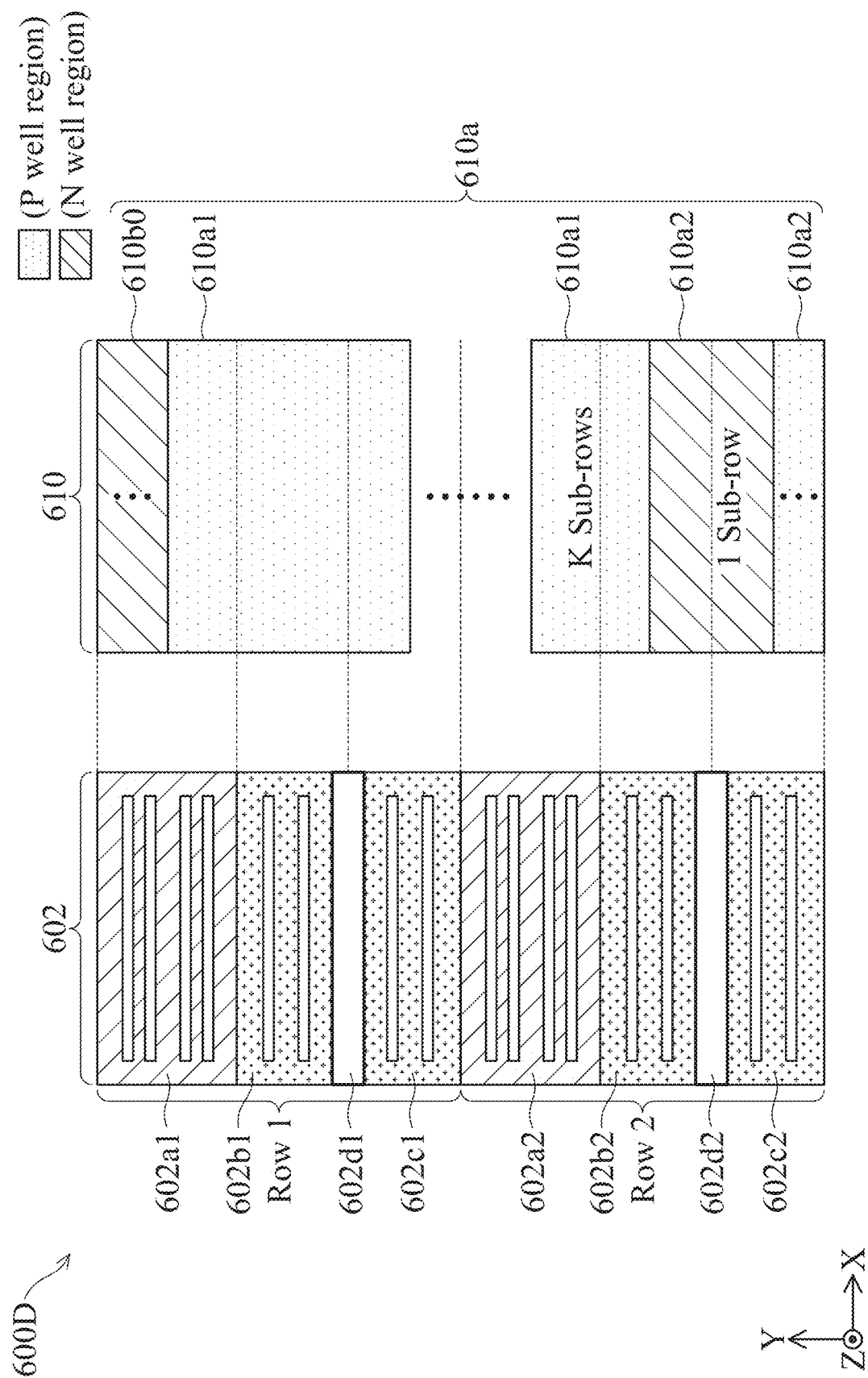

FIG. 6D is a diagram of a layout design 600D of an integrated circuit, in accordance with some embodiments. Layout design 600D is a layout diagram of an integrated circuit similar to integrated circuit 300 of FIGS. 3A-3G, in accordance with some embodiments.

Layout design 600D is an embodiment of layout design 100 of FIG. 1, and similar detailed description is omitted for brevity.

Layout design 600D is a variation of layout design 600B, and similar detailed description is therefore omitted. In comparison with layout design 600B, cell 610 of layout design 600D replaces cell 606 of layout design 600B, and similar detailed description is therefore omitted.

Layout design 600D is a cell array that includes 2 rows of cells and 1 column of cells. Other rows or columns are within the scope of the present disclosure.

Layout design 600D includes cell 602 and cell 610.

Cell 610 includes well patterns 610b0, 610a1, 610a2, 610b1 (collectively referred to as a "set of well patterns 610a").

In comparison with layout design 600B, the set of well patterns 610a replaces the set of well patterns 606a, and similar detailed description is therefore omitted.

In comparison with layout design 600B, well pattern 610b0 replaces well pattern 606b0, well pattern 610a1 replaces well patterns 606a1, 606b1, 606c1 and 606a2, well pattern 610b1 replaces well pattern 606b2, and well pattern 610a2 replaces well pattern 606c2, and similar detailed description is therefore omitted.

In comparison with the set of well patterns 606a, well pattern 610a1 occupies K sub-rows in cell 610 compared to layout design 600B where each well patterns occupies a single sub-row, where K is an integer. In some embodiments, by occupying K sub-rows in cell 610, changes the distribution of n-type finFETs and p-type finFETs in layout design 600D.

For example, in some embodiments, well patterns 610a1 and 610a2 correspond to p-type wells, and thus cells 602b1, 602c1 and 602a2, and a first portion of cells 602a1, 602b2 and 602c2 are n-type finFETs, and well patterns 610b0 and 610b1 correspond to n-type wells, and thus a second portion of cells 602a1, 602b2 and 602c2 are p-type finFETs. In some embodiments, well patterns 610a1 and 610a2 correspond to n-type wells, and thus cells 602b1, 602c1 and 602a2, and a first portion of cells 602a1, 602b2 and 602c2 are p-type finFETs, and well patterns 610b0 and 610b1 correspond to p-type wells, and thus a second portion of cells 602a1, 602b2 and 602c2 are n-type finFETs.

In some embodiments, the first portion of cells 602a1, 602b2 and 602c2 is 50% of cell 602, and the second portion of cells 602a1, 602b2 and 602c2 is 50% of cell 602. Other numbers for the first portion of cells 602a1, 602b2 and 602c2, and the second portion of cells 602a1, 602b2 and 602c2 are within the scope of the present disclosure.

Other configurations, levels or quantities of patterns in the set of well patterns 610a are within the scope of the present disclosure.

Other configurations, levels or quantities of patterns in layout design 600D are within the scope of the present disclosure.

FIG. 7 is a functional flow chart of at least a portion of an IC design and manufacturing flow 700, in accordance with some embodiments. The design and manufacturing flow 700 utilizes one or more electronic design automation (EDA) tools for generating, optimizing and/or verifying a design of an IC before manufacturing the IC in operation 750. The EDA tools, in some embodiments, are one or more sets of executable instructions for execution by a processor or controller or a programmed computer to perform the indicated functionality. In at least one embodiment, the IC design and manufacturing flow 700 is performed by a design house of an IC manufacturing system discussed herein with respect to FIG. 7.

At operation 702, a design of an IC is provided by a circuit designer. In some embodiments, the design of the IC comprises an IC schematic, i.e., an electrical diagram, of the IC. In some embodiments, the schematic is generated or provided in the form of a schematic netlist, such as a Simulation Program with Integrated Circuit Emphasis (SPICE) netlist. Other data formats for describing the design are usable in some embodiments. In some embodiments, a pre-layout simulation is performed on the design to determine whether the design meets a predetermined specification. When the design does not meet the predetermined specification, the IC is redesigned. In at least one embodiment, a pre-layout simulation is omitted from FIG. 7. In at least one embodiment, method 700 further includes a pre-layout simulation performed after operation 710.

At operation 704, predesigned standard cells for the circuit design are retrieved from one or more cell libraries. In some embodiments, the cell libraries include information related to the height of the standard cells or the number of fins per transistor device. In some embodiments, the cell library includes tall standard cells with sets of multiple fin transistor devices, short standard cells with sets of single fin transistor devices, and buffer zones such as buffer zone 206. In some embodiments, a tall standard cell corresponds to a standard cell having height H1 in layout design 100 and a corresponding set of fin patterns 202 as shown in FIGS. 1, 2A-2C, 4A-4B and 5A-5B. In some embodiments, a short standard cell corresponds to a standard cell having height H2 in layout design 100 and a corresponding set of fin patterns 204 and 208 as shown in FIGS. 1, 2A-2C, 4A-4B and 5A-5B.

At operation 706, technology files for the circuit design are retrieved from one or more technology files. In some embodiments, the technology files include information regarding various types of cell rows for accommodating the predesigned standard cells, such as the row heights of the various types of cell rows. In some embodiments, the technology file includes design rules on variable pitch, variable metal width (e.g. widths W1a, W2a, W3a, W4a, W5a and W6a), and variable heights (e.g., heights H1, H2 and H3).

At operation 710, a floor plan is created for the circuit design, to place the predesigned standard cells into the layout design, according to the netlist files and the technology files. In some embodiments, the floor plan includes specifying the positions of at least two standard cells (e.g., two of cell 201a, 201b, 201c or 201d). In some embodiments, the two cells are placed in the floor plan sequentially in a forward order or a reverse order. For example, in some embodiments, in a forward order, the position of standard cells 201a, 201b, 201c and 201d are specified in the corresponding order (201a, 201b, 201c and 201d) in the second direction Y. For example, in some embodiments, in a reverse order, the position of standard cells 201d, 201c, 201b and 201a are specified in the corresponding order (201d, 201c, 201b and 201a).

At operation 720, the predesigned cells for the circuit design are placed into the floor plan by the Automatic Place and Route (APR) tool by performing cell placement. The APR tool accesses various cells from one or more cell libraries 704, and places the cells in an abutting manner to generate an IC layout diagram corresponding to the IC schematic.

The predesigned cells with the different cell heights are selected to optimize at least the performance, standard cell area, routability, pin-accessibility or power consumption of the circuit design. In some embodiments, tall cells are selected to optimize the performance and speed of the standard cells. In some embodiments, short cells are selected to optimize standard cell area, routability, pin-accessibility or power consumption of the standard cells.

Operation 720 further includes, performing design rule checks on the placed predesigned cells in the floor plan, and predesigned cells that contribute to one or more design rule violations are identified. In some embodiments, one or more design rules forbid the placement of adjacent cells that include corresponding single fin patterns since the width of power layout patterns that would overlap the adjacent cells would be too small, thereby causing an increase in the resistance of the power rail manufactured by the power layout pattern resulting in inefficient power rails for low power applications (e.g., single fin transistor devices). In some embodiments, in operation 720, one or more buffer zone patterns, such as buffer zone pattern 206, is inserted between adjacent or abutting single fin transistor device cells to overcome design rule violations associated with these one or more design rules. In some embodiments, by inserting buffer zone pattern 206, causes cell 201b and 201d to be separated from each other by at least width W1a, thereby causing the width W6a of conductive feature pattern 234 to be increased, and thus a resistance of conductive structure 334 manufactured by corresponding conductive feature pattern 234 is reduced, thereby resulting in increased efficiency of the power rails, and thus layout design 200 complies with the one or more design rules.

In some embodiments, to mitigate design rule violations, different cell heights and at least variable via dimensions, variable pin widths or variable metal pitches are selected to overcome other potential design rule violations. In some embodiments, by using the hybrid standard cell approach where predesigned cells with the different cell heights and at least variable via dimensions, variable pin widths or variable metal pitches, a balance is reached in the layout design and corresponding integrated circuit such that the speed and performance of the standard cells is improved compared to other approaches, but the standard cell area, routability and pin-accessibility of the hybrid standard cells is at least similar to other approaches.

At operation 730, the APR tool performs clock tree synthesis (CTS) to minimize skew and/or insertion delays potentially present due to the placement of circuit elements in the IC layout diagram. CTS includes an optimization process to ensure that signals are transmitted and/or arrived at appropriate timings. For example, in some embodiments, during the optimization process within CTS, the timing of shorter cells with smaller metal width and/or smaller vias, and the timing of taller cells with wider metal width and/or larger vias is analyzed, and if appropriate, is adjusted.

In some embodiments, one or more cells is changed from a tall cell to a short cell (and vice versa) to add and/or remove slack (timing for signal arrival) to achieve a desired timing. In some embodiments, one or more buffers are inserted into the IC layout diagram to add and/or remove slack (timing for signal arrival) to achieve a desired timing.

In some embodiments, operation 730 includes performing a timing analysis of one or more critical paths that include the standard cells with different heights to determine timing violations in the one or more critical paths. The described CTS of operation 730 is an example. Other arrangements or operations are within the scope of various embodiments. For example, in one or more embodiments, one or more of the described operations are repeated or omitted.

At operation 740, the APR tool performs routing to route various nets interconnecting the placed circuit elements. The routing is performed to ensure that the routed interconnections or nets satisfy a set of constraints. For example, routing operation 740 includes global routing, track assignment and detailed routing. During the global routing, routing resources used for interconnections or nets are allocated. For example, the routing area is divided into a number of sub-areas, pins of the placed circuit elements are mapped to the sub-areas, and nets are constructed as sets of sub-areas in which interconnections are physically routable. During the track assignment, the APR tool assigns interconnections or nets to corresponding conductive layers of the IC layout diagram. During the detailed routing, the APR tool routes interconnections or nets in the assigned conductive layers and within the global routing resources. For example, detailed, physical interconnections are generated within the corresponding sets of sub-areas defined at the global routing and in the conductive layers defined at the track assignment. In some embodiments, the APR tool places larger vias on wider pins of taller cells, and places smaller vias on narrower pins of shorter cells. In some embodiments, the APR tool routes wider metal lines and larger vias on metal tracks above the taller cells, and routes narrower metal lines and smaller vias on metal tracks above the shorter cells.

After operation 740, the APR tool outputs the IC layout diagram. The described APR tool is an example. Other arrangements are within the scope of various embodiments. For example, in one or more embodiments, one or more of the described operations are omitted.

Figure 11:
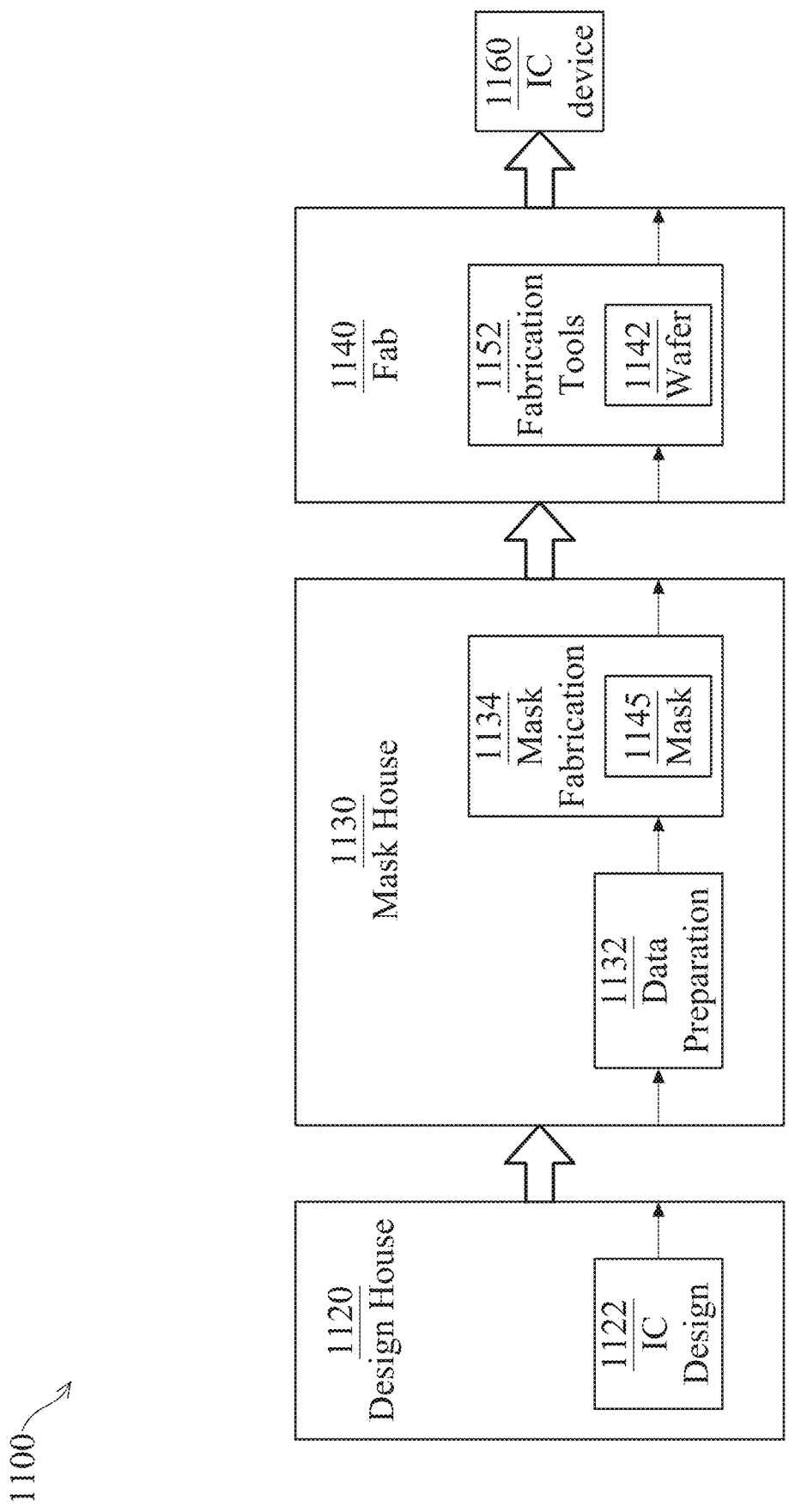
FIG. 11 is a block diagram of an integrated circuit (IC) manufacturing system 1100, and an IC manufacturing flow associated therewith, in accordance with at least one embodiment of the present disclosure.

In operation 750, the integrated circuit is manufactured based on the IC layout diagram. In some embodiments, the layout diagram of method 700 includes one or more layout patterns of layout design 100, 200, 400A-400C, 500A-500E or 600A-600D, or features similar to at least integrated circuit 300. In some embodiments, the integrated circuit manufactured by operation 750 includes at least integrated circuit 300. In some embodiments, operation 750 of method 700 comprises manufacturing at least one mask based on the layout diagram, and manufacturing the integrated circuit based on the at least one mask. In some embodiments, operation 750 is performed by IC manufacturing system 1100 (FIG. 11). In some embodiments, one or more of the above-described operations are omitted.

As described herein, in some embodiments, method 700 is performed to optimize the speed and performance of the standard cells, while maintaining the standard cell area, routability and pin-accessibility of the hybrid standard cells. In some embodiments, by having single fin transistor devices separated from other single fin transistor devices by a buffer zone, the standard cells of the present disclosure are able to be utilized in low power applications with larger numbers of single fin transistor device cells and thereby consume less power than other approaches.

FIG. 8 is a flowchart of a method 800 of generating a layout design of an integrated circuit, in accordance with some embodiments.

It is understood that additional operations may be performed before, during, and/or after the method 800 depicted in FIG. 8, and that some other processes may only be briefly described herein. In some embodiments, method 800 is an embodiment of at least operation 802 or 806 of method 800. In some embodiments, method 800 is usable to generate one or more layout patterns of at least layout design 100, 200, 400A-400C, 500A-500E or 600A-600D, or one or more features similar to at least integrated circuit 300.

In some embodiments, method 800 is usable to generate one or more layout patterns having structural relationships including alignment, lengths and widths, as well as configurations and layers of at least layout design 100, 200, 400A-400C, 500A-500E or 600A-600D, or one or more features similar to at least integrated circuit 300, and similar detailed description will not be described in FIG. 8, for brevity.

In some embodiments, other order of operations of method 800 is within the scope of the present disclosure. Method 800 includes exemplary operations, but the operations are not necessarily performed in the order shown. Operations may be combined, divided, added, replaced, changed order, and/or eliminated as appropriate, in accordance with the spirit and scope of disclosed embodiments.

In operation 802 of method 800, a first cell layout is generated or placed in a first column and a first row of a first cell array of a layout design.

In some embodiments, the first cell layout of method 800 includes at least portions of one or more patterns of layout design 400A, 400B, 400C or portion 200A of layout design 200.

In some embodiments, the first cell layout of method 800 includes at least portions of one or more patterns of cell 502a1, 502a2, 502a3, 502b1, 502b2, 502c1, 502c2, 502d1, 502d2, 502e1, 502e2, 502e3 or 502e4, row 1 or 2 of cell 602, row 1 or 2 of cell 604, row 1 or 2 of cell 606, row 1 or 2 of cell 608 or row 1 or 2 of cell 610.

In some embodiments, the first cell layout of method 800 includes at least portions of one or more patterns of cell 201a, 201b or 201d.

In some embodiments, the layout design of method 800 includes at least layout design 200, 400A, 400B, 400C, 500A, 500B, 500C, 500D, 500E, 600A, 600B, 600C or 600D.

In some embodiments, the first column of method 800 includes at least column 1.

In some embodiments, the first row of method 800 includes at least row 1, 2 or 3 of FIGS. 4A-4C, 5A-5E, and 6A-6D.

In operation 804 of method 800, a first power rail layout pattern is generated or placed on the layout design. In some embodiments, the first power rail layout pattern of method 800 includes at least portions of one or more patterns of conductive feature patterns 230, 232, 234 or 236.

In operation 806 of method 800, a second cell layout is generated or placed in the first column and a second row of the first cell array of the layout design.

In some embodiments, the second row is next to the first row. In some embodiments, the second cell layout corresponds to a copy of the first cell layout. In some embodiments, the second row of method 800 includes at least row 1, 2 or 3 of FIGS. 4A-4C, 5A-5E, and 6A-6D.

In some embodiments, the second cell layout of method 800 includes at least portions of one or more patterns of layout design 400A, 400B, 400C or portion 200A of layout design 200.

In some embodiments, the second cell layout of method 800 includes at least portions of one or more patterns of cell 502a1, 502a2, 502a3, 502b1, 502b2, 502c1, 502c2, 502d1, 502d2, 502e1, 502e2, 502e3, or 502e4, row 1 or 2 of cell 602, row 1 or 2 of cell 604, row 1 or 2 of cell 606, row 1 or 2 of cell 608 or row 1 or 2 of cell 610.

In some embodiments, the second cell layout of method 800 includes at least portions of one or more patterns of cell 201a, 201b or 201d.

FIG. 9 is a flowchart of a method 900 of generating a layout design of an integrated circuit, in accordance with some embodiments. It is understood that additional operations may be performed before, during, and/or after the method 900 depicted in FIG. 9, and that some other processes may only be briefly described herein. In some embodiments, method 900 is an embodiment of at least operation 802 or 806 of method 800. In some embodiments, method 900 is usable to generate one or more layout patterns of at least layout design 100, 200, 400A-400C, 500A-500E or 600A-600D, or one or more features similar to at least integrated circuit 300.

In some embodiments, method 900 is usable to generate one or more layout patterns having structural relationships including alignment, lengths and widths, as well as configurations and layers of at least layout design 100, 200, 400A-400C, 500A-500E or 600A-600D, or one or more features similar to at least integrated circuit 300, and similar detailed description will not be described in FIG. 9, for brevity.

In some embodiments, other order of operations of method 900 is within the scope of the present disclosure. Method 900 includes exemplary operations, but the operations are not necessarily performed in the order shown. Operations may be combined, divided, added, replaced, changed order, and/or eliminated as appropriate, in accordance with the spirit and scope of disclosed embodiments. In some embodiments, one or more of the operations of at least method 700, 800 or 900 is not performed.

In some embodiments, method 900 is an embodiment of at least operation 802 or 806 of method 800.

In operation 902 of method 900, a first standard cell layout of an integrated circuit is generated or placed on a layout design. In some embodiments, the first standard cell layout has a first boundary in the first direction X, and a first height (e.g., H1 or H2) in the second direction Y. In some embodiments, the first boundary of method 900 includes cell boundary 101c or 101d.

In some embodiments, the layout design of method 900 includes at least layout design 200, 400A, 400B, 400C, 500A, 500B, 500C, 500D, 500E, 600A, 600B, 600C or 600D.

In some embodiments, the first standard cell layout of method 900 includes cell 201a, 201b, 201d, 402a1, 402b, 402c, 404 or 406.

In some embodiments, the first standard cell layout of method 900 includes cell 502a1, 502a2, 502a3, 502b1, 502b2, 502c1, 502c2, 502d1, 502d2, 502e1, 502e2, 502e3, or 502e4, row 1 or 2 of cell 602, row 1 or 2 of cell 604, row 1 or 2 of cell 606, row 1 or 2 of cell 608 or row 1 or 2 of cell 610.

In some embodiments, operation 902 further includes at least operation 904 or 906.

In operation 904 of method 900, a first set of fin layout patterns is generated or placed on a first layout level. In some embodiments, the first set of fin layout patterns of method 900 includes set of fin patterns 204 or 208. In some embodiments, the first set of fin layout patterns of method 900 includes the set of fin patterns of cell 402a1.

In some embodiments, the first set of fin layout patterns extends in the first direction X. In some embodiments, each fin layout pattern of the first set of fin layout patterns corresponds to a transistor of a first set of transistors. In some embodiments, the first set of transistors of method 900 includes the set of transistors in cell 301b or 301d.

In operation 906 of method 900, a first set of conductive feature layout patterns is generated or placed on the second layout level. In some embodiments, the first set of conductive feature layout patterns of method 900 includes set of conductive feature patterns 222 or 224.

In some embodiments, the first set of conductive feature layout patterns extends in the first direction, and overlaps at least the first set of fin layout patterns. In some embodiments, each conductive feature layout pattern of the first set of conductive feature layout patterns has a fourth width in the second direction Y. In some embodiments, the fourth width of method 900 includes width W4a or W4b.

In operation 908 of method 900, a second standard cell layout is generated or placed of the integrated circuit. In some embodiments, the second standard cell layout has a second boundary in the first direction X and the first height. In some embodiments, the second boundary of method 900 includes cell boundary 101c or 101d.

In some embodiments, the second standard cell layout of method 900 includes cell 201a, 201b, 201d, 402a1, 402b, 402c, 404 or 406.

In some embodiments, the second standard cell layout of method 900 includes cell 502a1, 502a2, 502a3, 502b1, 502b2, 502c1, 502c2, 502d1, 502d2, 502e1, 502e2, 502e3, or 502e4, row 1 or 2 of cell 602, row 1 or 2 of cell 604, row 1 or 2 of cell 606, row 1 or 2 of cell 608 or row 1 or 2 of cell 610.

In some embodiments, operation 908 further includes at least operation 910 or 912.

In operation 910 of method 900, a second set of fin layout patterns is generated or placed on the first layout level. In some embodiments, the second set of fin layout patterns of method 900 includes set of fin patterns 208 or 204. In some embodiments, the second set of fin layout patterns of method 900 includes the set of fin patterns of cell 402a1.

In some embodiments, the second set of fin layout patterns extends in the first direction. In some embodiments, each fin layout pattern of the second set of fin layout patterns corresponds to a transistor of a second set of transistors. In some embodiments, the second set of transistors of method 900 includes the set of transistors in cell 301d or 301b. In some embodiments, the second set of fin layout patterns is separated from the first set of fin layout patterns in the second direction Y.

In operation 912 of method 900, a second set of conductive feature layout patterns is generated or placed on the second layout level. In some embodiments, the second set of conductive feature layout patterns of method 900 includes set of conductive feature patterns 222 or 224.

In some embodiments, the second set of conductive feature layout patterns extends in the first direction, and overlaps at least the second set of fin layout patterns. In some embodiments, each conductive feature layout pattern of the second set of conductive feature layout patterns has the fourth width in the second direction Y.

In operation 914 of method 900, a buffer zone layout pattern is generated or placed on the first layout level. In some embodiments, the buffer zone layout pattern of method 900 includes at least buffer zone pattern 206 or 402a2.

In some embodiments, the buffer zone layout pattern is between the first standard cell layout and the second cell layout. In some embodiments, the buffer zone layout pattern shares the first boundary with the first standard cell layout and the second boundary with the second standard cell layout. In some embodiments, the buffer zone layout pattern has a second width in the second direction less than a first width. In some embodiments, the second width of method 900 includes width W1a or W1b. In some embodiments, the first width of method 900 includes width W6a or W6b.

In operation 916 of method 900, a third standard cell layout is generated or placed on the integrated circuit next to a third boundary of the first standard cell layout or a fourth boundary of the second standard cell layout. In some embodiments, the third boundary of the first standard cell layout of method 900 includes cell boundary 101b or 101e. In some embodiments, the fourth boundary of the second standard cell layout of method 900 includes cell boundary 101e or 101b.

In some embodiments, the third standard cell layout has a second height (e.g., H1) in the second direction, the second height being greater than the first height. In some embodiments, the third standard cell layout of method 900 includes cell 201a, 201b, 201d, 402a1, 402b, 402c, 404 or 406.

In some embodiments, the third standard cell layout of method 900 includes cell 502a1, 502a2, 502a3, 502b1, 502b2, 502c1, 502c2, 502d1, 502d2, 502e1, 502e2, 502e3, or 502e4, row 1 or 2 of cell 602, row 1 or 2 of cell 604, row 1 or 2 of cell 606, row 1 or 2 of cell 608 or row 1 or 2 of cell 610.

In some embodiments, operation 916 further includes at least operation 918 or 920.

In operation 918 of method 900, a third set of fin layout patterns is generated or placed on the first layout level. In some embodiments, the third set of fin layout patterns of method 900 includes set of fin patterns 202. In some embodiments, the third set of fin layout patterns of method 900 includes the set of fin patterns of cell 406.

In some embodiments, the third set of fin layout patterns extends in the first direction X. In some embodiments, at least each pair of fin layout patterns of the third set of fin layout patterns corresponds to a transistor of a third set of transistors. In some embodiments, the third set of transistors of method 900 includes the set of transistors in cell 301a or 406.

In some embodiments, the third set of fin layout patterns is separated from the first set of fin layout patterns and the second set of fin layout patterns in the second direction Y. In some embodiments, the first width is less than at least the second width or the third width.

In operation 920 of method 900, a third set of conductive feature layout patterns is generated or placed on the second layout level. In some embodiments, the third set of conductive feature layout patterns of method 900 includes set of conductive feature patterns 220.

In some embodiments, the third set of conductive feature layout patterns extends in the first direction, and overlaps at least the third set of fin layout patterns. In some embodiments, each conductive feature layout pattern of the third set of conductive feature layout patterns has the fourth width in the second direction.

In operation 922 of method 900, a set of power rail layout patterns is generated or placed on a second layout level different from the first layout level. In some embodiments, operation 922 of method 900 is an embodiment of operation 804 of method 800.

In some embodiments, the set of power rail layout patterns includes at least a first power rail layout pattern, a second power rail layout pattern or a third power rail layout pattern.

In some embodiments, the first power rail layout pattern extends in the first direction, and overlaps at least the buffer zone layout pattern. In some embodiments, the first power rail layout pattern has a first width in the second direction that satisfies a first design rule. In some embodiments, the first width of method 900 includes width W6a or W6b. In some embodiments, the first design rule of method 900 includes the one or more design rules previously described herein. For example, in some embodiments, the first design rule of method 900 includes the one or more design rules described in at least FIG. 7.

In some embodiments, the first design rule includes the first width being greater than a minimum width of a power rail layout pattern between the first standard cell layout and the second standard cell layout. In some embodiments, the minimum width of a power rail layout pattern between the first standard cell layout and the second standard cell layout corresponds to a width that is two times the width W2a or W2b.

In some embodiments, the second power rail layout pattern extends in the first direction, and overlaps the third boundary of the first standard cell layout. In some embodiments, the third boundary is in the first direction X and is opposite from the first boundary. In some embodiments, the second power rail layout pattern has a second width in the second direction. In some embodiments, the second width of method 900 includes a sum of at least width W3a or W3b and width W2a or W2b.

In some embodiments, the third power rail layout pattern extends in the first direction, and overlaps the fourth boundary of the second standard cell layout. In some embodiments, the fourth boundary is in the first direction and is opposite from the second boundary. In some embodiments, the third power rail layout pattern has a third width in the second direction. In some embodiments, the third width of method 900 includes a sum of at least width W2a or W2b and width W3a or W3b.

In some embodiments, the first design rule is satisfied by the second power rail layout pattern by having a width equal to the second width. In some embodiments, the first design rule is satisfied by the third power rail layout pattern by having a width equal to the third width.

In some embodiments, methods 700-900 achieve one or more of the benefits discussed above in at least FIGS. 2A-2C and 3A-3G.

One or more of the operations of methods 700-900 is performed by a processing device configured to execute instructions for manufacturing an integrated circuit, such as at least integrated circuit 300. In some embodiments, one or more operations of methods 700-900 is performed using a same processing device as that used in a different one or more operations of methods 700-900. In some embodiments, a different processing device is used to perform one or more operations of methods 700-900 from that used to perform a different one or more operations of methods 700-900. In some embodiments, other order of operations of method 700-900 is within the scope of the present disclosure. Method 700-900 includes exemplary operations, but the operations are not necessarily performed in the order shown. Operations in method 700-900 may be added, replaced, changed order, and/or eliminated as appropriate, in accordance with the spirit and scope of disclosed embodiments.

Figure 10:
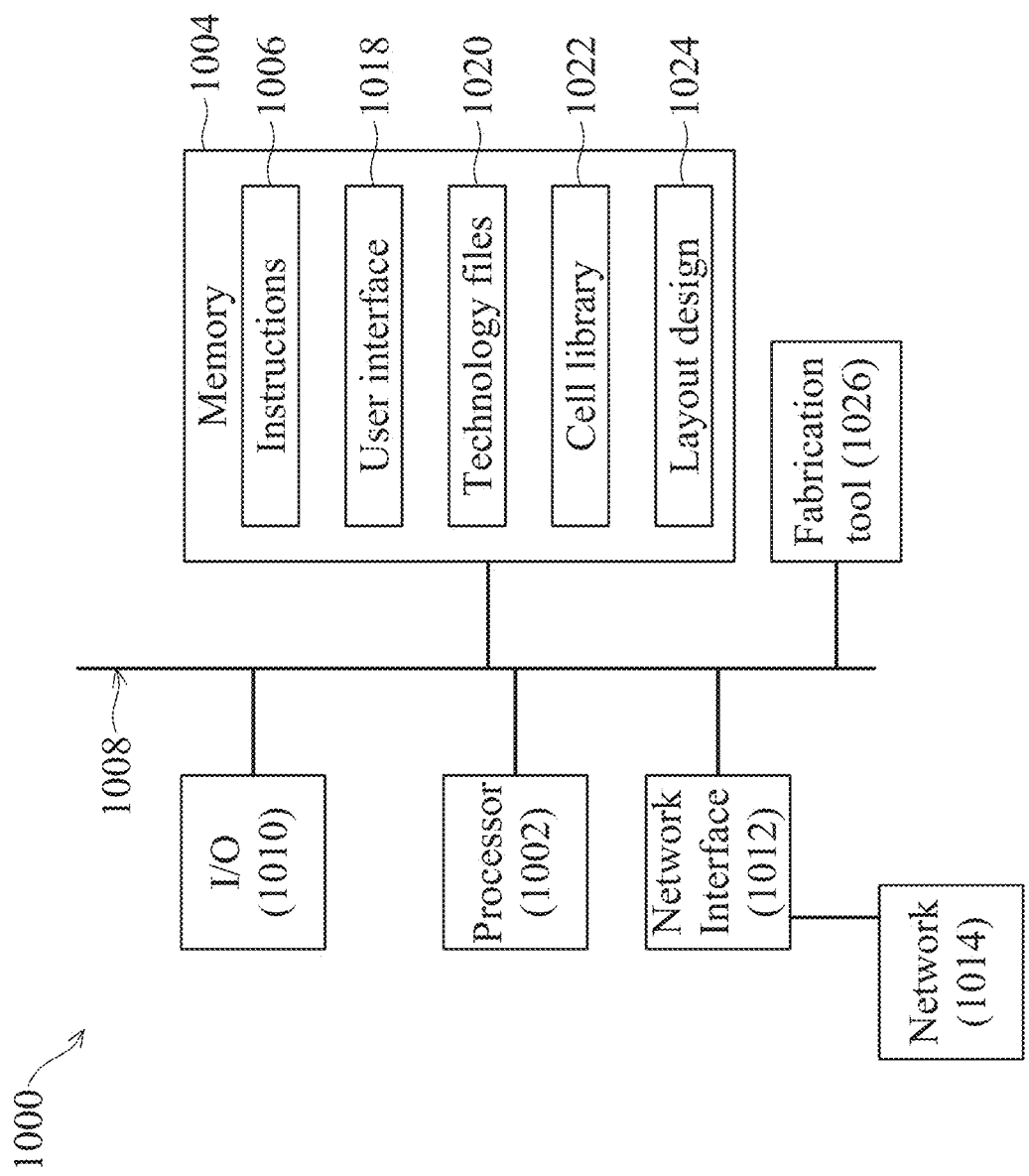
FIG. 10 is a schematic view of a system 1000 for designing an IC layout design and manufacturing an IC circuit in accordance with some embodiments.

FIG. 10 is a schematic view of a system 1000 for designing an IC layout design and manufacturing an IC circuit in accordance with some embodiments.

In some embodiments, system 1000 generates or places one or more IC layout designs described herein. System 1000 includes a hardware processor 1002 and a non-transitory, computer readable storage medium 1004 (e.g., memory 1004) encoded with, i.e., storing, the computer program code 1006, i.e., a set of executable instructions 1006. Computer readable storage medium 1004 is configured for interfacing with manufacturing machines for producing the integrated circuit. The processor 1002 is electrically coupled to the computer readable storage medium 1004 via a bus 1008. The processor 1002 is also electrically coupled to an I/O interface 1010 by bus 1008. A network interface 1012 is also electrically connected to the processor 1002 via bus 1008. Network interface 1012 is connected to a network 1014, so that processor 1002 and computer readable storage medium 1004 are capable of connecting to external elements via network 1014. The processor 1002 is configured to execute the computer program code 1006 encoded in the computer readable storage medium 1004 in order to cause system 1000 to be usable for performing a portion or all of the operations as described in methods 700-900.

In some embodiments, the processor 1002 is a central processing unit (CPU), a multi-processor, a distributed processing system, an application specific integrated circuit (ASIC), and/or a suitable processing unit.

In some embodiments, the computer readable storage medium 1004 is an electronic, magnetic, optical, electromagnetic, infrared, and/or a semiconductor system (or apparatus or device). For example, the computer readable storage medium 1004 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1004 includes a compact disk-read only memory (CD-ROM), a compact disk-read/write (CD-R/W), and/or a digital video disc (DVD).

In some embodiments, the storage medium 1004 stores the computer program code 1006 configured to cause system 1000 to perform methods 700-900. In some embodiments, the storage medium 1004 also stores information needed for performing methods 700-900 as well as information generated during performing methods 700-900, such as user interface 1018, technology files 1020, cell library 1022, layout design 1024, and fabrication tool 1026, and/or a set of executable instructions to perform the operation of methods 700-900. In some embodiments, layout design 1024 comprises one or more of layout patterns of at least layout design 100, 200, 400A-400C, 500A-500E or 600A-600D, or features similar to at least integrated circuit 300.

In some embodiments, the storage medium 1004 stores instructions (e.g., computer program code 1006) for interfacing with manufacturing machines. The instructions (e.g., computer program code 1006) enable processor 1002 to generate manufacturing instructions readable by the manufacturing machines to effectively implement methods 700-900 during a manufacturing process.

System 1000 includes I/O interface 1010. I/O interface 1010 is coupled to external circuitry. In some embodiments, I/O interface 1010 includes a keyboard, keypad, mouse, trackball, trackpad, and/or cursor direction keys for communicating information and commands to processor 1002.

System 1000 also includes network interface 1012 coupled to the processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interface such as ETHERNET, USB, or IEEE-2094. In some embodiments, methods 700-900 are implemented in two or more systems 1000, and information such as layout design, and user interface are exchanged between different systems 1000 by network 1014.

System 1000 is configured to receive information related to a layout design through I/O interface 1010 or network interface 1012. The information is transferred to processor 1002 by bus 1008 to determine a layout design for producing at least integrated circuit 300. The layout design is then stored in computer readable medium 1004 as layout design 1024. System 1000 is configured to receive information related to a user interface through I/O interface 1010 or network interface 1012. The information is stored in computer readable medium 1004 as user interface 1018. System 1000 is configured to receive information related to technology files through I/O interface 1010 or network interface 1012. The information is stored in computer readable medium 1004 as technology files 1020. In some embodiments, the technology files 1020 include technology files 706 of FIG. 7. System 1000 is configured to receive information related to a cell library through I/O interface 1010 or network interface 1012. The information is stored in computer readable medium 1004 as cell library 1022. System 1000 is configured to receive information related to a fabrication tool 1026 through I/O interface 1010 or network interface 1012. The information is stored in computer readable medium 1004 as fabrication tool 1026. In some embodiments, the fabrication tool 1026 includes fabrication information utilized by system 1000. In some embodiments, the fabrication tool 1026 corresponds to fabrication tool 1152 of FIG. 11.

In some embodiments, methods 700-900 are implemented as a standalone software application for execution by a processor. In some embodiments, methods 700-900 are implemented as a software application that is a part of an additional software application. In some embodiments, methods 700-900 are implemented as a plug-in to a software application. In some embodiments, methods 700-900 are implemented as a software application that is a portion of an EDA tool. In some embodiments, methods 700-900 are implemented as a software application that is used by an EDA tool. In some embodiments, the EDA tool is used to generate a layout of the integrated circuit device. In some embodiments, the layout is stored on a non-transitory computer readable medium. In some embodiments, the layout is generated using a tool such as VIRTUOSO® available from CADENCE DESIGN SYSTEMS, Inc., or another suitable layout generating tool. In some embodiments, the layout is generated based on a netlist which is created based on the schematic design. In some embodiments, methods 700-900 are implemented by a manufacturing device to manufacture an integrated circuit using a set of masks manufactured based on one or more layout designs generated by system 1000. In some embodiments, system 1000 is a manufacturing device configured to manufacture an integrated circuit using a set of masks manufactured based on one or more layout designs of the present disclosure. In some embodiments, system 1000 of FIG. 10 generates layout designs of an integrated circuit that are smaller than other approaches.

In some embodiments, system 1000 of FIG. 10 generates layout designs of integrated circuit structure that occupy less area and provide better routing resources than other approaches.

FIG. 11 is a block diagram of an integrated circuit (IC) manufacturing system 1100, and an IC manufacturing flow associated therewith, in accordance with at least one embodiment of the present disclosure. In some embodiments, based on a layout diagram, at least one of (A) one or more semiconductor masks or (B) at least one component in a layer of a semiconductor integrated circuit is fabricated using manufacturing system 1100.

In FIG. 11, IC manufacturing system 1100 (hereinafter "system 1100") includes entities, such as a design house 1120, a mask house 1130, and an IC manufacturer/fabricator ("fab") 1140, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, one or more of design house 1120, mask house 1130, and IC fab 1140 is owned by a single larger company. In some embodiments, one or more of design house 1120, mask house 1130, and IC fab 1140 coexist in a common facility and use common resources.

Design house (or design team) 1120 generates an IC design layout 1122. IC design layout 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout 1122 includes various IC features, such as an active region, gate electrode, source electrode and drain electrode, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout 1122. The design procedure includes one or more of logic design, physical design or place and route. IC design layout 1122 is presented in one or more data files having information of the geometrical patterns. For example, IC design layout 1122 can be expressed in a GDSII file format or DFII file format.

Mask house 1130 includes data preparation 1132 and mask fabrication 1134. Mask house 1130 uses IC design layout 1122 to manufacture one or more masks 1145 to be used for fabricating the various layers of IC device 1160 according to IC design layout 1122. Mask house 1130 performs mask data preparation 1132, where IC design layout 1122 is translated into a representative data file (RDF). Mask data preparation 1132 provides the RDF to mask fabrication 1134. Mask fabrication 1134 includes a mask writer. A mask writer converts the RDF to an image on a substrate, such as a mask (reticle) 1145 or a semiconductor wafer 1142. The design layout 1122 is manipulated by mask data preparation 1132 to comply with particular characteristics of the mask writer and/or requirements of IC fab 1140. In FIG. 11, mask data preparation 1132 and mask fabrication 1134 are illustrated as separate elements. In some embodiments, mask data preparation 1132 and mask fabrication 1134 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout to compensate for limitations during mask fabrication 1134, which may undo part of the modifications performed by OPC in order to meet mask creation rules.

In some embodiments, mask data preparation 1132 includes lithography process checking (LPC) that simulates processing that will be implemented by IC fab 1140 to fabricate IC device 1160. LPC simulates this processing based on IC design layout 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout 1122.

It should be understood that the above description of mask data preparation 1132 has been simplified for the purposes of clarity. In some embodiments, data preparation 1132 includes additional features such as a logic operation (LOP) to modify the IC design layout according to manufacturing rules. Additionally, the processes applied to IC design layout 1122 during data preparation 1132 may be executed in a variety of different orders.

After mask data preparation 1132 and during mask fabrication 1134, a mask 1145 or a group of masks 1145 are fabricated based on the modified IC design layout 1122. In some embodiments, mask fabrication 1134 includes performing one or more lithographic exposures based on IC design 1122. In some embodiments, an electron-beam (e-beam) or a mechanism of multiple e-beams is used to form a pattern on a mask (photomask or reticle) 1145 based on the modified IC design layout 1122. The mask 1145 can be formed in various technologies. In some embodiments, the mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary version of mask 1145 includes a transparent substrate (e.g., fused quartz) and an opaque material (e.g., chromium) coated in the opaque regions of the binary mask. In another example, the mask 1145 is formed using a phase shift technology. In the phase shift mask (PSM) version of mask 1145, various features in the pattern formed on the mask are configured to have proper phase difference to enhance the resolution and imaging quality. In various examples, the phase shift mask can be attenuated PSM or alternating PSM. The mask(s) generated by mask fabrication 1134 is used in a variety of processes. For example, such a mask(s) is used in an ion implantation process to form various doped regions in the semiconductor wafer, in an etching process to form various etching regions in the semiconductor wafer, and/or in other suitable processes.

IC fab 1140 is an IC fabrication entity that includes one or more manufacturing facilities for the fabrication of a variety of different IC products. In some embodiments, IC Fab 1140 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry entity.

IC fab 1140 includes wafer fabrication tools 1152 (hereinafter "fabrication tools 1152") configured to execute various manufacturing operations on semiconductor wafer 1142 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1140 uses mask(s) 1145 fabricated by mask house 1130 to fabricate IC device 1160. Thus, IC fab 1140 at least indirectly uses IC design layout 1122 to fabricate IC device 1160. In some embodiments, a semiconductor wafer 1142 is fabricated by IC fab 1140 using mask(s) 1145 to form IC device 1160. In some embodiments, the IC fabrication includes performing one or more lithographic exposures based at least indirectly on IC design 1122. Semiconductor wafer 1142 includes a silicon substrate or other proper substrate having material layers formed thereon. Semiconductor wafer 1142 further includes one or more of various doped regions, dielectric features, multilevel interconnects, and the like (formed at subsequent manufacturing steps).

System 1100 is shown as having design house 1120, mask house 1130 or IC fab 1140 as separate components or entities. However, it is understood that one or more of design house 1120, mask house 1130 or IC fab 1140 are part of the same component or entity.

Details regarding an integrated circuit (IC) manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to an integrated circuit. In some embodiments, the integrated circuit includes a first cell, a second cell, a buffer zone and a first power rail. In some embodiments, the first cell includes a first set of fins extending in a first direction. In some embodiments, each fin of the first set of fins corresponds to a transistor of a first set of transistors. In some embodiments, the second cell is separated from the first cell in a second direction different from the first direction. In some embodiments, the second cell includes a second set of fins extending in the first direction. In some embodiments, each fin of the second set of fins corresponds to a transistor of a second set of transistors. In some embodiments, the second set of fins is separated from the first set of fins in the second direction. In some embodiments, the buffer zone is between the first cell and the second cell. In some embodiments, the first power rail extends in the first direction, and overlaps at least the buffer zone. In some embodiments, the first power rail is in a first metal layer, and is configured to supply a first voltage.

Another aspect of this description relates to a method of forming an integrated circuit. In some embodiments, the method includes placing, by a processor, a first standard cell layout of the integrated circuit on a layout design, the first standard cell layout having a first boundary in a first direction, and a first height in a second direction different from the first direction. In some embodiments, the placing the first standard cell layout includes placing a first set of fin layout patterns on a first layout level, the first set of fin layout patterns extending in the first direction, and each fin layout pattern of the first set of fin layout patterns corresponding to a transistor of a first set of transistors. In some embodiments, the method further includes placing a second standard cell layout of the integrated circuit, the second standard cell layout having a second boundary in the first direction and the first height. In some embodiments, the placing the second standard cell layout includes placing a second set of fin layout patterns on the first layout level, the second set of fin layout patterns extending in the first direction, each fin layout pattern of the second set of fin layout patterns corresponding to a transistor of a second set of transistors, the second set of fin layout patterns being separated from the first set of fin layout patterns in the second direction. In some embodiments, the method further includes placing a buffer zone layout pattern on the first layout level, the buffer zone layout pattern being between the first standard cell layout and the second standard cell layout, the buffer zone layout pattern sharing the first boundary with the first standard cell layout and the second boundary with the second standard cell layout. In some embodiments, the method further includes placing a first power rail layout pattern on a second layout level different from the first layout level, the first power rail layout pattern extending in the first direction, and overlapping at least the buffer zone layout pattern, the first power rail layout pattern having a first width in the second direction that satisfies a first design rule. In some embodiments, the method further includes manufacturing the integrated circuit based on at least the first standard cell layout or the second standard cell layout. In some embodiments, the first design rule includes the first width being greater than a minimum width of a power rail layout pattern between the first standard cell layout and the second standard cell layout.

Yet another aspect of this description relates to a method of forming an integrated circuit. In some embodiments, the method includes placing, by a processor, a first cell layout of the integrated circuit on a layout design and in a first column and a first row of a cell array, and manufacturing the integrated circuit based on at least the first cell layout. In some embodiments, the placing the first cell layout includes placing a first set of fin layout patterns on a first layout level and in a first region of the first cell layout, the first set of fin layout patterns extending in a first direction, and each fin layout pattern of the first set of fin layout patterns corresponding to a transistor of a first set of transistors. In some embodiments, the placing the first cell layout further includes placing a second set of fin layout patterns on the first layout level and in a second region of the first cell layout, the second set of fin layout patterns extending in the first direction, each fin layout pattern of the second set of fin layout patterns corresponding to a transistor of a second set of transistors, the second set of fin layout patterns being separated from the first set of fin layout patterns in a second direction different from the first direction. In some embodiments, the placing the first cell layout further includes placing a first buffer zone layout pattern on the first layout level and in a third region of the first cell layout, the third region being between the first region and the second region. In some embodiments, the placing the first cell layout further includes placing a third set of fin layout patterns on the first layout level and in a fourth region of the first cell layout, the third set of fin layout patterns extending in the first direction, at least each pair of fin layout patterns of the third set of fin layout patterns corresponds to a transistor of a third set of transistors, and the fourth region being next to the first region.

A number of embodiments have been described. It will nevertheless be understood that various modifications may be made without departing from the spirit and scope of the disclosure. For example, various transistors being shown as a particular dopant type (e.g., N-type or P-type Metal Oxide Semiconductor (NMOS or PMOS)) are for illustration purposes. Embodiments of the disclosure are not limited to a particular type. Selecting different dopant types for a particular transistor is within the scope of various embodiments. The low or high logical value of various signals used in the above description is also for illustration. Various embodiments are not limited to a particular logical value when a signal is activated and/or deactivated. Selecting different logical values is within the scope of various embodiments. In various embodiments, a transistor functions as a switch. A switching circuit used in place of a transistor is within the scope of various embodiments. In various embodiments, a source of a transistor can be configured as a drain, and a drain can be configured as a source. As such, the term source and drain are used interchangeably. Various signals are generated by corresponding circuits, but, for simplicity, the circuits are not shown.

Various figures show capacitive circuits using discrete capacitors for illustration. Equivalent circuitry may be used. For example, a capacitive device, circuitry or network (e.g., a combination of capacitors, capacitive elements, devices, circuitry, or the like) can be used in place of the discrete capacitor. The above illustrations include exemplary operations or steps, but the steps are not necessarily performed in the order shown. Steps may be added, replaced, changed order, and/or eliminated as appropriate, in accordance with the spirit and scope of disclosed embodiments.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated circuit, the method comprising:
    placing, by a processor, a first standard cell layout of the integrated circuit on a layout design, the first standard cell layout having a first boundary in a first direction, and a first height in a second direction different from the first direction, the placing the first standard cell layout includes:
        placing a first set of fin layout patterns on a first layout level, the first set of fin layout patterns extending in the first direction, and each fin layout pattern of the first set of fin layout patterns corresponding to a transistor of a first set of transistors;
    placing a second standard cell layout of the integrated circuit, the second standard cell layout having a second boundary in the first direction and the first height, the placing the second standard cell layout includes:
        placing a second set of fin layout patterns on the first layout level, the second set of fin layout patterns extending in the first direction, each fin layout pattern of the second set of fin layout patterns corresponding to a transistor of a second set of transistors, the second set of fin layout patterns being separated from the first set of fin layout patterns in the second direction;
    placing a buffer zone layout pattern on the first layout level, the buffer zone layout pattern being between the first standard cell layout and the second standard cell layout, the buffer zone layout pattern sharing the first boundary with the first standard cell layout and the second boundary with the second standard cell layout;
    placing a first power rail layout pattern on a second layout level different from the first layout level, the first power rail layout pattern extending in the first direction, and overlapping at least the buffer zone layout pattern, the first power rail layout pattern having a first width in the second direction that satisfies a first design rule; and
    manufacturing the integrated circuit based on at least the first standard cell layout or the second standard cell layout,
    wherein the first design rule includes the first width being greater than a minimum width of a power rail layout pattern between the first standard cell layout and the second standard cell layout.

2. The method of claim 1, further comprising:
    placing a second power rail layout pattern on the second layout level, the second power rail layout pattern extending in the first direction, and overlapping a third boundary of the first standard cell layout, the third boundary being in the first direction and being opposite from the first boundary, the second power rail layout pattern having a second width in the second direction; and
    placing a third power rail layout pattern on the second layout level, the third power rail layout pattern extending in the first direction, and overlapping a fourth boundary of the second standard cell layout, the fourth boundary being in the first direction and being opposite from the second boundary, the third power rail layout pattern having a third width in the second direction, wherein the second power rail layout pattern having the second width satisfies the first design rule, and the third power rail layout pattern having the third width satisfies the first design rule.

3. The method of claim 2, wherein
the placing the first standard cell layout of the integrated circuit, further includes:
placing a first set of conductive feature layout patterns on the second layout level, the first set of conductive feature layout patterns extending in the first direction, and overlapping at least the first set of fin layout patterns, each conductive feature layout pattern of the first set of conductive feature layout patterns having a fourth width in the second direction; and
the placing the second standard cell layout of the integrated circuit, further includes:
placing a second set of conductive feature layout patterns on the second layout level, the second set of conductive feature layout patterns extending in the first direction, and overlapping at least the second set of fin layout patterns, each conductive feature layout pattern of the second set of conductive feature layout patterns having the fourth width in the second direction, the fourth width being different from at least the first width, the second width or the third width.

4. The method of claim 3, further comprising:
placing a third standard cell layout of the integrated circuit next to the third boundary of the first standard cell layout or the fourth boundary of the second standard cell layout, the third standard cell layout having a second height in the second direction, the second height being greater than the first height, the placing the third standard cell layout includes:
placing a third set of fin layout patterns on the first layout level, the third set of fin layout patterns extending in the first direction, at least each pair of fin layout patterns of the third set of fin layout patterns corresponds to a transistor of a third set of transistors, the third set of fin layout patterns being separated from the first set of fin layout patterns and the second set of fin layout patterns in the second direction;
wherein the first width is less than at least the second width or the third width.

5. The method of claim 4, wherein the placing the third standard cell layout of the integrated circuit, further includes:
placing a third set of conductive feature layout patterns on the second layout level, the third set of conductive feature layout patterns extending in the first direction, and overlapping at least the third set of fin layout patterns, each conductive feature layout pattern of the third set of conductive feature layout patterns having the fourth width in the second direction.

6. The method of claim 1, wherein
the buffer zone layout pattern has a second width in the second direction less than the first width.

7. A method of forming an integrated circuit, the method comprising:
placing, by a processor, a first cell layout of the integrated circuit on a layout design and in a first column and a first row of a cell array, the placing the first cell layout includes:
placing a first set of fin layout patterns on a first layout level and in a first region of the first cell layout, the first set of fin layout patterns extending in a first direction, and each fin layout pattern of the first set of fin layout patterns corresponding to a transistor of a first set of transistors;
placing a second set of fin layout patterns on the first layout level and in a second region of the first cell layout, the second set of fin layout patterns extending in the first direction, each fin layout pattern of the second set of fin layout patterns corresponding to a transistor of a second set of transistors, the second set of fin layout patterns being separated from the first set of fin layout patterns in a second direction different from the first direction;
placing a first buffer zone layout pattern on the first layout level and in a third region of the first cell layout, the third region being between the first region and the second region; and
placing a third set of fin layout patterns on the first layout level and in a fourth region of the first cell layout, the third set of fin layout patterns extending in the first direction, at least each pair of fin layout patterns of the third set of fin layout patterns corresponds to a transistor of a third set of transistors, and the fourth region being next to the first region; and
manufacturing the integrated circuit based on at least the first cell layout.

8. The method of claim 7, further comprising:
placing a second cell layout of the integrated circuit on the layout design and in the first column and a second row of the cell array, the second row being next to the first row,
wherein the second cell layout corresponds to a copy of the first cell layout.

9. The method of claim 7, further comprising:
placing a first power rail layout pattern on a second layout level different from the first layout level, the first power rail layout pattern extending in the first direction, and overlapping at least the first buffer zone layout pattern, the first power rail layout pattern having a first width in the second direction that satisfies a first design rule,
wherein the first design rule includes the first width being greater than a minimum width of a power rail layout pattern between the first region and the second region.

10. The method of claim 9, wherein
the placing the first cell layout further includes:
placing a fourth set of fin layout patterns on the first layout level and in a fifth region of the first cell layout, the fourth set of fin layout patterns extending in the first direction, each fin layout pattern of the fourth set of fin layout patterns corresponding to a transistor of a fourth set of transistors, the fourth set of fin layout patterns being separated from the first set of fin layout patterns and the second set of fin layout patterns in the second direction; and
placing a second buffer zone layout pattern on the first layout level and in a sixth region of the first cell layout, the sixth region being between the second region and the fifth region; and
the method further comprises:
placing a second power rail layout pattern on the second layout level, the second power rail layout pattern extending in the first direction, and overlapping at least the second buffer zone layout pattern, the second power rail layout pattern having a second width in the second direction that satisfies a second design rule, wherein the second design rule includes the second width being greater than a minimum width of a power rail layout pattern between the second region and the fifth region.

11. The method of claim 10, further comprising:
placing a second cell layout of the integrated circuit on the layout design and in the first column and a second row of the cell array, the second row being next to the first row, the placing the second cell layout includes:
placing a fifth set of fin layout patterns on the first layout level and in a seventh region of the second cell layout, the fifth set of fin layout patterns extending in the first direction, and each fin layout pattern of the fifth set of fin layout patterns corresponding to a transistor of a fifth set of transistors;
placing a sixth set of fin layout patterns on the first layout level and in an eighth region of the second cell layout, the sixth set of fin layout patterns extending in the first direction, each fin layout pattern of the sixth set of fin layout patterns corresponding to a transistor of a sixth set of transistors, the sixth set of fin layout patterns being separated from the fifth set of fin layout patterns in the second direction;
placing a third buffer zone layout pattern on the first layout level and in a ninth region of the second cell layout, the ninth region being between the seventh region and the eighth region; and
placing a seventh set of fin layout patterns on the first layout level and in a tenth region of the second cell layout, the seventh set of fin layout patterns extending in the first direction, at least each pair of fin layout patterns of the seventh set of fin layout patterns corresponds to a transistor of a seventh set of transistors, and the tenth region being next to the seventh region and the fourth region.

12. A method of forming an integrated circuit, the method comprising:
generating, by a processor, a first standard cell layout of the integrated circuit of a layout design, the first standard cell layout having a first boundary in a first direction, and a first height in a second direction different from the first direction, the generating the first standard cell layout includes:
generating a first set of fin layout patterns, the first set of fin layout patterns extending in the first direction and being on a first layout level, and each fin layout pattern of the first set of fin layout patterns corresponding to a transistor of a first set of transistors;
generating a second standard cell layout of the integrated circuit, the second standard cell layout having a second boundary in the first direction and the first height, the generating the second standard cell layout includes:
generating a second set of fin layout patterns, the second set of fin layout patterns extending in the first direction and being on the first layout level, each fin layout pattern of the second set of fin layout patterns corresponding to a transistor of a second set of transistors, the second set of fin layout patterns being separated from the first set of fin layout patterns in the second direction;
placing a first buffer zone layout pattern on the first layout level, the first buffer zone layout pattern being between the first standard cell layout and the second standard cell layout, the first buffer zone layout pattern sharing the first boundary with the first standard cell layout and the second boundary with the second standard cell layout;
placing a first power rail layout pattern on a second layout level different from the first layout level, the first power rail layout pattern extending in the first direction, and overlapping at least the first buffer zone layout pattern, the first power rail layout pattern having a first width in the second direction that satisfies a first design rule; and
manufacturing the integrated circuit based on at least the first standard cell layout or the second standard cell layout,
wherein the first design rule includes the first width being greater than a minimum width of a power rail layout pattern between the first standard cell layout and the second standard cell layout.

13. The method of claim 12, further comprising:
placing a second power rail layout pattern on the second layout level, the second power rail layout pattern extending in the first direction, and overlapping a third boundary of the first standard cell layout, the third boundary being in the first direction and being opposite from the first boundary, the second power rail layout pattern having a second width in the second direction; and
placing a third power rail layout pattern on the second layout level, the third power rail layout pattern extending in the first direction, and overlapping a fourth boundary of the second standard cell layout, the fourth boundary being in the first direction and being opposite from the second boundary, the third power rail layout pattern having a third width in the second direction,
wherein the second power rail layout pattern having the second width satisfies the first design rule, and the third power rail layout pattern having the third width satisfies the first design rule.

14. The method of claim 13, wherein
the generating the first standard cell layout of the integrated circuit, further includes:
generating a first set of conductive feature layout patterns, the first set of conductive feature layout patterns extending in the first direction, being on the second layout level, and overlapping at least the first set of fin layout patterns, each conductive feature layout pattern of the first set of conductive feature layout patterns having a fourth width in the second direction; and
the generating the second standard cell layout of the integrated circuit, further includes:
generating a second set of conductive feature layout patterns, the second set of conductive feature layout patterns extending in the first direction, being on the second layout level, and overlapping at least the second set of fin layout patterns, each conductive feature layout pattern of the second set of conductive feature layout patterns having the fourth width in the second direction, the fourth width being different from at least the first width, the second width or the third width.

15. The method of claim 14, further comprising:
generating a third standard cell layout of the integrated circuit, the third standard cell layout being next to the third boundary of the first standard cell layout or the fourth boundary of the second standard cell layout, the third standard cell layout having a second height in the second direction, the second height being greater than the first height, the generating the third standard cell layout includes:
generating a third set of fin layout patterns, the third set of fin layout patterns extending in the first direction and being on the first layout level, at least each pair of fin layout patterns of the third set of fin layout patterns corresponds to a transistor of a third set of transistors, the third set of fin layout patterns being separated from the first set of fin layout patterns and the second set of fin layout patterns in the second direction;

wherein the first width is less than at least the second width or the third width.

16. The method of claim 15, wherein the generating the third standard cell layout of the integrated circuit, further includes:
generating a third set of conductive feature layout patterns, the third set of conductive feature layout patterns extending in the first direction and being on the second layout level, and overlapping at least the third set of fin layout patterns, each conductive feature layout pattern of the third set of conductive feature layout patterns having the fourth width in the second direction.

17. The method of claim 12, wherein
the first buffer zone layout pattern has a second width in the second direction less than the first width.

18. The method of claim 12, further comprising:
generating a third standard cell layout of the integrated circuit, the third standard cell layout having a third boundary in the first direction and the first height, the generating the third standard cell layout includes:
generating a third set of fin layout patterns, the third set of fin layout patterns extending in the first direction and being on the first layout level, each fin layout pattern of the third set of fin layout patterns corresponding to a transistor of a third set of transistors, the third set of fin layout patterns being separated from the first set of fin layout patterns and the second set of fin layout patterns in the second direction.

19. The method of claim 18, further comprising:
placing a second buffer zone layout pattern on the first layout level, the second buffer zone layout pattern being between the second standard cell layout and the third standard cell layout, the second buffer zone layout pattern sharing the third boundary with the third standard cell layout and a fourth boundary with the second standard cell layout, the fourth boundary being in the first direction and being opposite from the second boundary.

20. The method of claim 19, further comprising:
placing a second power rail layout pattern on the second layout level, the second power rail layout pattern extending in the first direction, and overlapping at least the second buffer zone layout pattern, the second power rail layout pattern having the first width in the second direction that satisfies the first design rule.

* * * * *